(12) United States Patent
Kim et al.

(10) Patent No.: US 10,418,857 B2
(45) Date of Patent: Sep. 17, 2019

(54) WIRELESS POWER TRANSMITTER

(71) Applicant: WITS Co., Ltd., Yongin-si, Gyeonggi-do (KR)

(72) Inventors: Hyo Young Kim, Suwon-si (KR); Seung Won Park, Suwon-si (KR); Eun Young Shin, Suwon-si (KR); Byoung Woo Ryu, Suwon-si (KR); Dong Woo Han, Suwon-si (KR); Ye Ji Park, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 76 days.

(21) Appl. No.: 15/790,815

(22) Filed: Oct. 23, 2017

(65) Prior Publication Data

US 2018/0152051 A1    May 31, 2018

(30) Foreign Application Priority Data

Nov. 29, 2016 (KR) .................. 10-2016-0160531
Feb. 8, 2017 (KR) .................. 10-2017-0017454

(51) Int. Cl.
*H02J 50/12* (2016.01)
*H02M 7/539* (2006.01)
(Continued)

(52) U.S. Cl.
CPC .............. *H02J 50/12* (2016.02); *H02J 50/80* (2016.02); *H02M 1/14* (2013.01); *H02M 1/36* (2013.01); *H02M 3/155* (2013.01); *H02M 7/48* (2013.01); *H02M 7/539* (2013.01); *H02J 7/022* (2013.01); *H02J 7/025* (2013.01);
(Continued)

(58) Field of Classification Search
CPC .. H02J 50/12; H02J 50/80; H02J 7/022; H02J 7/025; H02M 1/14; H02M 1/36; H02M 3/155; H02M 7/48; H02M 7/539; H02M 2001/0032; H02M 2001/007; H02M 2007/4815; Y02B 7/1441; Y02B 70/16
See application file for complete search history.

(56) References Cited

U.S. PATENT DOCUMENTS

2013/0278071 A1    10/2013   Komiyama
2014/0268908 A1    9/2014    Zhou et al.
(Continued)

FOREIGN PATENT DOCUMENTS

JP     2013-223409 A    10/2013
KR    10-1158224 B1    6/2012
(Continued)

OTHER PUBLICATIONS

Korean Office Action dated Nov. 21, 2017 in corresponding Korean patent application No. 10-2017-0017454. (10 pages in English and 8 pages in Korean).

*Primary Examiner* — Robert L Deberadinis
(74) *Attorney, Agent, or Firm* — Harness, Dickey & Pierce, P.L.C.

(57) ABSTRACT

A wireless power transmitter includes: a converter including switching elements forming a bridge circuit and configured to output an alternating current (AC) voltage in response to control signals; a resonator including a resonant capacitor and a resonant coil, and configured to receive the AC voltage to transmit power wirelessly; and a controller configured to set a dead time at which a magnitude of the AC voltage is substantially zero in response to a signal received from a wireless power receiver.

20 Claims, 53 Drawing Sheets

(51) Int. Cl.
*H02M 1/14* (2006.01)
*H02M 1/36* (2007.01)
*H02M 3/155* (2006.01)
*H02M 7/48* (2007.01)
*H02J 50/80* (2016.01)
*H02J 7/02* (2016.01)
*H02M 1/00* (2006.01)

(52) U.S. Cl.
CPC .............. *H02M 2001/007* (2013.01); *H02M 2001/0032* (2013.01); *H02M 2007/4815* (2013.01); *Y02B 70/1441* (2013.01); *Y02B 70/16* (2013.01)

(56) References Cited

U.S. PATENT DOCUMENTS

| | | |
|---|---|---|
| 2016/0079792 A1 | 3/2016 | Jeong et al. |
| 2016/0111888 A1 | 4/2016 | Cho et al. |

FOREIGN PATENT DOCUMENTS

| | | |
|---|---|---|
| KR | 10-2016-0030801 A | 3/2016 |
| KR | 10-2016-0046195 A | 4/2016 |

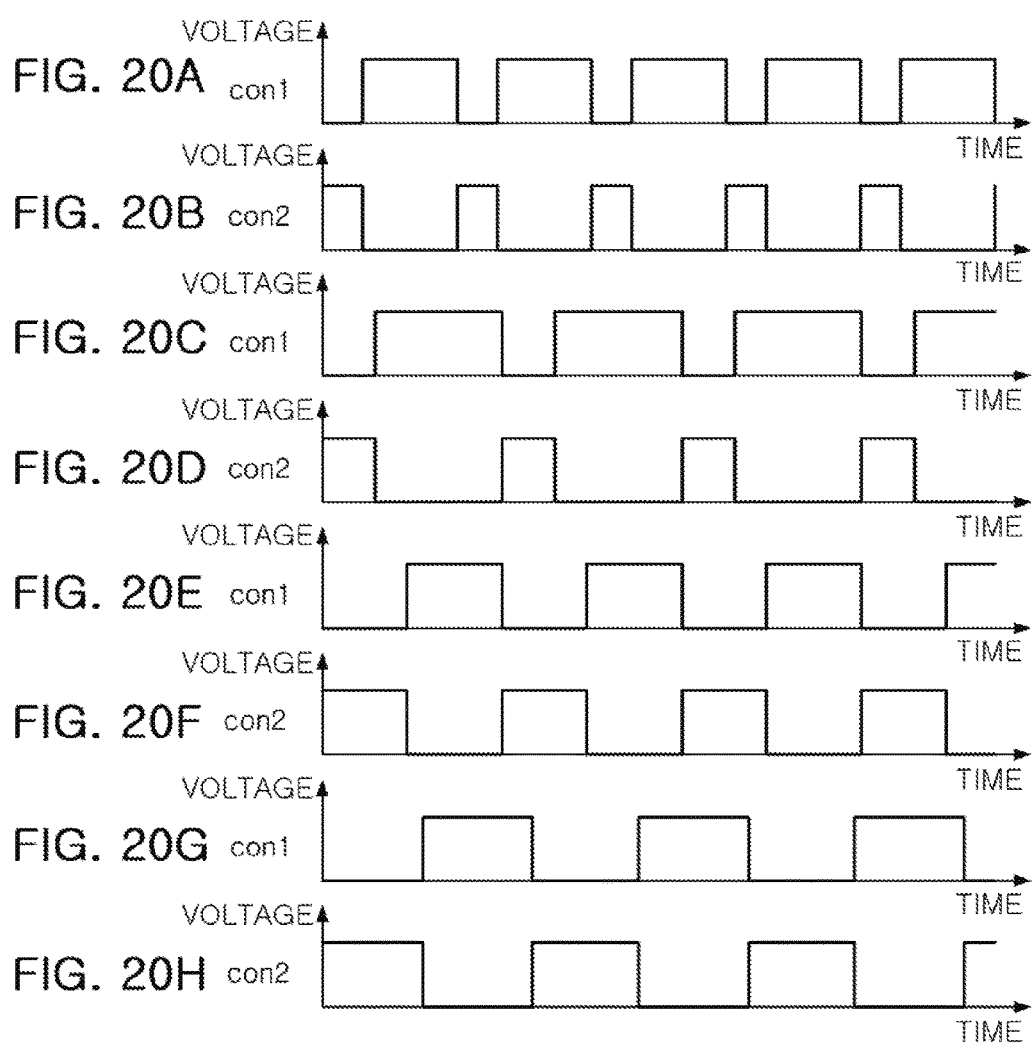

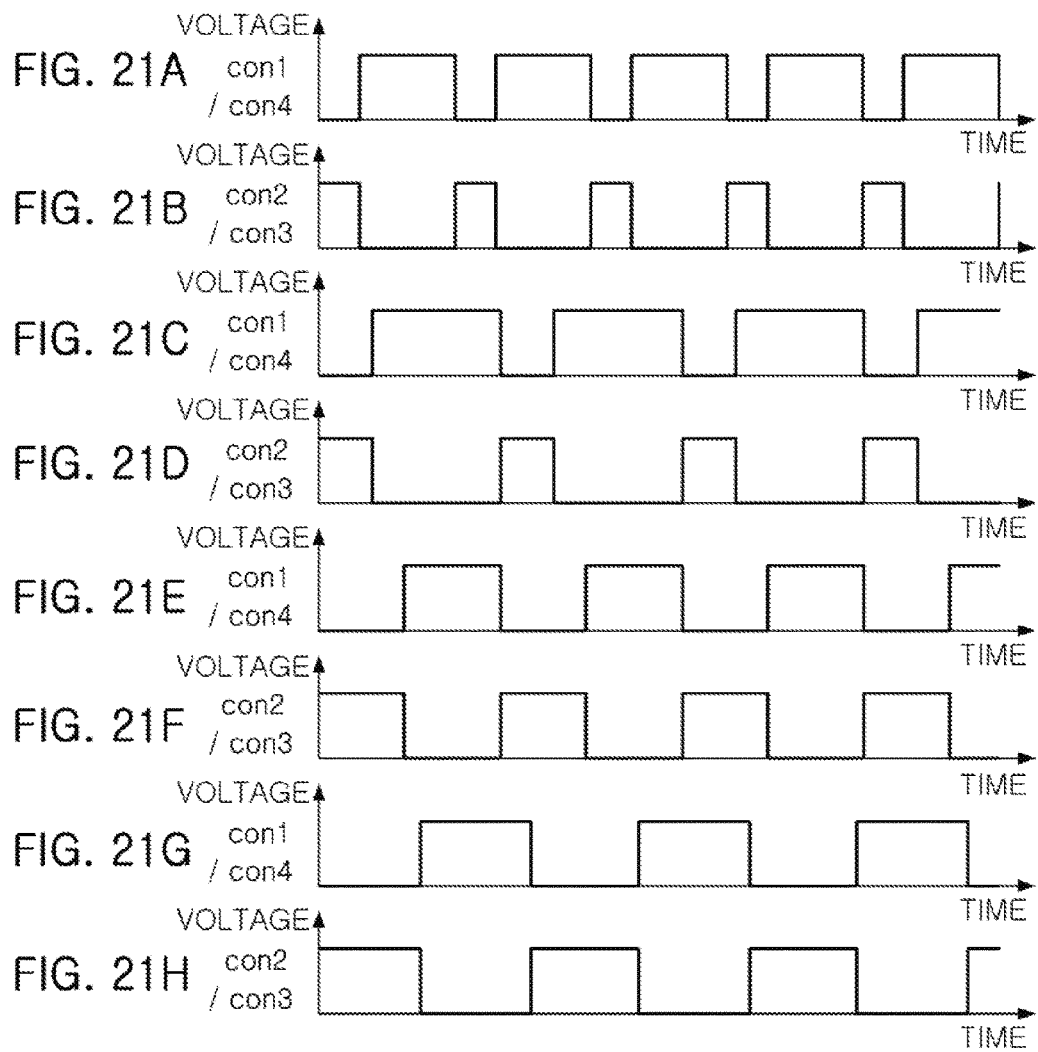

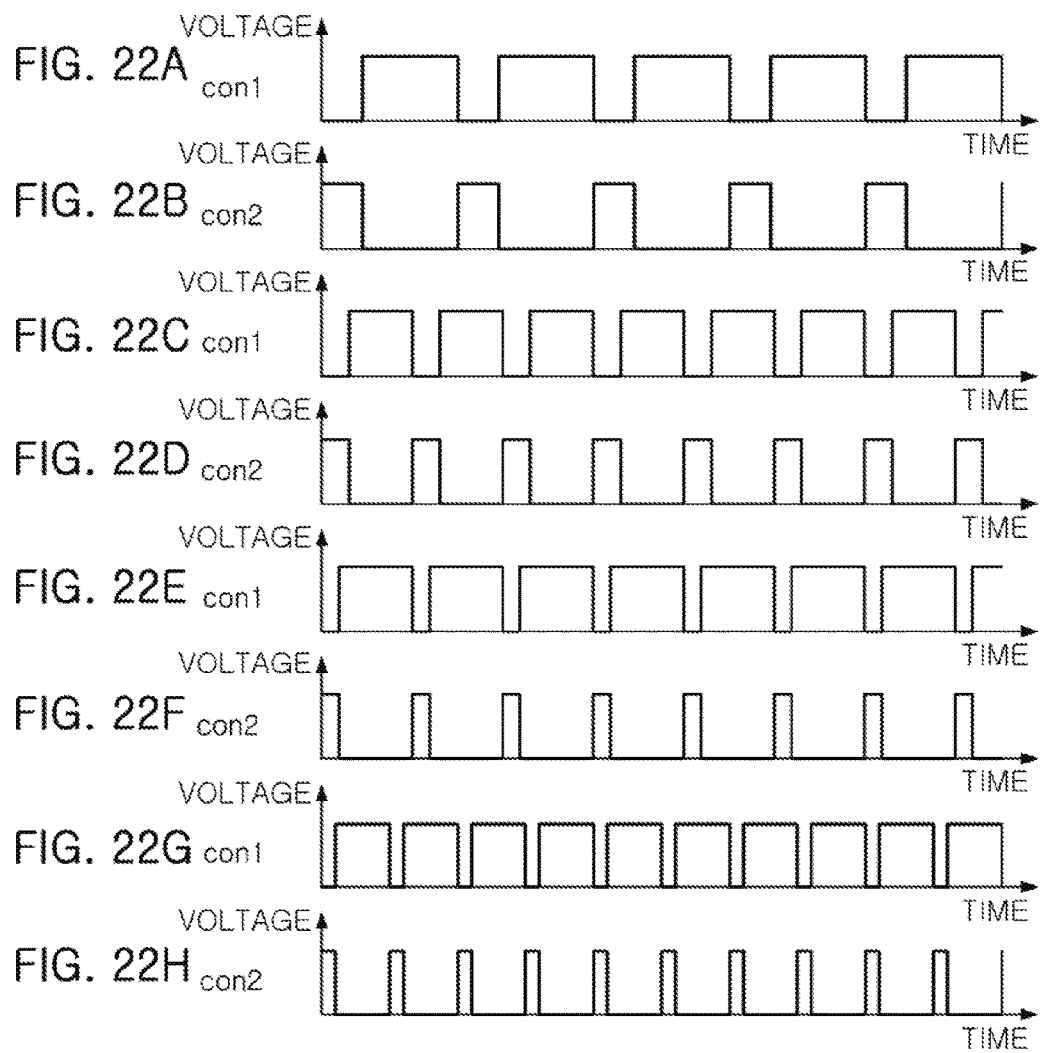

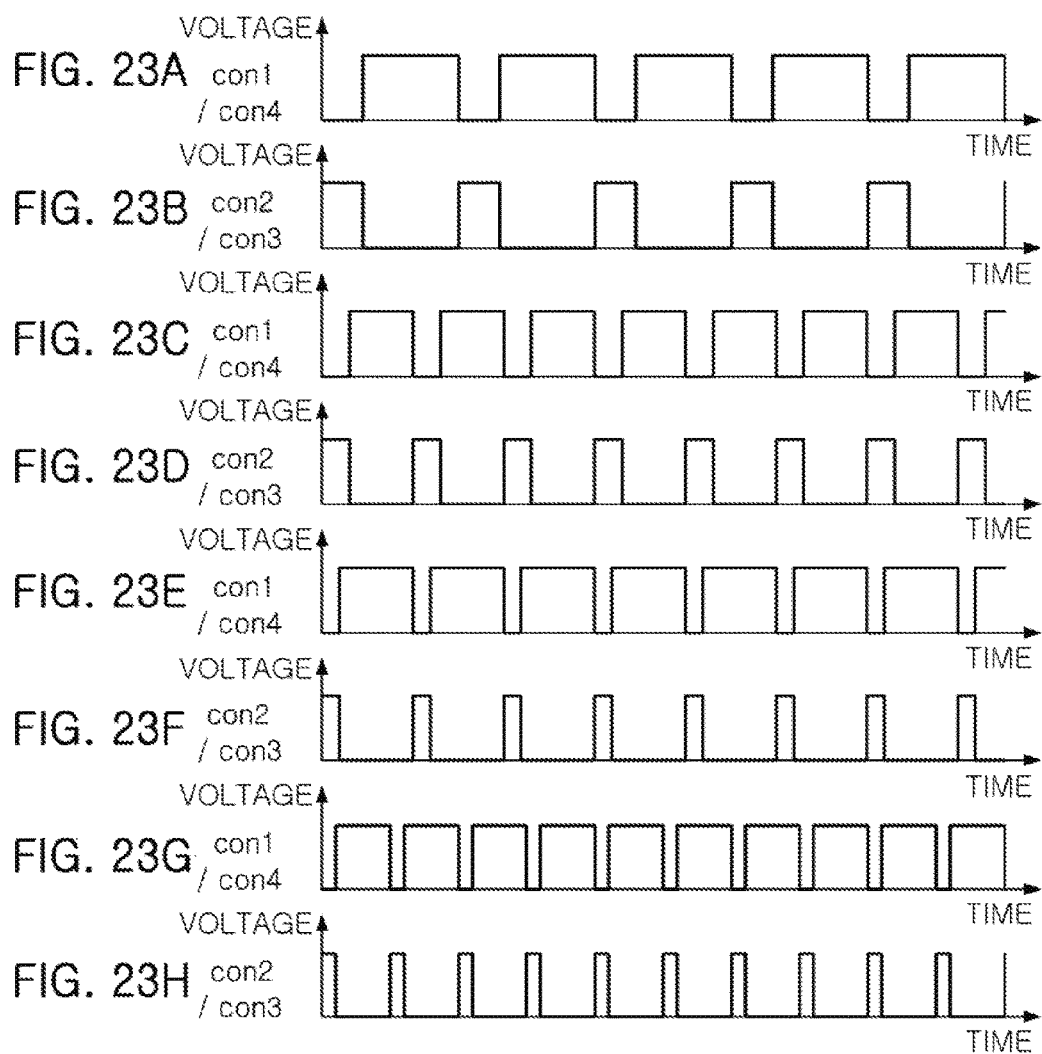

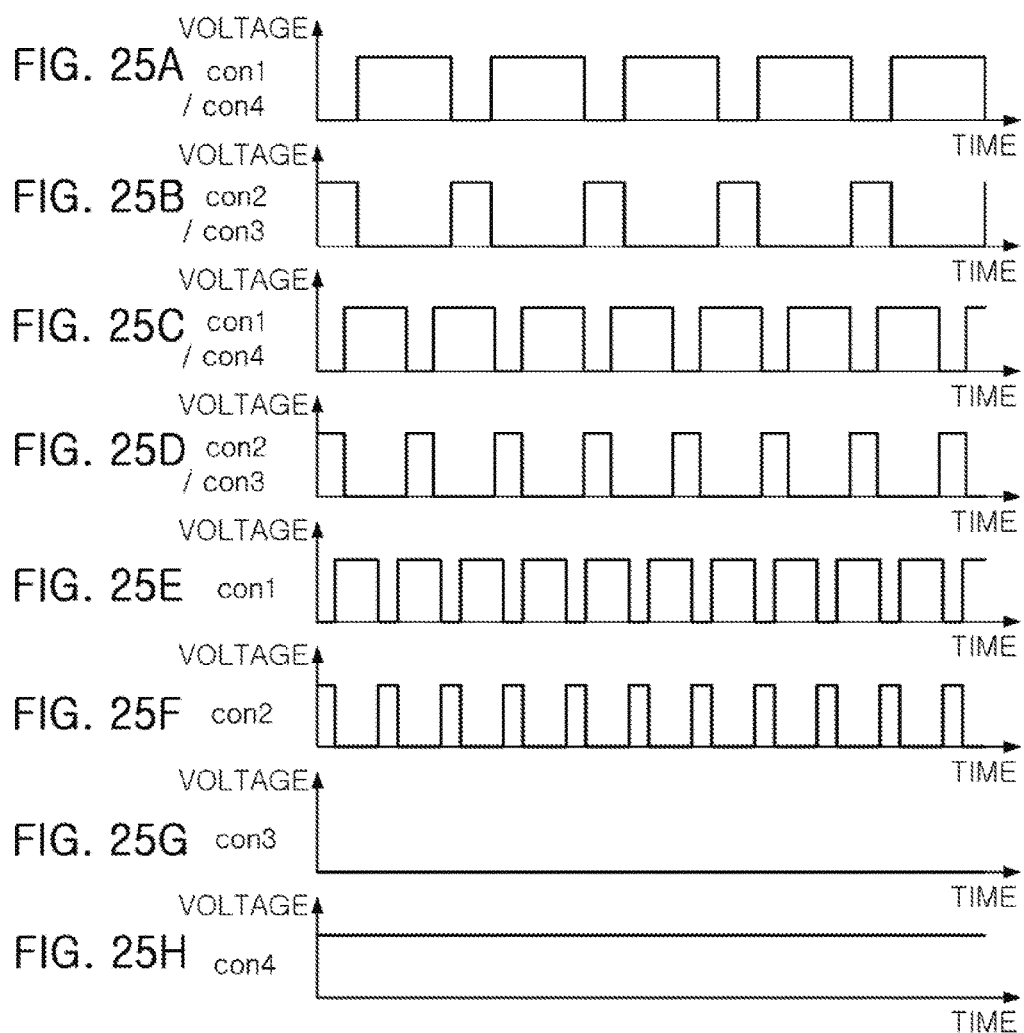

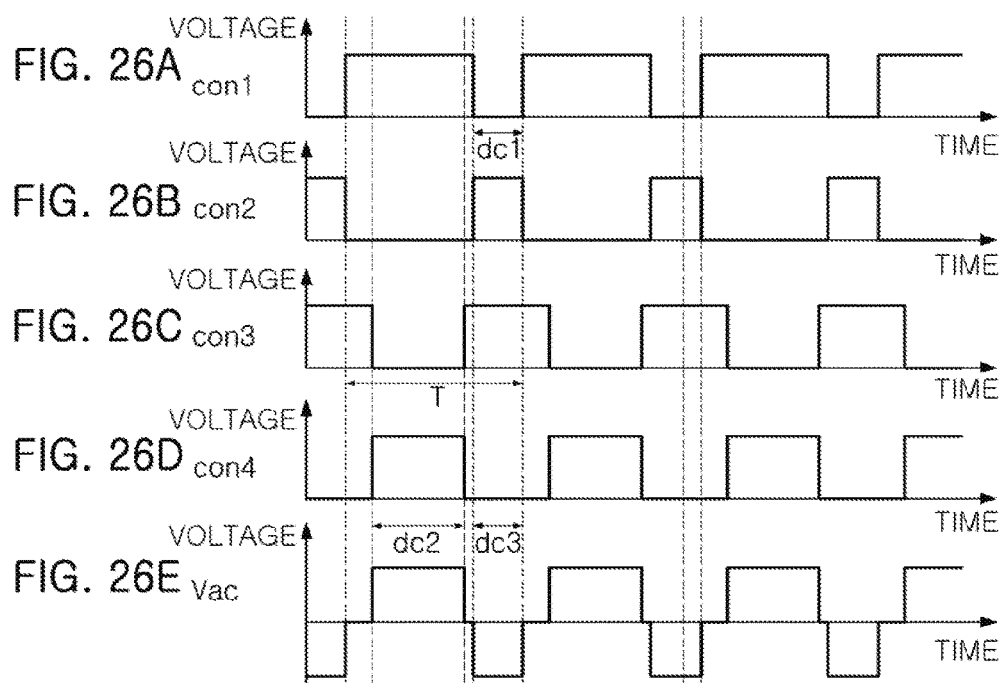

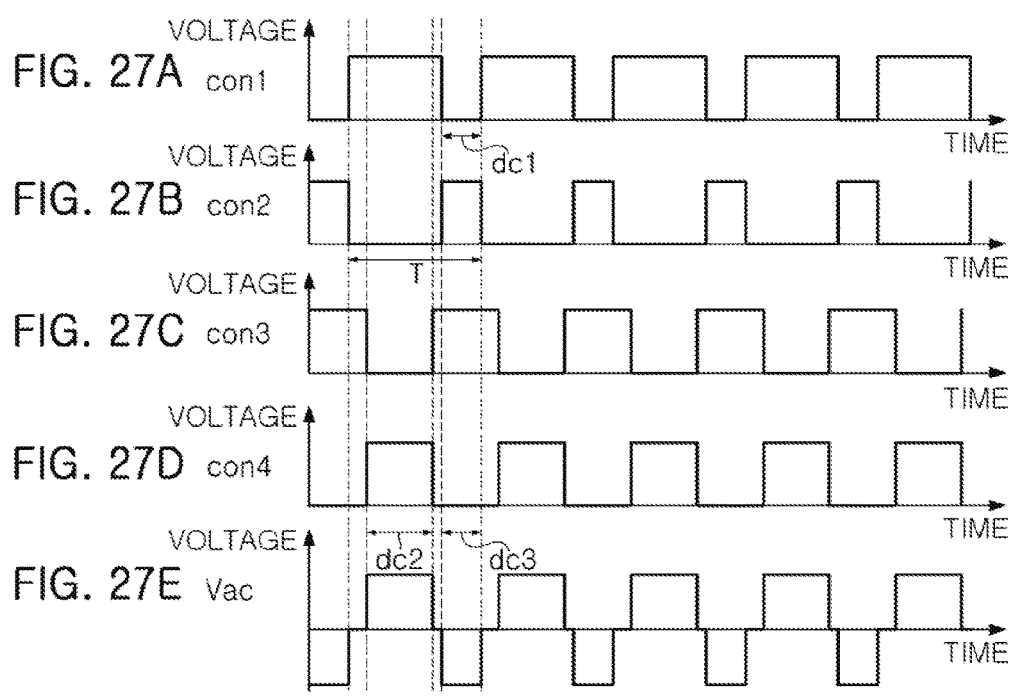

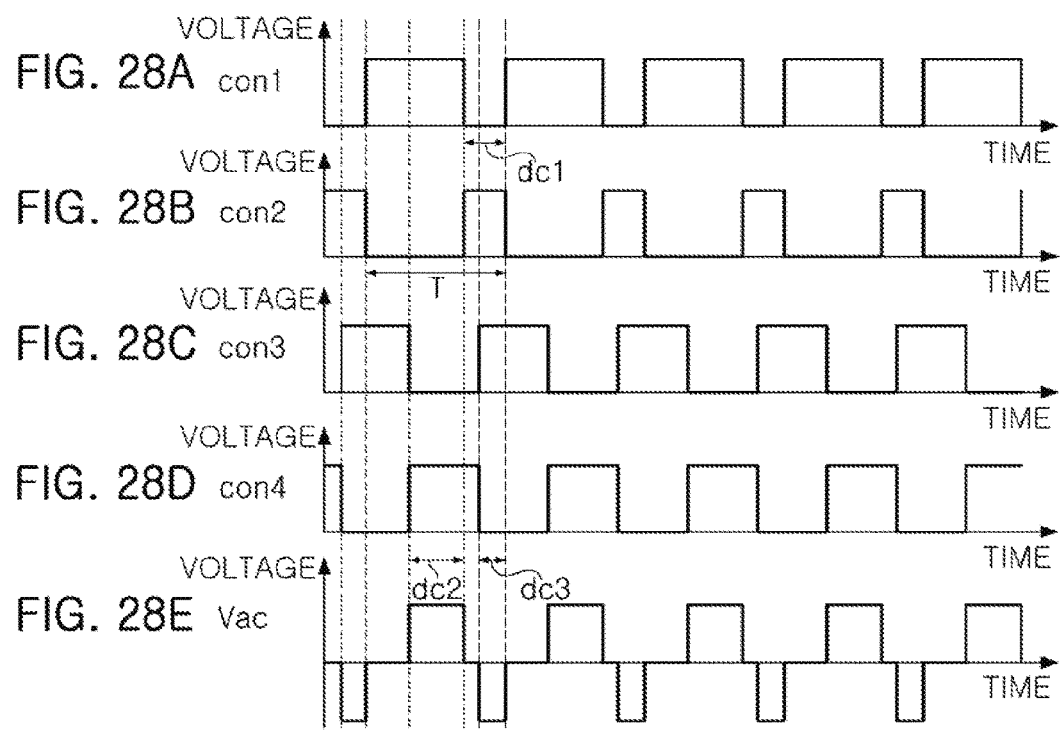

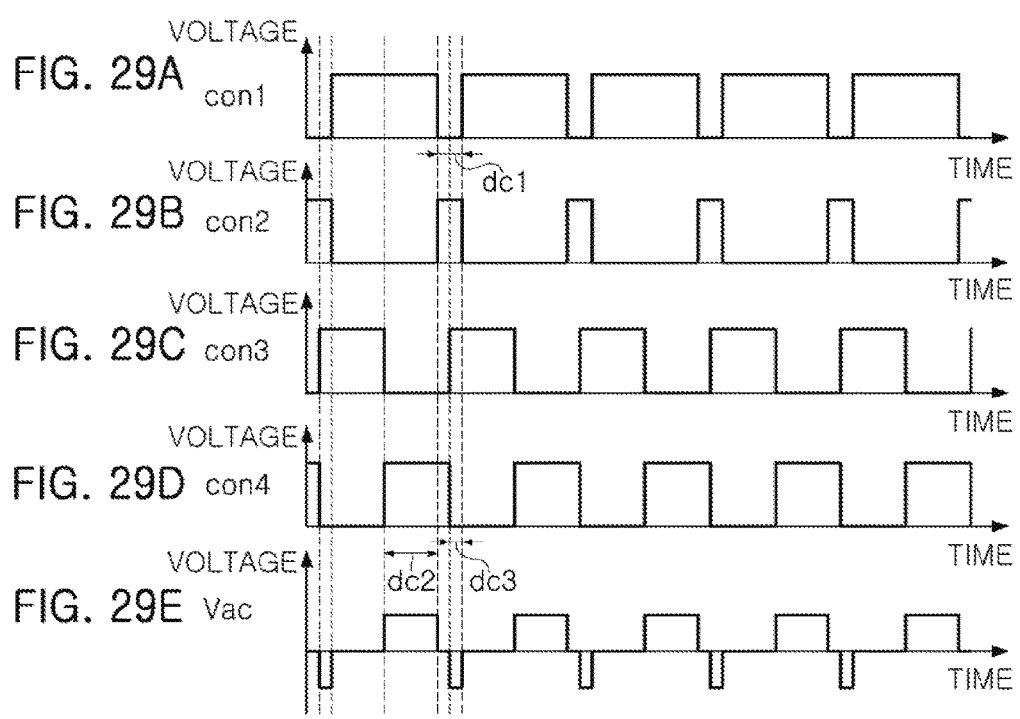

WIRELESS POWER TRANSMITTER

CROSS-REFERENCE TO RELATED APPLICATIONS

This application claims the benefit under 35 U.S.C. §119 (a) of Korean Patent Application Nos. 10-2016-0160531 and 10-2017-0017454 filed on Nov. 29, 2016 and Feb. 8, 2017, respectively, in the Korean Intellectual Property Office, the entire disclosures of which are incorporated herein by reference for all purposes.

BACKGROUND

1. Field

The following description relates to a device for transmitting power wirelessly.

2. Description of Related Art

Recently, many mobile devices that are capable of being charged in a wireless manner have been introduced. Accordingly, many wireless power transmitters for wirelessly transmitting power to mobile devices have been introduced. In the case of such wireless power transmitters, in addition to research into reducing the material costs, research into improving user convenience and for improving wireless power transmission efficiency while satisfying various requirements is also being continuously carried out.

SUMMARY

In one general aspect, a wireless power transmitter includes: a converter including switching elements forming a bridge circuit, and configured to output an alternating current (AC) voltage in response to control signals; a resonator including a resonant capacitor and a resonant coil, and configured to receive the AC voltage to transmit power wirelessly; and a controller configured to set a dead time at which a magnitude of the AC voltage is substantially zero, in response to a signal received from a wireless power receiver.

The switching elements may be configured to be respectively turned on or off in response to a corresponding signal among the control signals. An amplitude of the AC voltage may be determined according to an operating duty cycle of one of the switching elements. A frequency of the AC voltage may be determined according to an operating frequency of the switching signals.

The converter may further include a first switching element connected between a first node, an end of the resonator, and a second node, a second switching element connected between the first node and a ground, a third switching element connected between a third node, another end of the resonator, and the second node, a fourth switching element connected between the third node and the ground, a coil connected between the first node and a terminal to which an input voltage is applied externally, and a capacitor connected between the second node and the ground.

The controller may be further configured to vary a frequency of the control signals in response to an amount of power required by the wireless power receiver being equal to or greater than a reference value, and to vary the dead time in response to the amount of power required by the wireless power receiver being equal to or lower than the reference value.

The varying of the frequency of the control signals may include varying the frequency of the control signals within a range of a frequency equal to or greater than a first reference frequency to a frequency equal to or less than a second reference frequency. The frequency of the control signals may be fixed at the second reference frequency when the dead time is varied.

The controller may be further configured to fix the frequency of the control signals to the second reference frequency, and to vary a duty cycle of one of the control signals.

The controller may be further configured to fix the frequency of the control signals to the first reference frequency, and to vary a duty cycle of one of the control signals.

The bridge circuit may include a full bridge circuit including a first leg and a second leg, and the controller may be configured to output the control signals such that an on-duty cycle of a low side switching element of the first leg and an on-duty cycle of a high side switching element of the second leg are different from each other.

In another general aspect, a wireless power transmitter includes: a converter including switching elements forming a bridge circuit, and configured to output an alternating current (AC) voltage in response to control signals; a resonator including a resonant capacitor and a resonant coil, and configured to receive the AC voltage to transmit power wirelessly; and a controller configured to perform a first mode operation in which an operating duty cycle of one of the control signals is fixed and a frequency of the control signals is varied and output, and a second mode operation in which a duty cycle and the frequency of the control signals are fixed and a phase difference between two of the control signals is varied and output.

The switching elements may be respectively turned on or off in response to a corresponding signal among the control signals. An amplitude of the AC voltage may be determined according to an operating duty cycle of one of the switching elements. A frequency of the AC voltage may be determined according to an operating frequency of the switching elements.

The converter may further include a first switching element connected between a first node, an end of the resonator, and a second node, a second switching element connected between the first node and a ground, a third switching element connected between a third node, another end of the resonator, and the second node, a fourth switching element connected between the third node and the ground, a coil connected between the first node and a terminal to which an input voltage is applied externally, and a capacitor connected between the second node and the ground.

The controller may be further configured to perform the first mode operation in response to an amount of power required by a wireless power receiver being equal to or greater than a reference value, and to perform the second mode operation in response to the amount of power required by the wireless power receiver being equal to or lower than the reference value.

The controller may be further configured to set a detection duty cycle while determining whether a wireless power receiver is present, to fix a duty cycle of one of the control signals to the detection duty cycle in the first mode operation and the second mode operation, and to output the control signals.

The controller may be further configured to output the control signals such that the frequency of the control signals is varied within a range of a frequency equal to or greater than a first reference frequency to a frequency equal to or less than a second reference frequency, when the first mode operation is performed, and to fix the frequency of the control signals to the second reference frequency and to output the control signals by varying the phase difference, when the second mode operation is performed.

The bridge circuit may include a full bridge circuit including a first leg and a second leg. The controller may be further configured to output the control signals such that an on-duty cycle of a low side switching element of the first leg and an on-duty cycle of a high side switching element of the second leg are different from each other.

The low side switching element of the first leg and a high side switching element of the first leg may be configured to be turned on or off alternately with respect to each other. A low side switching element of the second leg and the high side switching element of the second leg may be configured to be turned on or off alternately with each other. The controller may be further configured to vary and output a phase difference between control signals, among the control signals, controlling switching elements of the first leg and control signals, among the control signals, controlling switching elements of the second leg, in the second mode operation.

In another general aspect, a wireless power transmitter includes: a converter including a bridge circuit including switching elements; a controller configured to output control signals controlling the switching elements to cause the converter to output an alternating current (AC) voltage, and vary a phase difference between two of the control signals, independently of operating duty cycles of the two of the control signals, to adjust the AC voltage; and a resonator configured to receive the AC voltage to transmit power.

The controller may be further configured to fix an operating duty cycle of one of the control signals and vary a frequency of the control signals, in a first mode operation, and fix an operating duty cycle and the frequency of the control signals, and vary the phase difference between the two of the control signals, in a second mode operation.

The controller may be further configured to vary the frequency of the control signals within a range of a frequency equal to or greater than a first reference frequency to a frequency equal to or less than a second reference frequency, in the first mode operation, and fix the frequency of the control signals to the second reference frequency, in the second mode operation.

The controller may be further configured to perform one of the first mode operation and the second mode operation based on an amount of power required by a receiver receiving the transmitted power.

Other features and aspects will be apparent from the following detailed description, the drawings, and the claims.

BRIEF DESCRIPTION OF DRAWINGS

FIGS. 20A to 20H, 21A to 21H, 22A to 22H, 23A to 23H, 24A to 24L, 25A to 25H, 26A to 26H, 27A to 27E, 28A to 28E, and 29A to 29E are waveform diagrams respectively illustrating an example of an operation of the wireless power transmitter in a power transmission mode and the wireless power transmission method in a power transmission mode. The waveform diagrams represent waveforms of control signals that control switching elements of the wireless power transmitter.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
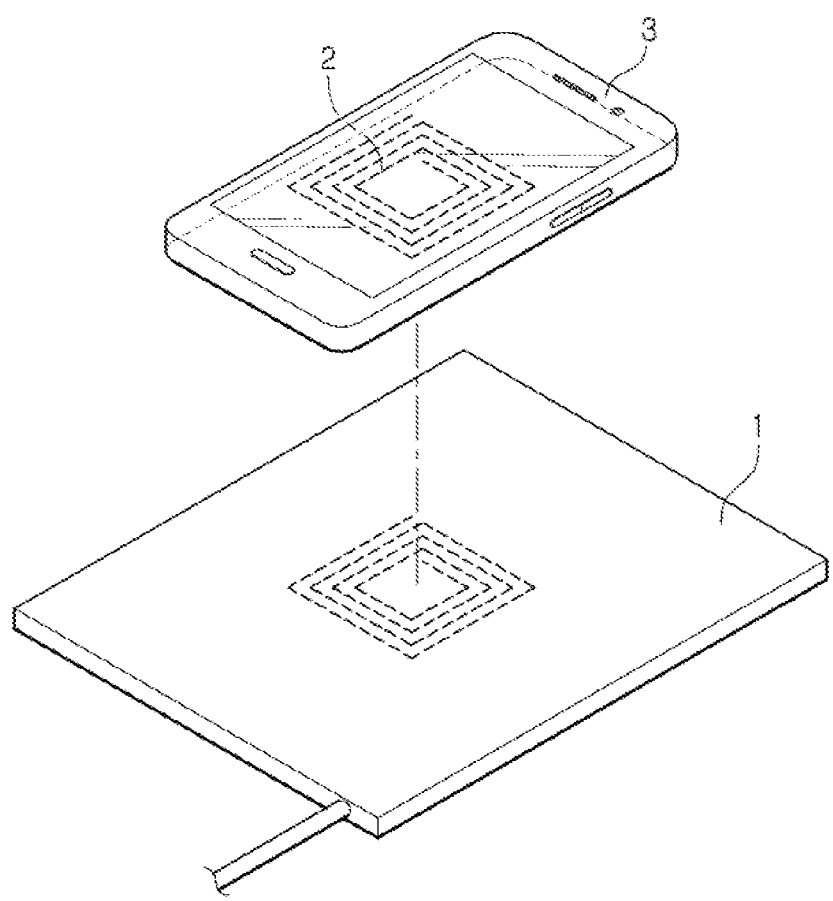
FIG. 1 is a diagram schematically illustrating an application of a wireless power transmitter, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram schematically illustrating an application of a wireless power transmitter according to an embodiment.

Referring to FIG. 1, the wireless power transmitter 1 and a wireless power receiver 2 may be magnetically coupled to each other to wirelessly transmit and receive power. As an example, the wireless power transmitter 1 and the wireless power receiver 2 are coupled to each other by either one or both of magnetic resonance and magnetic induction.

The wireless power receiver 2 provides the received power to an electronic device 3. The electronic device 3 performs an operation, such as charging an internal battery using the power provided by the wireless power receiver 2. The wireless power receiver 2 may be present in the electronic device 3 as one component, or may be a separate device connected to the electronic device 3.

Referring to FIG. 1, the wireless power receiver 2 is disposed in a position adjacent to the wireless power transmitter 1, but a relative distance from the wireless power transmitter 1 and/or an alignment between the wireless power transmitter 1 and the wireless power receiver 2 may be changed. The wireless power transmitter 1 may be operated in boost mode to stably transmit the power to the wireless power receiver 2, in a case in which the wireless power receiver 2 does not sufficiently receive required power due to the distance from the wireless power transmitter 1 being increased or an alignment between the wireless power transmitter 1 and the wireless power receiver 2 is degraded, in a case in which a large amount of power is required due to requirement for rapid charging of a battery or a battery of the electronic device 3 being close to a discharged state, and/or in other appropriate cases. Alternatively, the wireless power transmitter 1 may be operated in a reduction mode to prevent unnecessary power consumption and prevent overheating of the wireless power receiver 2 and/or the electronic device 3, in a case in which the wireless power receiver 2 receives a required power or more than the required power due to the distance from the wireless power transmitter 1 being decreased or the alignment between the wireless power transmitter 1 and the wireless power receiver 2 improving, in a case in which a small amount of power is required due to a battery of the electronic device 3 being close to a fully charged state, and/or in other appropriate cases.

Figure 2:
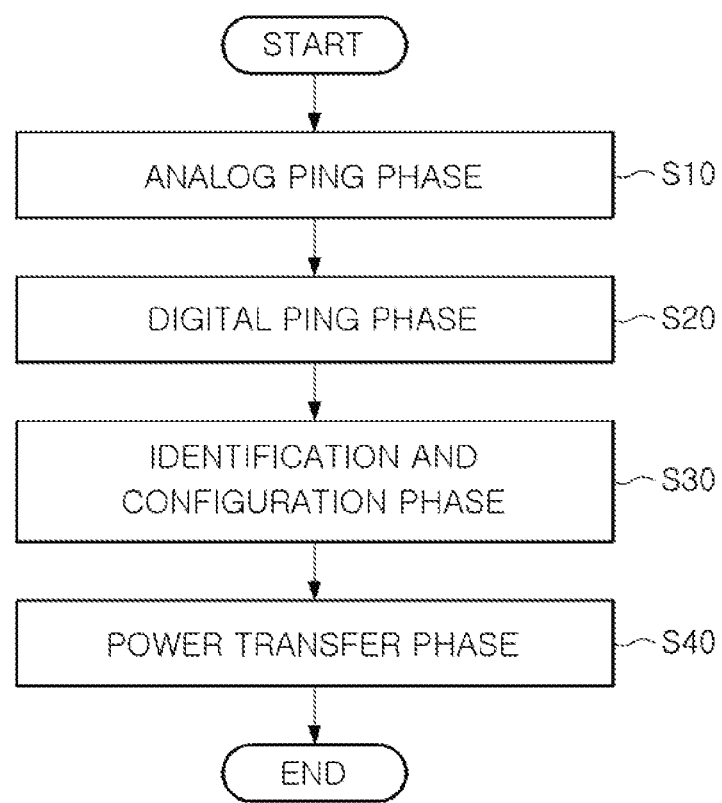
FIG. 2 is a diagram schematically illustrating a wireless power transmission method, according to an embodiment.

FIG. 2 is an operation flowchart schematically illustrating a method for wirelessly transmitting power, according to an embodiment.

The wireless power transmission method of FIG. 2 may be performed by the wireless power transmitter 1. Although the flowchart of FIG. 2 is illustrated in a time sequential order, the order of some operations may be modified or some operations may be omitted, and some phases may also be periodically repeated. As an example, the wireless power transmitter 1 periodically enters an analog ping phase S10 and a digital ping phase S20.

Referring to FIGS. 1 and 2, the wireless power transmission method begins by the wireless power transmitter 1 entering the analog ping phase S10.

In the analog ping phase S10, the wireless power transmitter 1 transmits an analog ping signal. In a case in which an impedance level of the analog ping signal is changed, the wireless power transmitter 1 determines that an external object is positioned around the wireless power transmitter 1. For example, the wireless power transmitter 1 transmits the analog ping signal through a transmission coil or other coils, and determines whether the external object is positioned around the wireless power transmitter 1 using a change of impedance of the coil that transmits the analog ping signal or a change of a level of the analog ping signal. The analog ping signal may be transmitted according to a set period.

In a case in which it is determined that a predetermined external object is adjacent to the wireless power transmitter 1 in the analog ping phase, the wireless power transmitter 1 enters the digital ping phase S20. Alternatively, the wireless power transmitter 1 enters the digital ping phase S20 according to a set period. The wireless power transmitter 1 transmits a digital ping signal in the digital ping phase to determine whether the external object, which is adjacent to the wireless power transmitter 1, is the wireless power receiver 2. For example, the wireless power transmitter 1 determines whether the external object adjacent thereto is the wireless power receiver 2 depending on whether a response signal is received from the wireless power receiver 2, after transmitting the digital ping signal.

The wireless power transmitter 1 enters an identification and configuration phase S30 in response to receiving the response signal of the wireless power receiver 2 for the digital ping signal. In a case in which the external object is the wireless power receiver 2, the wireless power receiver 2 transmits the response signal for the received digital ping signal. The response signal of the wireless power receiver 2 includes any one or any combination of any two or more of information regarding signal strength, information regarding a kind of the wireless power receiver, information regarding input voltage strength, information regarding power required by the wireless power receiver, and an error value indicating a difference between the power required by the wireless power receiver and power received by the wireless power receiver. Therefore, the wireless power transmitter 1 confirms a target and a power demand using the response signal of the wireless power receiver 2 for the digital ping signal.

Thereafter, the wireless power transmitter 1 enters a power transfer phase S40, in which the wireless power transmitter 1 wirelessly provides the power to the wireless power receiver 2 using the information confirmed in the identification and configuration phase S30.

In the power transfer phase S40, the wireless power transmitter 1 may be operated in a normal mode, a boost mode, or a reduction mode.

The normal mode is, for example, a mode in which an amount of power received by the wireless power receiver 2 is an intermediate magnitude. The normal mode may be referred to as an operation mode in which a duty cycle, or "duty" for short, of a control signal for controlling a switching element of the wireless power transmitter 1 is fixed to any value, and an operating frequency of the wireless power transmitter 1 is varied within a preset reference range. The value to which the duty cycle is fixed may be a duty cycle of a control signal generated to transmit the above-mentioned analog ping and/or digital ping signals, and other signals for determining whether the wireless power receiver 2 is present. The reference range of the operating frequency may be a frequency range usable by a defined standard, and may also be a range determined by considering a degree of heating of the wireless power receiver or a range of a spatial region to be charged using the wireless power transmitter within the usable frequency range, and a range determined by considering power transfer characteristics between the wireless power transmitter 1 and the wireless power receiver 2.

The boost mode is, for example, an operation mode of the wireless power transmitter 1 in which the wireless power receiver 2 is operated to receive a larger amount of power in comparison to the normal mode. The wireless power transmitter 1 adjusts the duty cycle, or adjusts the operating frequency to be lower than the reference range to allow the wireless power receiver 2 to receive a larger amount of power.

The reduction mode is, for example, an operation mode of the wireless power transmitter 1 in which the wireless power receiver 2 is operated to receive a smaller amount of power in comparison to the normal mode. The wireless power transmitter 1 may adjust the duty cycle or adjust the operating frequency to be greater than the reference range to allow the wireless power receiver 2 to receive a smaller amount of power.

The duty cycle may be a duty cycle (hereinafter, referred to as an 'operating duty cycle') determining a level of voltage applied to a resonator of the wireless power transmitter 1, or may be a duty cycle (hereinafter, referred to as an 'inverter duty cycle') determining a time at which a voltage having a predetermined level is applied to the resonator of the wireless power transmitter 1.

The wireless power transmitter 1 may only perform a portion of a normal mode, a boost mode, and a reduction mode. For example, the wireless power transmitter 1 may only be operated in the normal mode and the boost mode, only operated in the normal mode and the reduction mode, or only operated in the boost mode and the reduction mode.

Although FIG. 2 illustrates a case in which the wireless power transmitter 1 uses the analog ping signal and the digital ping signal to determine whether the wireless power receiver 2 is present, the wireless power transmitter 1 may also determine whether the wireless power receiver 2 is present by using a signal other than the ping signals.

In addition, although FIG. 2 illustrates a case in which the wireless power transmitter 1 performs the analog ping phase and the digital ping phase to determine whether the wireless power receiver 2 is present, the wireless power transmitter 1 may also determine whether the wireless power receiver 2 is present in a different manner. For example, the wireless power transmitter 1 may also determine whether the wireless power receiver 2 is present by using a separate local area communications circuit, such as Bluetooth, and may also determine whether the external object is adjacent to the wireless power transmitter 1 and whether the adjacent object is the wireless power receiver through one phase or three or more phases.

Figure 3A:
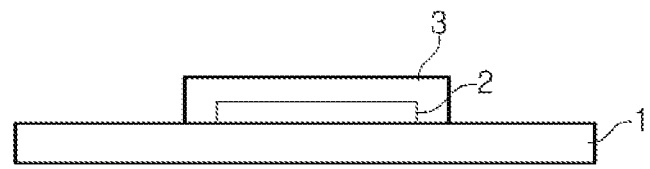
FIGS. 3A to 3C are diagrams illustrating that an operation of the wireless power transmitter for transmitting power required by a wireless power receiver is changed depending on a distance between the wireless power transmitter and the wireless power receiver.
Figure 3B:
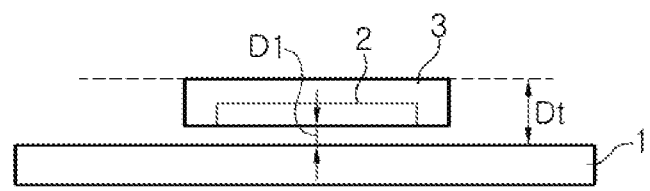
Figure 3C:
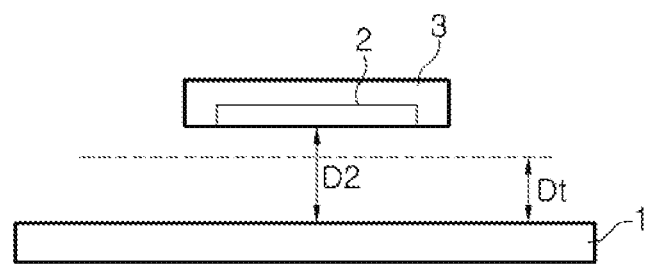

FIGS. 3A to 3C are diagrams illustrating that an operation of the wireless power transmitter 1 is changed depending on a distance between the wireless power transmitter 1 and the wireless power receiver 2, and illustrates the electronic device 3 including the wireless power receiver 2 and the wireless power transmitter 1.

FIG. 3A illustrates a situation (a1) in which the wireless power receiver 2 is mounted on the wireless power transmitter 1. FIG. 3B illustrates a situation (b1) in which the wireless power receiver 2 is spaced apart from the wireless power transmitter 1 by a distance D1 that is equal to or less than a spacing threshold distance Dt. FIG. 3C illustrates a situation (c1) in which the wireless power receiver 2 is spaced apart from the wireless power transmitter 1 by a distance D2 equal to or greater than the spacing threshold distance Dt.

In the situation (c1) of FIG. 3C, as compared to the situation (a1) of FIG. 3A or the situation (b1) of FIG. 3B, in order for the wireless power receiver 2 to receive a required amount of power, the wireless power transmitter 1 may need to transmit a larger amount of power. Conversely, in the situation (a1) of FIG. 3A, as compared to the situation (b1) of FIG. 3B or the situation (c1) of FIG. 3C, even when that the wireless power transmitter 1 transmits a smaller amount of power, the wireless power receiver 2 may receive the required amount of power.

In the examples illustrated in FIGS. 3A to 3C, the spacing threshold distance Dt is an effective charging distance at the time of transmission at maximum power in the normal mode.

When a distance between the wireless power transmitter 1 and the wireless power receiver 2 is equal to or less than the spacing threshold distance Dt, the wireless power transmitter 1 is operated in the normal mode. That is, in the situation of FIG. 3A and/or the situation of FIG. 3B, the wireless power transmitter 1 is operated in the normal mode in which the duty cycle is fixed and the operating frequencies of the switches are changed to adjust an output.

When the distance D2 between the wireless power transmitter 1 and the wireless power receiver 2 is equal to or greater than the spacing threshold distance Dt, the wireless power transmitter 1 is operated in the boost mode to form a stronger output. That is, in the situation (c1) of FIG. 3C, the wireless power transmitter 1 may adjust the duty cycle, or may additionally adjust the operating frequency.

Alternatively, the wireless power transmitter 1 is operated in the normal mode in the situation (b1) of FIG. 3B, and is operated in the reduction mode in the situation of FIG.3A.

Figure 4A:
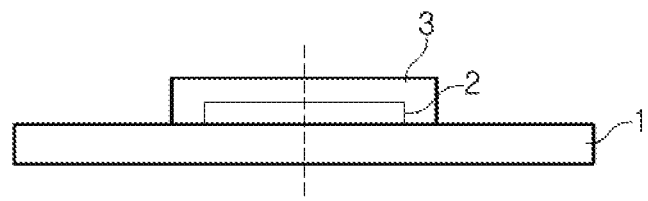
FIGS. 4A to 4C are diagrams illustrating that an operation of the wireless power transmitter for transmitting power required by the wireless power receiver is changed depending on a degree of alignment between the wireless power transmitter and the wireless power receiver.
Figure 4B:
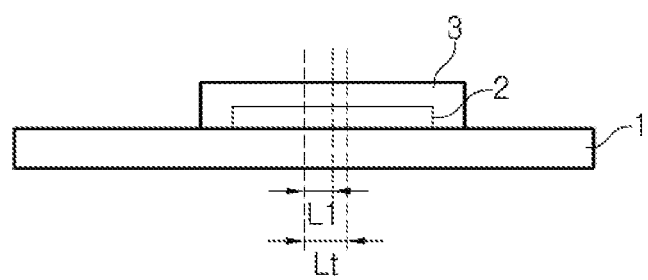
Figure 4C:
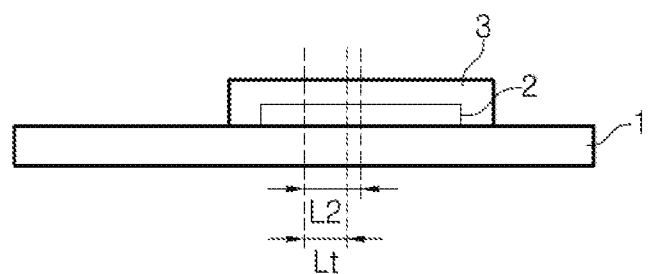

FIGS. 4A to 4C are diagrams illustrating that an operation of the wireless power transmitter 1 is changed, depending on a degree of alignment between the wireless power transmitter 1 and the wireless power receiver 2, and illustrates the electronic device 3 including the wireless power receiver 2 and the wireless power transmitter 1.

FIG. 4A illustrates a situation (a2) in which the center of the wireless power receiver 2 and the center of the wireless power transmitter 1 coincide with each other. FIG. 4B illustrates a situation (b2) in which a distance L1 by which the center of the wireless power receiver 2 and the center of wireless power transmitter 1 are spaced apart is less than or equal to a spacing threshold distance Lt. FIG. 4C illustrates a situation (c2) in which a distance L2 by which the center of the wireless power receiver 2 and the center of wireless power transmitter 1 are spaced apart is greater than or equal to the spacing threshold distance Lt.

In the situation (c2) of FIG. 4C as compared to the situation (a2) of FIG. 4A or the situation (b2) of FIG. 4B, in order for the wireless power receiver 2 to receive a required amount of power, the wireless power transmitter 1 may need to transmit a larger amount of power. Conversely, in the situation (a2) of FIG. 4A as compared to the situation (b2) of FIG. 4B or the situation (c2) of FIG. 4C, even though the wireless power transmitter 1 transmits a smaller amount of power, the wireless power receiver 2 may receive the required amount of power.

In the illustrated example, the spacing threshold distance Lt is an effective charging distance at the time of transmission at maximum power in the normal mode.

Similarly to the situations described in FIG. 3, in the situation (a2) of FIG. 4A and/or the situation (b2) of FIG. 4B, the wireless power transmitter 1 is operated in the normal mode. In the situation (c2) of FIG. 4C, the wireless power transmitter 1 is operated in the boost mode. Alternatively, in the situation (a2) of FIG. 4A, the wireless power transmitter 1 is operated in the reduction mode.

Figure 5:
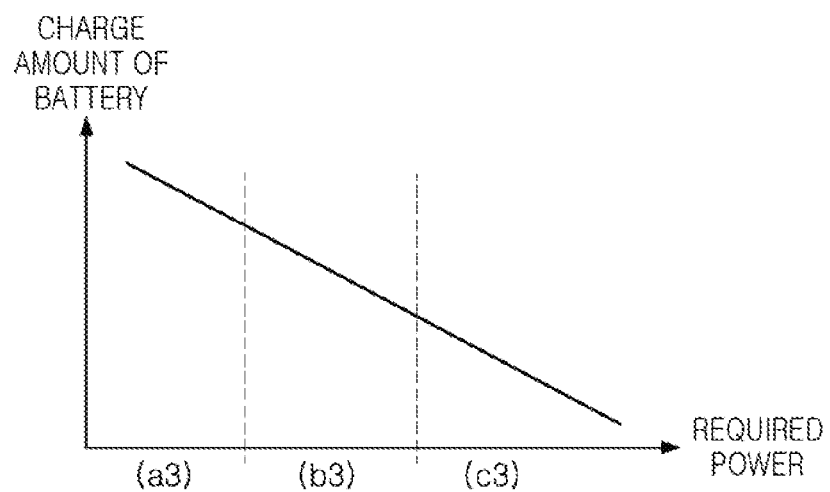
FIG. 5 is a diagram illustrating that an operation of the wireless power transmitter for transmitting power required by the wireless power receiver is changed depending on an amount of charge of a battery of the wireless power receiver.

FIG. 5 is a diagram illustrating that an operation of the wireless power transmitter 1 is changed, depending on an amount of charge of a battery of the wireless power receiver 2.

In a situation (a3) in which the amount of charge of the battery approaches a full charge, the wireless power receiver 2 may require a smaller amount of power, and in a situation (c3) in which the amount of charge of the battery approaches a discharge, the wireless power receiver 2 may require a larger amount of power.

The wireless power transmitter 1 determines the operation mode in response to the signal received from the wireless power receiver 2. In this case, the wireless power transmitter is operated in the normal mode in situation (b3). In addition, the wireless power transmitter is operated in the boost mode in situation (c3). In addition, the wireless power transmitter is operated in the reduction mode in situation (a3).

Figure 6:
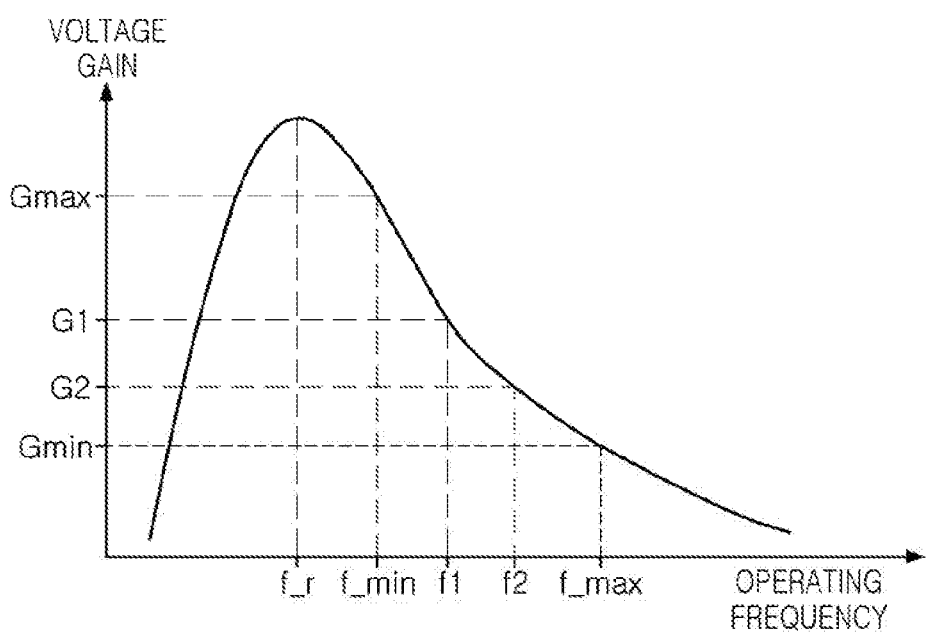
FIG. 6 is a diagram illustrating a relationship between a voltage gain and an operating frequency between a transmission coil of the wireless power transmitter and a reception coil of the wireless power receiver.

FIG. 6 is a diagram illustrating a relationship between a voltage gain and an operating frequency between a transmission coil of the wireless power transmitter 1 and a reception coil of the wireless power receiver 2, wherein the X axis represents the operating frequency and the Y axis represents the voltage gain.

Referring to FIG. 6, in the normal mode, the wireless power transmitter fixes the duty cycle of the switches and adjusts the operating frequency between a first reference frequency f1 and a second reference frequency f2. The duty cycle in the normal mode may be a duty cycle of the signal used by the wireless power transmitter to determine whether the wireless power receiver is present. In the normal mode, when the wireless power receiver is somewhat distant from the wireless power transmitter or requires a larger amount of power, the wireless power transmitter increases an amount of power received by the wireless power receiver by decreasing the frequency. Alternatively, in the normal mode, when the wireless power receiver is somewhat closer to the wireless power transmitter or requires a smaller amount of power, the wireless power transmitter decreases an amount of power received by the wireless power receiver by increasing the frequency.

Also, when the amount of power required by the wireless power receiver 2 is higher than the maximum value of the power that the wireless power receiver 2 may receive in the normal mode, the wireless power transmitter 1 changes the operation mode to the boost mode so that the wireless power receiver 2 receives an amount of power equal to or more than an amount of power which may be received by the wireless power receiver 2 in the normal mode. In this case, the operating frequency of the wireless power transmitter 1 is fixed to the first reference frequency f1, and the duty cycle is adjusted. Further, when the amount of power received by the wireless power receiver 2 is not sufficiently large, even when the duty cycle is increased to a limit value of a defined range, the wireless power transmitter 1 additionally decreases the operating frequency after fixing the duty cycle to the limit value. A detailed operation in the boost mode will be described below.

In addition, when the amount of power required by the wireless power receiver 2 is lower than the minimum value of the power that the wireless power receiver may receive in the normal mode, the wireless power transmitter 1 changes the operation mode to the reduction mode. In this case, the operating frequency of the wireless power transmitter 1 is fixed to the second reference frequency f2, and the duty cycle is adjusted. Alternatively, the wireless power transmitter 1 operates as a full bridge and then also operate as a half bridge. A detailed operation in the reduction mode will be described below.

As described above, the duty cycle may be an operating duty cycle determining a level of a voltage applied to a resonator of the wireless power transmitter 1, and may also be an inverter duty cycle determining a time at which a predetermined level of voltage is applied to the resonator of the wireless power transmitter 1.

The first reference frequency f1 and the second reference frequency f2 may respectively be equal to the minimum frequency f_min and the maximum frequency f_max. The minimum frequency f_min and the maximum frequency f_max may respectively be a lower limit value and an upper limit value of a usable frequency range defined by standards or other protocols. Alternatively, the first reference frequency f1 and the second reference frequency f2 may also be determined by considering a degree of heating of the wireless power receiver or a range of a spatial region to be charged using the wireless power transmitter 1 in the range of the minimum frequency f_min to the maximum frequency f_max. By determining the first reference frequency f1 and the second reference frequency f2 as described above, the wireless power transmitter 1 may be more stably operated within a defined range, and may also prevent damage or overheating of an element in the wireless power receiver 2.

Alternatively, the first reference frequency f1 and the second reference frequency f2 may also be determined by considering power transfer characteristics between the wireless power transmitter 1 and the wireless power receiver 2 in the range of the minimum frequency f_min to the maximum frequency f_max.

In a case in which the operating frequency is within a predetermined range as illustrated in FIG. 6, since a variation of the gain according to a variation of the frequency is not excessively high, or is not excessively low, it is easy to control the wireless power transmitter 1 so that the wireless power receiver 2 receives an appropriate amount of power. However, since the variation of the gain according to the variation of the operating frequency may be excessively large when the operating frequency falls to a predetermined threshold value f2 or less, and the variation of the gain according to the variation of the operating frequency may be excessively small when the operating frequency reaches a predetermined threshold value f1 or more, it is not easy to control the wireless power transmitter 1 so that the wireless power receiver 2 receives an appropriate amount of power.

In consideration of the above-mentioned aspects, when the wireless power transmitter 1 is operated in the normal mode, the first reference frequency f1 and the second reference frequency f2 are determined so that the variation of the gain according to the variation of the operating frequency is within a reference range. That is, referring to the graph illustrated in FIG. 6, the first reference frequency f1 is determined as a frequency at which the variation of the gain according to the variation of the frequency in the range of the minimum frequency f_min to the maximum frequency f_max is a predetermined maximum value, and the second reference frequency f2 is determined as a frequency at which the variation of the gain according to the variation of the frequency in the range of the minimum frequency f_min to the maximum frequency f_max is a predetermined minimum value.

By determining the first reference frequency f1 and the second reference frequency f2 as described above, the wireless power transmitter 1 may prevent damage or overheating of an element in the wireless power receiver 2, and may more precisely control power transmissions to the wireless power receiver 2.

The first reference frequency f1 and the second reference frequency f2 may be experimentally determined and set in advance, or may be input externally. Alternatively, the first reference frequency f1 and the second reference frequency f2 may also be set or changed in the wireless power transmitter after the wireless power transmitter is operated. In order to set or change the first reference frequency f1 and the second reference frequency f2, the wireless power transmitter may also perform a predetermined algorithm, and may also include an additional hardware configuration for this purpose.

In addition, as illustrated in FIG. 6, the voltage gain may have the maximum value at a resonance frequency f_r. The resonance frequency f_r may be a resonance frequency of a resonator of the wireless power transmitter to be described below. In this case, the minimum frequency f_min may be about 110% of the resonance frequency f_r, and the maximum frequency f_max may be about 150% of the resonance frequency f_r.

Figure 7:
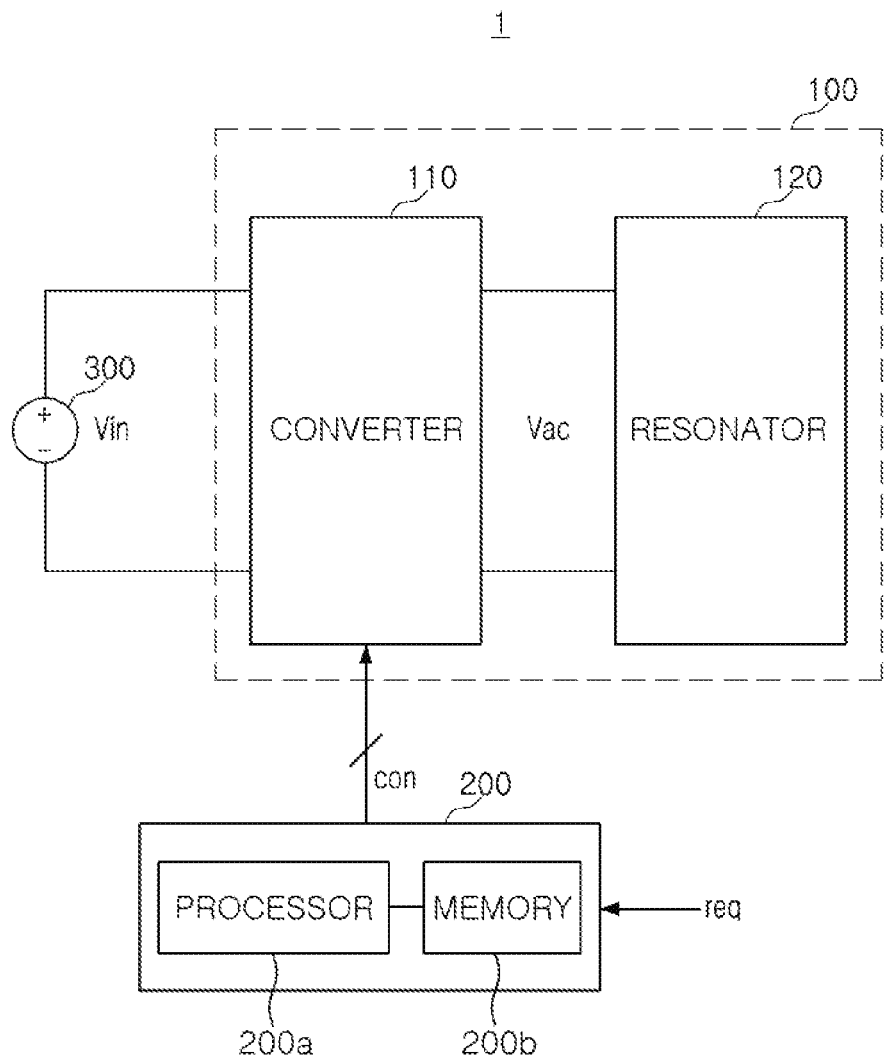
FIGS. 7 through 16 are diagrams each schematically illustrating a configuration of a wireless power transmitter, according to embodiments.

FIG. 7 is a block diagram schematically illustrating a configuration of the wireless power transmitter 1 including a circuit unit 100 and a controller 200, according to an embodiment. The circuit unit 100 includes a converter 110 and a resonator 120. In FIG. 7, reference numeral 300 indicates an input power source.

The circuit unit 100 is provided with an input voltage Vin from the input power source 300, and wirelessly transmits the power in response to at least one control signal con. An amount and frequency of the power wirelessly transmitted varies by the control signal con.

The converter 110 converts the input voltage Vin into an alternating current (AC) voltage Vac in response to the control signal con, and outputs the converted AC voltage. An amplitude and frequency of the AC voltage Vac are determined according to the control signal con. For example, the amplitude of the AC voltage Vac is determined according to a duty cycle of the control signal con (when there are a plurality of control signals con, the duty cycle of some or all of the control signals con determines the amplitude of the AC voltage Vac). In addition, the frequency of the AC voltage Vac is determined according to a frequency of the control signal con (when there are a plurality of control signals con, the frequency of some or all of the control signals con determines the frequency of the AC voltage Vac).

The frequency of the AC voltage Vac may be greater than the resonance frequency f_r (FIG. 6) of the resonator 120. For example, the frequency of the AC voltage Vac is also determined to be between about 110% to about 150% of the resonance frequency f_r (FIG. 6) of the resonator 120.

The converter 110 may be implemented in various forms. For example, the converter 110 may include a boost converter and an inverter, may include only the inverter, or may include a boost inverter that performs both the function of the boost converter and the function of the inverter.

The resonator 120 is provided with the AC voltage Vac, and transmits a signal, such as the analog ping signal or the digital ping signal, for determining whether the wireless power receiver 2 is present, or wirelessly transmits the power. The resonator 120 wirelessly transmits the signal and/or the power by changing a surrounding magnetic field according to the AC voltage Vac. The resonator 120 includes, for example, a resonance capacitor and a resonance coil, and the resonance frequency f_r (FIG. 6) of the resonator 120 is determined by capacitance of the resonance capacitor and inductance of the resonance coil.

The controller 200 outputs at least one control signal con in response to a request signal req. The controller 200 adjusts a duty cycle and/or a frequency of the control signal con in response to the request signal req. The request signal req may be input from the wireless power receiver 2, and may represent an amount of power required by the wireless power receiver 2. For example, the request signal req is a signal requesting an amount of power wirelessly transmitted by the wireless power transmitter 1 to increase, or is a signal requesting the amount of power to decrease. Alternatively, the request signal req may be a signal representing a difference between the amount of power required by the wireless power receiver 2 and an amount of power actually received by the wireless power receiver 2. The controller 200 determines whether to increase or decrease the amount of transmitted power based on the request signal req, and may adjust any one or any combination of any two or more of an operating frequency, an operating duty cycle, and an inverter duty cycle accordingly.

For example, the controller 200 adjusts the operating frequency in the normal mode, and adjusts the operating duty cycle and/or the inverter duty cycle, adjusts the operating duty cycle and the operating frequency, or adjusts the inverter duty cycle and the operating frequency in the boost mode or the reduction mode. For example, in the normal mode, the controller 200 decreases the frequency when a distance between the wireless power receiver and the wireless power transmitter is increased, and increases the frequency when the distance is decreased. In addition, in the boost mode or the reduction mode, the controller 200 increases the operating duty cycle and/or the inverter duty cycle when the distance between the wireless power receiver and the wireless power transmitter is increased, and decreases the operating duty cycle and/or the inverter duty cycle when the distance is decreased.

As an example, when the operating frequency corresponds to a lowest reference frequency and a normal mode operation is performed, if the request signal received from the wireless power receiver 2 is the signal requesting the amount of power to increase, the controller 200 performs controlling so that the operation mode is switched from the normal mode to the boost mode.

As another example, when the operating duty cycle corresponds to a lowest reference duty cycle and a boost mode operation is performed, if the request signal received from the wireless power receiver is the signal requesting the amount of power to decrease, the controller 200 performs controlling so that the operation mode is switched from the boost mode to the normal mode.

A detailed operation of the controller 200 and controllers 201~209, according to additional embodiments, will be described below with reference to FIGS. 17 through 53D.

As shown in FIG. 7, controller 200 includes at least one processor 200a. According to an embodiment, the controller 200 further includes a memory 200b. The processor 200a may include a central processing unit (CPU), a graphics processing unit (GPU), a microprocessor, an application specific integrated circuit (ASIC), and/or field programmable gate arrays (FPGAs), and may have multiple cores. The memory 200b may be a volatile memory (e.g., a random access memory (RAM)), a non-volatile memory (e.g., a read only memory (ROM) or a flash memory), or a combination thereof. A program including instructions configured to perform a wireless power transmission method is stored in the memory.

The controller 200 may include a gate driver. Alternatively, the wireless power transmitter 1 may separately include the gate driver for driving switches included in the converter 110 according to the control signal con provided by the controller 200.

The input power source 300 outputs the input voltage Vin. For example, the input power source 300 is an adapter that converts an alternating current (AC) voltage input from the outside into a direct current (DC) voltage and outputs the converted DC voltage. A level of the input voltage Vin output from the input power source 300 may be one of various voltage levels which are standardized in a wireless power transmission and reception system. For example, the input voltage is any one of 5V, 9V, and 12V.

Figure 8:
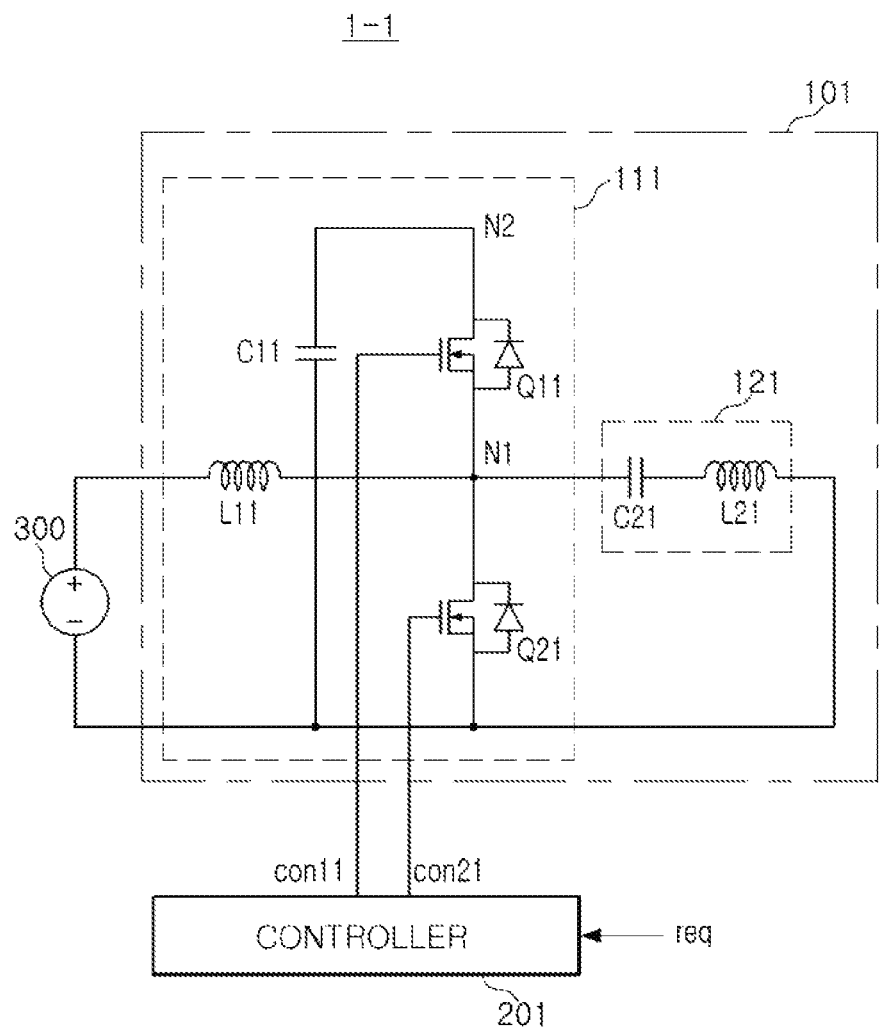

FIG. 8 is a diagram schematically illustrating a configuration of a wireless power transmitter 1-1 including a circuit unit 101 and a controller 201, according to an embodiment. The circuit unit 101 includes a converter 111 and a resonator 121. The converter 111 includes switching elements Q11 and Q21, a first coil L11, and a first capacitor C11. The resonator 121 includes a second capacitor C21 and a second coil L21. The wireless power transmitter 1-1 further includes the power source 300.

A function of each of the circuit unit 101, the converter 111, the resonator 121, the controller 201, and the input power source 300 is substantially the same as that of each of the circuit unit 100, the converter 110, the resonator 120, the controller 200, and the input power source 300 described in FIG. 7.

An amplitude of the AC voltage output from the converter 111 is determined according to magnitude of a voltage of a second node N2, that is, a boost voltage. The magnitude of the boost voltage Vboost is determined, for example, by Equation 1.

$$V\text{boost} = V\text{in}/(1-D) \quad \text{[Equation 1]}$$

In Equation 1, Vin is a magnitude of a voltage of power input from the input power source 300, and D is an on-duty cycle of a second control signal con21, as an operating duty cycle.

For example, the operating duty cycle in the boost mode is greater than the operating duty cycle in the normal mode. Therefore, a boost voltage in the boost mode is greater than a boost voltage in the normal mode, and consequently, an amount of power transmitted by the wireless power transmitter 1-1 in the boost mode is greater than an amount of power transmitted by the wireless power transmitter 1-1 in the normal mode.

In addition, a voltage of a first node N1 may be the AC voltage output from the converter 111, and the AC voltage Vinv(t) output from the converter 111 is determined, for example, by Equation 2.

$$V\text{inv}(t) = 2(V\text{in}/(1-D))\sin(wt/\pi) \quad \text{[Equation 2]}$$

In Equation 2, w is a frequency of a first control signal con11 and the second control signal con21.

The first coil L11 is connected between a terminal to which the input voltage is applied and the first node N1. The first switching element Q11 is connected between the first node N1 and the second node N2. The second switching element Q21 is connected between the first node N1 and a ground terminal. The first capacitor C11 is connected between the second node N2 and the ground terminal. The AC voltage generated by the converter 111 is output to the first node N1. The voltage of the second node N2 is a boost voltage obtained by boosting the input voltage by the converter 111. The first switching element Q11 is turned on or off in response to the first control signal con11, and the second switching element Q21 is turned on or off in response to the second control signal con21. In addition, the first switching element Q11 and the second switching element Q21 are turned on or off complementarily (e.g., together) with each other.

In other words, the converter 111 includes a bridge circuit, and the bridge circuit may include the first switch Q11 and the second switch Q21, connected in series with each other and are alternately operated. One terminal of the inductor L11 is connected to one terminal of the input power source 300, and the other terminal of the inductor L11 is connected to a connection terminal (node N1) between the first and second switches. One terminal of the output capacitor C11 is connected to one terminal of a half-bridge circuit, and the other terminal of the output capacitor C11 is connected to the other terminal of the input power source 300 and the other terminal of the half-bridge circuit.

That is, the converter 111 simultaneously performs a function as the boost converter that boosts the input voltage to the boost voltage, and a function as the inverter converting the DC voltage into the AC voltage. Specifically, the switching elements Q11 and Q21, the first capacitor C11, and the first coil L11 are operated as the boost converter. In addition, the switching elements Q11 and Q21 are also operated as the inverter. In other words, the converter 111 includes a boost inverter having a form in which the boost converter and the inverter are coupled to each other and commonly use the switching elements Q11 and Q21.

More specifically, charges are accumulated in the first capacitor C11 by the switching operation of the switching elements Q11 and Q21 configuring the half-bridge circuit, such that a voltage across the first capacitor C11 becomes the boost voltage obtained by boosting the input voltage provided by the input power source 300, and the magnitude of the boost voltage is determined by the duty cycle of the control signals con11 and con21. In addition, the AC voltage generated by using the boost voltage accumulated in the output capacitor C11 is applied across the resonator 121 by the switching operation of the switching elements Q11 and Q21 forming the half-bridge circuit, the amplitude of the AC voltage is determined by the magnitude of the boost voltage, and the frequency of the AC voltage is determined by the frequency of the control signals con11 and con21.

The switching operation of the switching elements Q11 and Q21 is controlled differently according to the modes of the wireless power transmitter.

The resonator 121 includes the second capacitor C21 and the second coil L21, connected in series between the first node N1 and the ground terminal. The second capacitor C21 is the resonance capacitor, the second coil L21 is the resonance coil, and an LC resonance is generated by the second capacitor C21 and the second coil L21. Therefore, the resonance frequency f_r (FIG. 6) of the resonator 121 is determined by capacitance of the second capacitor C21 and inductance of the second coil L21. That is, the capacitance of the second capacitor C21 and the inductance of the second coil L21 are determined according to a general environment in which the wireless power transmitter 1-1 is used, for example, a wireless power transmission standard, and a frequency range of the control signals con11 and con21 is determined according to the resonance frequency determined according to the determined capacitance and inductance.

The controller 201 outputs the control signals con11 and con21 in response to the request signal req. The controller 201 adjusts a duty cycle and/or a frequency of the control signals con11 and con21 in response to the request signal req.

Figure 9:
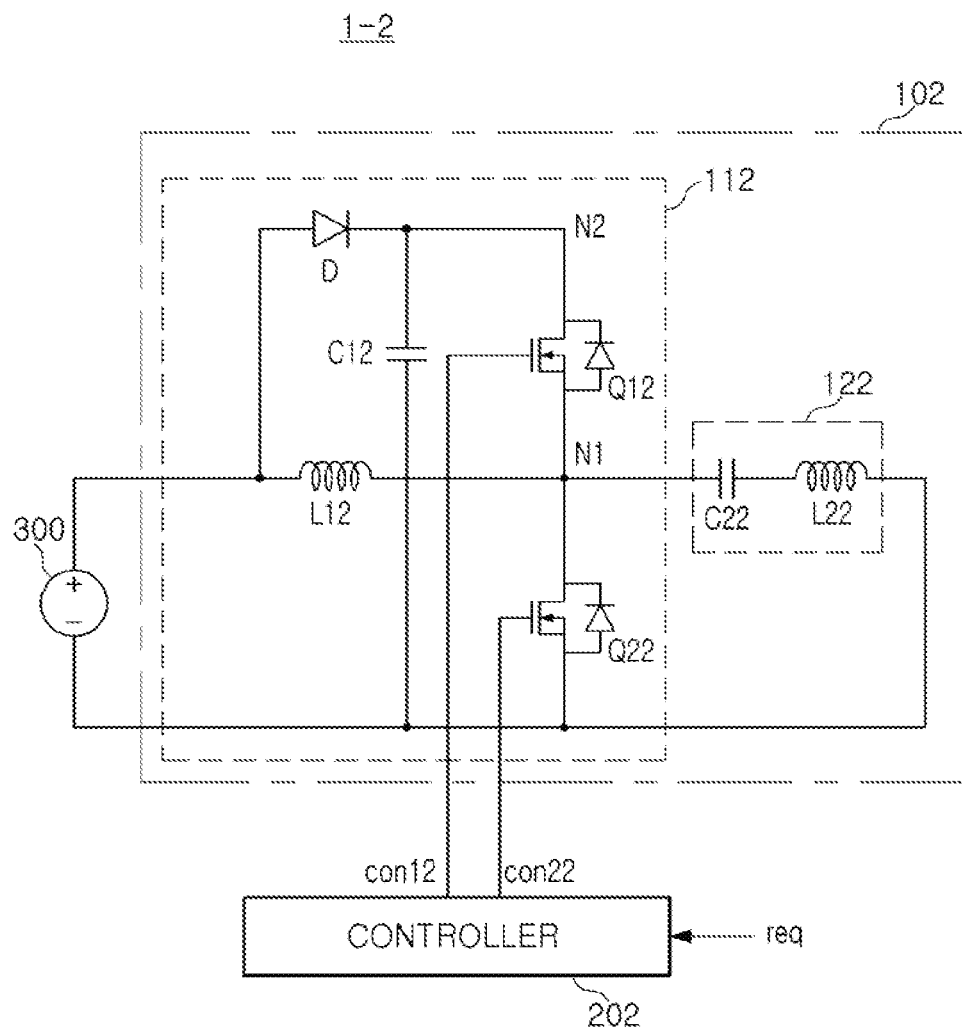

FIG. 9 is a diagram schematically illustrating a configuration of a wireless power transmitter 1-2 including a circuit unit 102 and a controller 202, according to an embodiment. The circuit unit 102 includes a converter 112 and a resonator 122. The converter 112 includes switching elements Q12 and Q22, a first coil L12, a first capacitor C12, and a diode D. The resonator 122 includes a second capacitor C22 and a second coil L22. The wireless power transmitter 1-2 further includes the power source 300.

A function of each of the circuit unit 102, the converter 112, the resonator 122, the controller 202, and the input power source 300 is substantially the same as that of each of the circuit unit 100, the converter 110, the resonator 120, the controller 200, and the input power source 300 described in FIG. 7. In addition, a configuration and an operation of the resonator 122 is the same as those of the resonator 121 described in FIG. 8.

The converter 112 includes the first coil L12 connected between a terminal to which the input voltage is applied and the first node N1, the first switching element Q12 connected between the first node N1 and the second node N2, the second switching element Q22 connected between the first node N1 and a ground terminal, the first capacitor C12 connected between the second node N2 and the ground terminal, and the diode D connected between the second node N2 and the terminal to which the input voltage is applied. The AC voltage generated by the converter 112 is output to the first node N1. The voltage of the second node N2 is a boost voltage obtained by boosting the input voltage by the converter 112. The first switching element Q12 is turned on or off in response to a first control signal con12, and the second switching element Q22 is turned on or off in response to a second control signal con22. In addition, the first switching element Q12 and the second switching element Q22 are turned on or off complementarily (e.g., together) with each other.

An operation of the converter 112 can be easily understood with reference to the operation of the converter 111 described in FIG. 8. In addition, as illustrated in FIG. 9, the converter 112 includes half-bridge circuits Q12 and Q22 that perform both the functions of the boost converter and the inverter. That is, the converter 112 includes the boost converter and the inverter, or includes a boost inverter having a form in which the boost converter and the inverter share the switching elements Q12 and Q22.

Since the converter 112 includes the diode D for preventing a reverse current flowing to the terminal to which the input voltage is applied from a boost node, the converter 112 prevents a ripple from being caused by a complementary switching operation of the first switching element Q12 and the second switching element Q22.

Figure 10:
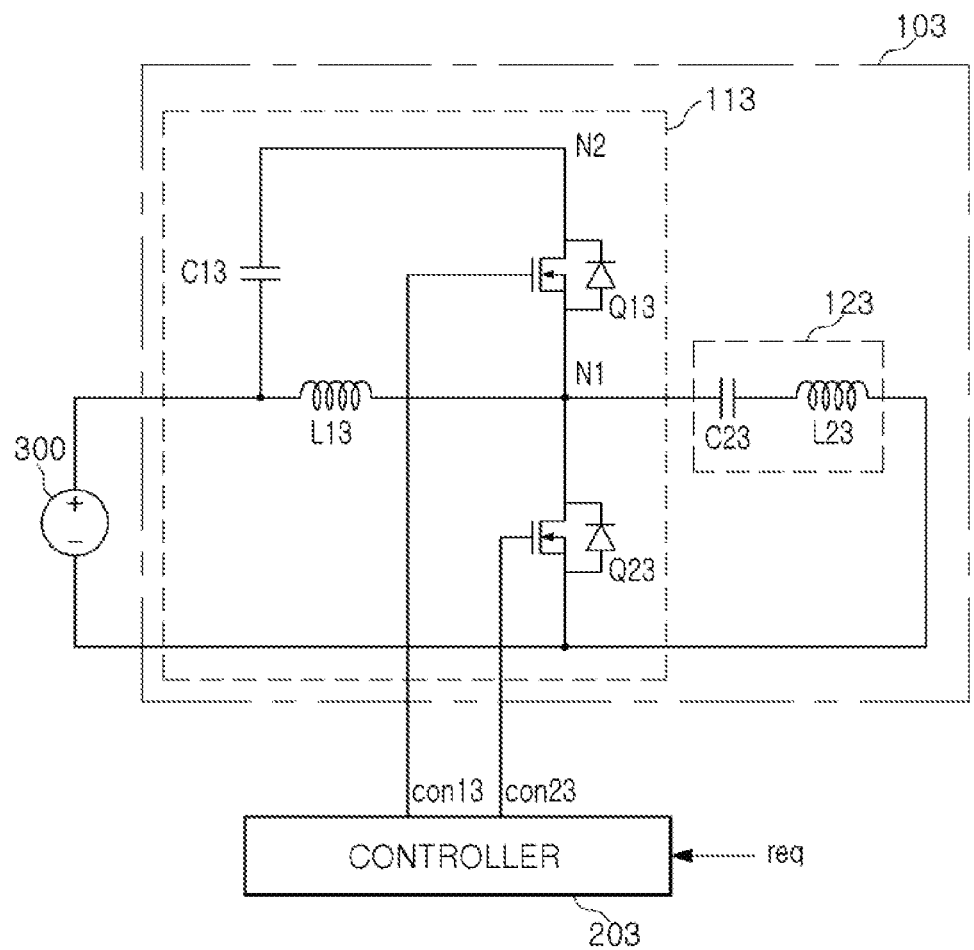

FIG. 10 is a diagram schematically illustrating a configuration of a wireless power transmitter 1-3 including a circuit unit 103 and a controller 203, according to an embodiment. The circuit unit 103 includes a converter 113 and a resonator 123. The converter 113 includes switching elements Q13 and Q23, a first coil L13 and a first capacitor C13. The resonator 123 includes a second capacitor C23 and a second coil L23. The wireless power transmitter 1-3 further includes the power source 300.

A function of each of the circuit unit 103, the converter 113, the resonator 123, the controller 203, and the input power source 300 is substantially the same as that of each of the circuit unit 100, the converter 110, the resonator 120, the controller 200, and the input power source 300 described in FIG. 7. In addition, a configuration and an operation of the resonator 122 is the same as those of the resonator 121 described in FIG. 8.

The converter 113 includes the first coil L13 connected between a terminal to which the input voltage is applied and the first node N1, the first switching element Q13 connected between the first node N1 and the second node N2, the second switching element Q23 connected between the first node N1 and a ground terminal, and the first capacitor C13 connected between the second node N2 and the terminal to which the input voltage is applied. The AC voltage generated by the converter 113 is output to the first node N1. The voltage of the second node N2 is a boost voltage obtained by boosting the input voltage by the converter 113. The first switching element Q13 is turned on or off in response to a first control signal con13, and the second switching element Q23 is turned on or off in response to a second control signal con23. In addition, the first switching element Q13 and the second switching element Q23 are turned on or off complementarily (e.g., together) with each other.

An operation of the converter 113 can be easily understood with reference to the operation of the converter 111 described in FIG. 8. In addition, as illustrated in FIG. 10, the converter 113 includes half-bridge circuits Q13 and Q23 that perform both the functions of the boost converter and the inverter. That is, the converter 113 includes the boost converter and the inverter, or includes a boost inverter having a form in which the boost converter and the inverter share the switching elements Q13 and Q23.

The converter 113 improves initial operation performance by causing an initial voltage of the first capacitor C13 to be the input voltage. In addition, the converter 113 prevents a ripple which may be caused when a boosting is performed by an alternative operation of the switching elements Q13 and Q23.

Figure 11:
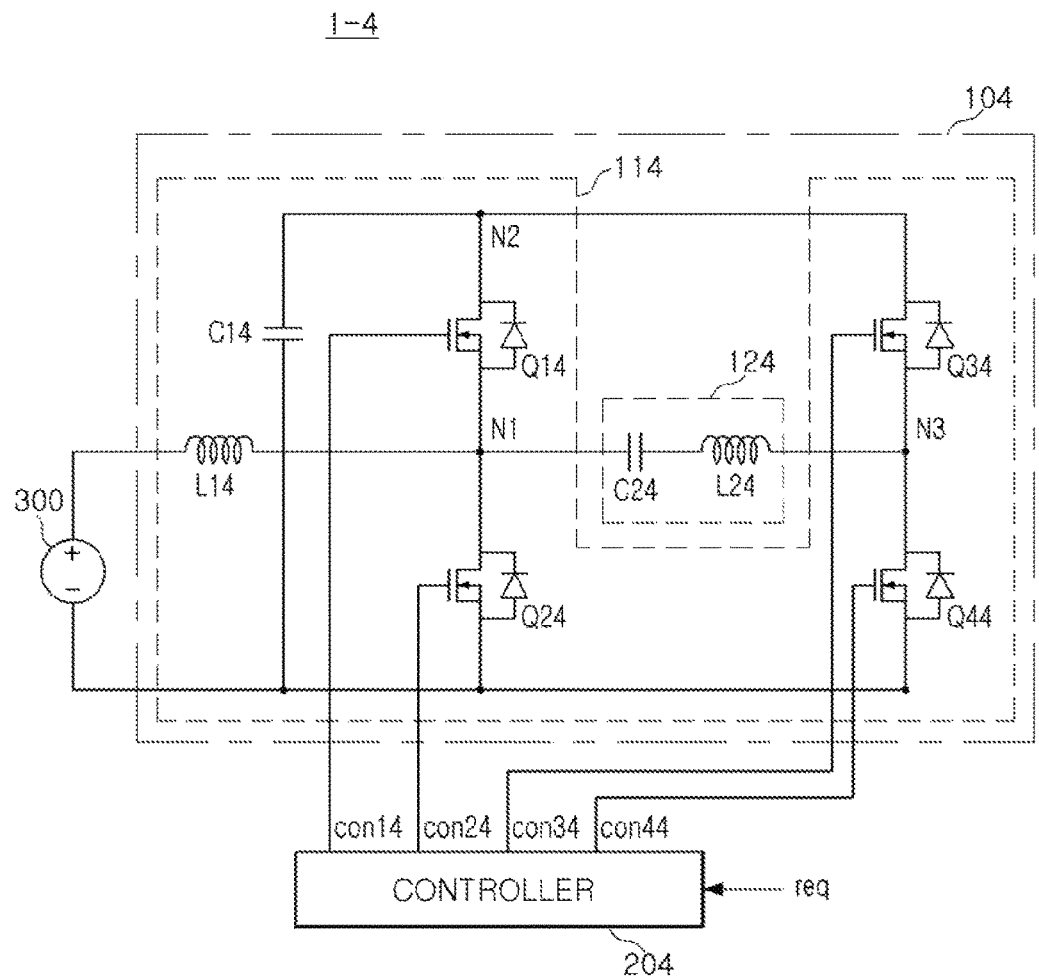

FIG. 11 is a diagram schematically illustrating a configuration of a wireless power transmitter 1-4 including a circuit unit 104 and a controller 204, according to an embodiment. The circuit unit 104 includes a converter 114 and a resonator 124. The converter 114 includes switching elements Q14, Q24, Q34, and Q44, a first coil L14, and a first capacitor C14. The resonator 124 includes a second capacitor C24 and a second coil L24. The wireless power transmitter 1-4 further includes the power source 300.

A function of each of the circuit unit 104, the converter 114, the resonator 124, the controller 204, and the input power source 300 is substantially the same as that of each of the circuit unit 100, the converter 110, the resonator 120, the controller 200, and the input power source 300 described in FIG. 7. In addition, a configuration and an operation of the resonator 122 is the same as those of the resonator 121 described in FIG. 8.

The converter 114 includes the first coil L14 connected between a terminal to which the input voltage is applied and the first node N1, the first switching element Q14 connected between the first node N1 and the second node N2, the second switching element Q24 connected between the first node N1 and a ground terminal, the third switching element Q34 connected between the second node N2 and a third node N3, the fourth switching element Q44 connected between the third node N3 and a ground node, and the first capacitor C14 connected between the second node N2 and the ground node. A voltage between the first node N1 and the third node N3 is the AC voltage generated by the converter 114. The voltage of the second node N2 is a boost voltage obtained by boosting the input voltage by the converter 114. The first switching element Q14 is turned on or off in response to a first control signal con14. The second switching element Q24 is turned on or off in response to a second control signal con24. The third switching element Q34 is turned on or off in response to a third control signal con34. The fourth switching element Q44 may be turned on or off in response to a fourth control signal con44. In addition, the first switching element Q14 and the second switching element Q24 may be turned on or off complementarily with each other, and the third switching element Q34 and the fourth switching element Q44 are turned on or off complementarily (e.g., together) with each other. The third switching element Q34 maintains an OFF state, or is turned on or off at the same timing as the second switching element Q24, or is turned on or off regardless of the state of the second switching element Q24. The fourth switching element Q44 maintains an ON state, or may be turned on or off at the same timing as the first switching element Q14, or is turned on or off regardless of the state of the first switching element Q14. For example, an on-duty cycle of the third switching element Q34 is the same as the on-duty cycle of second switching element Q24, or may be different therefrom.

The resonator 124 is connected between the first node N1 and the third node N3.

That is, the converter 114 is implemented as a full-bridge circuit. In some cases, the third switching element Q34 maintains the OFF state and the fourth switching element Q44 maintains the ON state, such that the converter is operated in the same manner as the half-bridge circuit, and the third switching element Q34 is turned on or off at the same timing as the second switching element Q24, and the fourth switching element Q44 is turned on or off at the same timing as the first switching element Q14, such that the converter 114 is operated in the same manner as the full-bridge circuit. In some cases, each of the third switching element Q34 and the fourth switching element Q44 is turned on or off at a timing different from that of each of the second switching element Q24 and the first switching element Q14, and the converter 114 is operated as the full-bridge circuit.

In an embodiment illustrated in FIG. 11, the first coil L14, the first capacitor C14, the first switching element Q14, and the second switching element Q24 are operated as the boost converter, and the first switching element Q14, the second switching element Q24, the third switching element Q34, and the fourth switching element Q44 are operated as the inverter. That is, the first switching element Q14 and the second switching element Q24 are operated as the boost converter and are simultaneously operated as the inverter. In other words, the converter 114 of FIG. 11 includes a boost inverter having a form in which the boost converter and the inverter sharing the first switching element Q14 and the second switching element Q24 are coupled to each other.

A time at which an output voltage of the converter 114 is applied to the resonator 124 is determined by an ON/OFF timing of the switching elements Q14, Q24, Q34 and Q44. For example, when both the first switching element Q14 and the fourth switching element Q44 are turned on, or both the second switching element Q24 and the third switching element Q34 are turned on, an output voltage of the converter 114 is applied to the resonator 124. A voltage applied to the resonator 124 in the case in which the first switching element Q14 and the fourth switching element Q44 are both in an ON state, and a voltage applied to the resonator 124 in the case in which the second switching element Q24 and the third switching element Q34 are both in an ON state, have opposite signs. An inverter duty cycle, determining a time at which an output voltage of the converter 114 is applied to the resonator 124, is defined by a ratio of a sum of a first time at which the first switching element Q14 and the fourth switching element Q44 are both in an ON state, and a second time at which the second switching element Q24 and the third switching element Q34 are both in an ON state, in operating cycles of the switching elements Q14, Q24, Q34 and Q44.

For example, when the inverter duty cycle is 100%, an output voltage Vinv(t) of the converter 114 of the wireless power transmitter 1-4 of FIG. 11, that is, a voltage between the first node N1 and the third node N3 is determined by Equation 3.

$$Vinv(t)=4(Vin/(1-D))\sin(wt/\pi) \qquad \text{[Equation 3]}$$

In Equation 3, Vin is a magnitude of a voltage of power input from the input power source 300, D is a duty cycle of a control signal con24, as an operating duty cycle, and w is a frequency of control signals con14, con24, con34, and con44.

That is, according to the embodiment of FIG. 11, since the same effect as that of the input voltage being doubled is obtained as compared to the half-bridge circuit, current stress of the coil is reduced, and efficiency is also improved.

Figure 12:
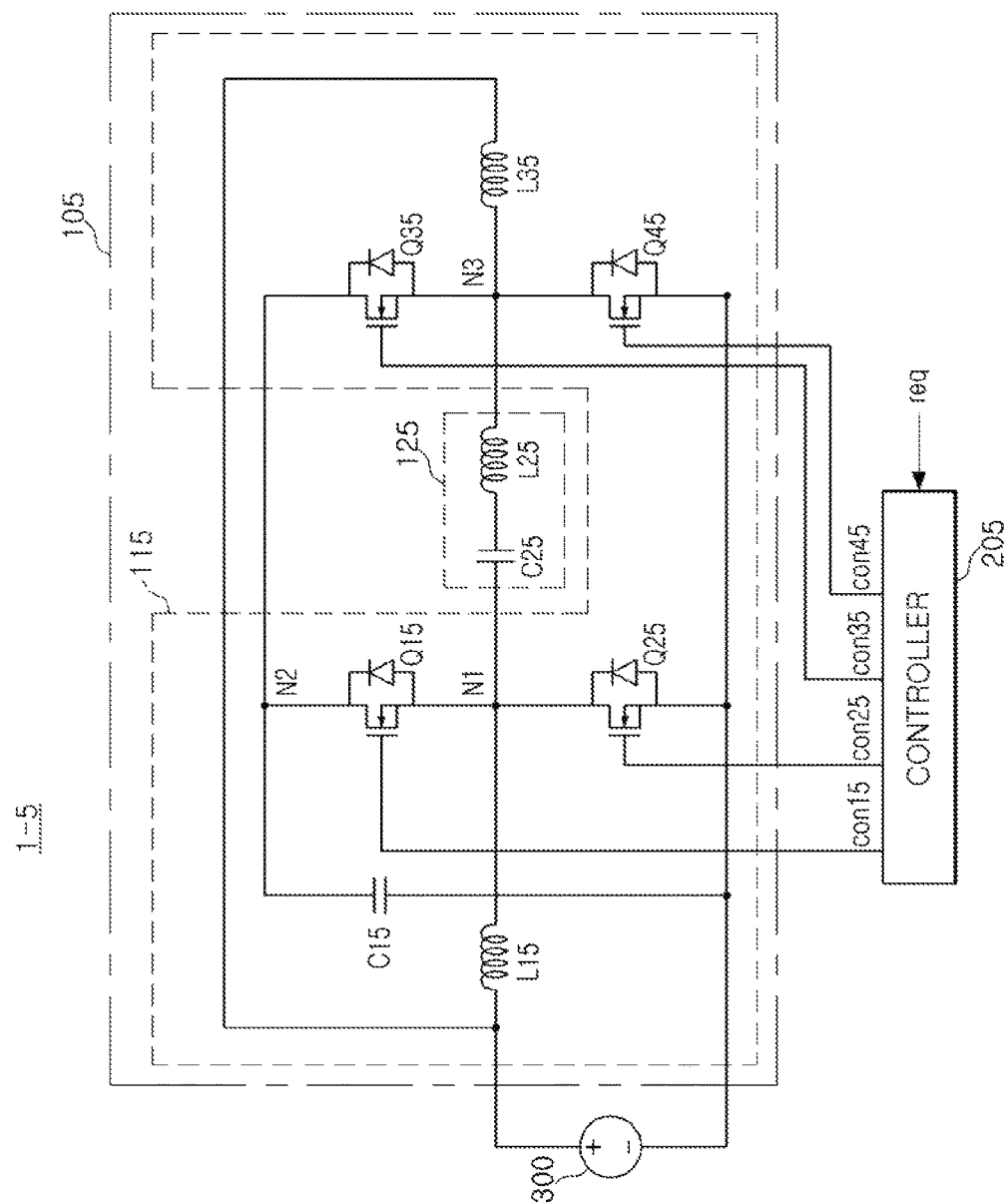

FIG. 12 is a diagram schematically illustrating a configuration of a wireless power transmitter 1-5 including a circuit unit 105 and a controller 205, according to an embodiment. The circuit unit 105 includes a converter 115 and a resonator 125. The converter 115 may include switching elements Q15, Q25, Q35, and Q45, a first coil L15, a third coil L35, and a first capacitor C15. The resonator 125 includes a second capacitor C25 and a second coil L25. The wireless power transmitter 1-5 further includes the power source 300.

A function of each of the circuit unit 105, the converter 115, the resonator 125, the controller 205, and the input power source 300 is substantially the same as that of each of the circuit unit 100, the converter 110, the resonator 120, the controller 200, and the input power source 300 described in FIG. 7. In addition, a configuration and an operation of the resonator 125 are the same as those of the resonator 121 described in FIG. 8.

The converter 115 includes the first coil L15 connected between a terminal to which the input voltage is applied and the first node N1, the first switching element Q15 connected between the first node N1 and the second node N2, the second switching element Q25 connected between the first node N1 and a ground terminal, the third switching element Q35 connected between the second node N2 and a third node N3, the fourth switching element Q45 connected between the third node N3 and a ground node, the third coil L35 connected between the terminal to which the input voltage is applied and the third node N3, and the first capacitor C15 connected between the second node N2 and the ground node. A voltage between the first node N1 and the third node N3 is the AC voltage generated by the converter 115. The voltage of the second node N2 is a boost voltage obtained by boosting the input voltage by the converter 115. The first switching element Q15 is turned on or off in response to a first control signal con15. The second switching element Q25 is turned on or off in response to a second control signal con25. The third switching element Q35 is turned on or off in response to a third control signal con35. The fourth switching element Q45 is turned on or off in response to a fourth control signal con45. In addition, the first switching element Q15 and the second switching element Q25 are turned on or off complementarily (e.g., together) with each other, and the third switching element Q35 and the fourth switching element Q45 are turned on or off complementarily (e.g., together) with each other. The third switching element Q35 maintains an OFF state, or is turned on or off at the same timing as the second switching element Q25, or is turned on or off regardless of the state of the second switching element Q25. The fourth switching element Q45 maintains an ON state, or is turned on or off at the same timing as the first switching element Q15, or is turned on or off regardless of the state of the first switching element Q15. For example, an on-duty cycle of the third switching element Q35 is the same as or different from an on-duty cycle of the second switching element Q25.

The resonator 125 is connected between the first node N1 and the third node N3.

That is, the converter 115 is implemented as a full-bridge circuit. In some cases, the third switching element Q35 maintains the OFF state and the fourth switching element Q45 maintains the ON state, such that the converter is operated in the same manner as the half-bridge circuit, and the third switching element Q35 is turned on or off at the same timing as the second switching element Q25, and the fourth switching element Q45 is turned on or off at the same timing as the first switching element Q15, such that the converter 115 is operated in the same manner as the full-bridge circuit. In some cases, each of the third switching element Q35 and the fourth switching element Q45 is turned on or off at a timing different from that of each of the second switching element Q25 and the first switching element Q15, and the converter 115 is operated as the full-bridge circuit.

In the embodiment illustrated in FIG. 12, the first coil L15, the third coil L25, the first capacitor L15, the first switching element C15, the second switching element Q25, the third switching element Q35, and the fourth switching element Q45 are operated as the boost converter, and the first switching element Q15, the second switching element Q24, the third switching element Q35, and the fourth switching element Q45 are operated as the inverter. That is, the first switching element Q15, the second switching element Q24, the third switching element Q35, and the fourth switching element Q45 are operated as the boost converter and are simultaneously operated as the inverter. In other words, the converter 115 of FIG. 11 includes a boost inverter having a form in which the boost converter and the inverter sharing the first switching element Q15, the second switching element Q24, the third switching element Q35, and the fourth switching element Q45 are coupled to each other.

According to the embodiment of FIG. 12, since the converter 115 is operated as the full-bridge circuit to obtain the same effect as that of the input voltage being doubled as compared to the half-bridge circuit, current stress of the coil is reduced, and efficiency is also improved. In addition, since the third switching element Q35 and the fourth switching element Q45 also contribute to boosting the input voltage, a capacitor having lower capacitance is also used as the first capacitor C15.

Figure 13:
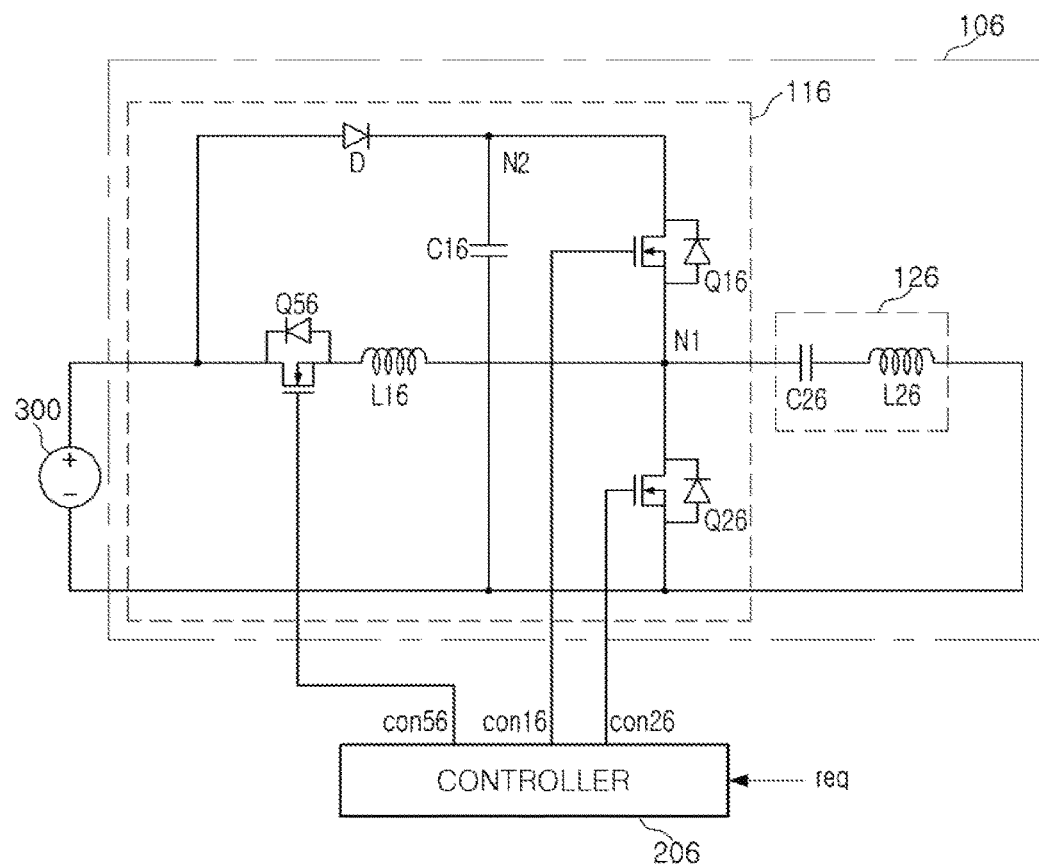

FIG. 13 is a diagram schematically illustrating a configuration of a wireless power transmitter 1-6 including a circuit unit 106 and a controller 206, according to an embodiment. The circuit unit 106 includes a converter 116 and a resonator 126, the converter 116 includes switching elements Q16, Q26, and Q56, a first coil L16, a first capacitor C16, and a diode D. The resonator 126 includes a second capacitor C26 and a second coil L26. The wireless power transmitter 1-6 further includes the power source 300.

A function of each of the circuit unit 106, the converter 116, the resonator 126, the controller 206, and the input power source 300 is substantially the same as that of each of the circuit unit 101, the converter 111, the resonator 121, the controller 201, and the input power source 300 described in FIG. 8. In addition, a configuration and an operation of the resonator 126 are the same as those of the resonator 121 described in FIG. 8.

The converter 116 includes the first coil L13 and a fifth switching element Q56 connected in series between a terminal to which the input voltage is applied and the first node N1, the first switching element Q16 connected between the first node N1 and the second node N2, the second switching element Q26 connected between the first node N1 and a ground terminal, the first capacitor C16 connected between the second node N2 and the ground terminal, and the diode D connected between the second node N2 and the terminal to which the input voltage is applied. The AC voltage generated by the converter 116 is output to the first node N1. The voltage of the second node N2 is a boost voltage obtained by boosting the input voltage by the converter 116. The first switching element Q16 is turned on or off in response to a first control signal con16. The second switching element Q26 is turned on or off in response to a second control signal con22. The fifth switching element Q56 is turned on or off in response to a fifth control signal con56. In addition, the first switching element Q16 and the second switching element Q26 are turned on or off complementarily (e.g., together) with each other.

An operation of the converter 116 can be easily understood with reference to the operation of the converter 111 described in FIG. 8. In addition, as illustrated in FIG. 13, the converter 116 includes half-bridge circuits Q16 and Q26 that perform both the functions of the boost converter and the inverter. That is, the converter 116 includes the boost converter and the inverter, or includes a boost inverter having a form in which the boost converter and the inverter share the switching elements Q16 and Q26.

The fifth switching element Q56 is turned on or off according to the magnitude of the input voltage input from the input power source 300. For example, when the magnitude of the input voltage is a reference value or less, the fifth switching element Q56 is turned on, and when the magnitude of the input voltage is greater than the reference value, the fifth switching element Q56 is turned off. When the fifth switching element Q56 is turned off, the converter 116 does not function as the boost converter, and functions only as the inverter.

Therefore, according to the embodiment of FIG. 13, since the function of the converter 116 varies depending on the magnitude of the input voltage, the power is more efficiently transmitted.

Although not illustrated, the fifth switching element Q56 may also be added to each of the embodiments of FIGS. 8, 10, 11, and 12. In addition, the diode D of FIG. 9 may also be added to the embodiments of FIGS. 11 and 12. In addition, the first capacitor C14 and C15 according to the embodiments of FIGS. 11 and 12 may be connected in the same manner as the first capacitor C13 according to the embodiment of FIG. 10.

Figure 14:
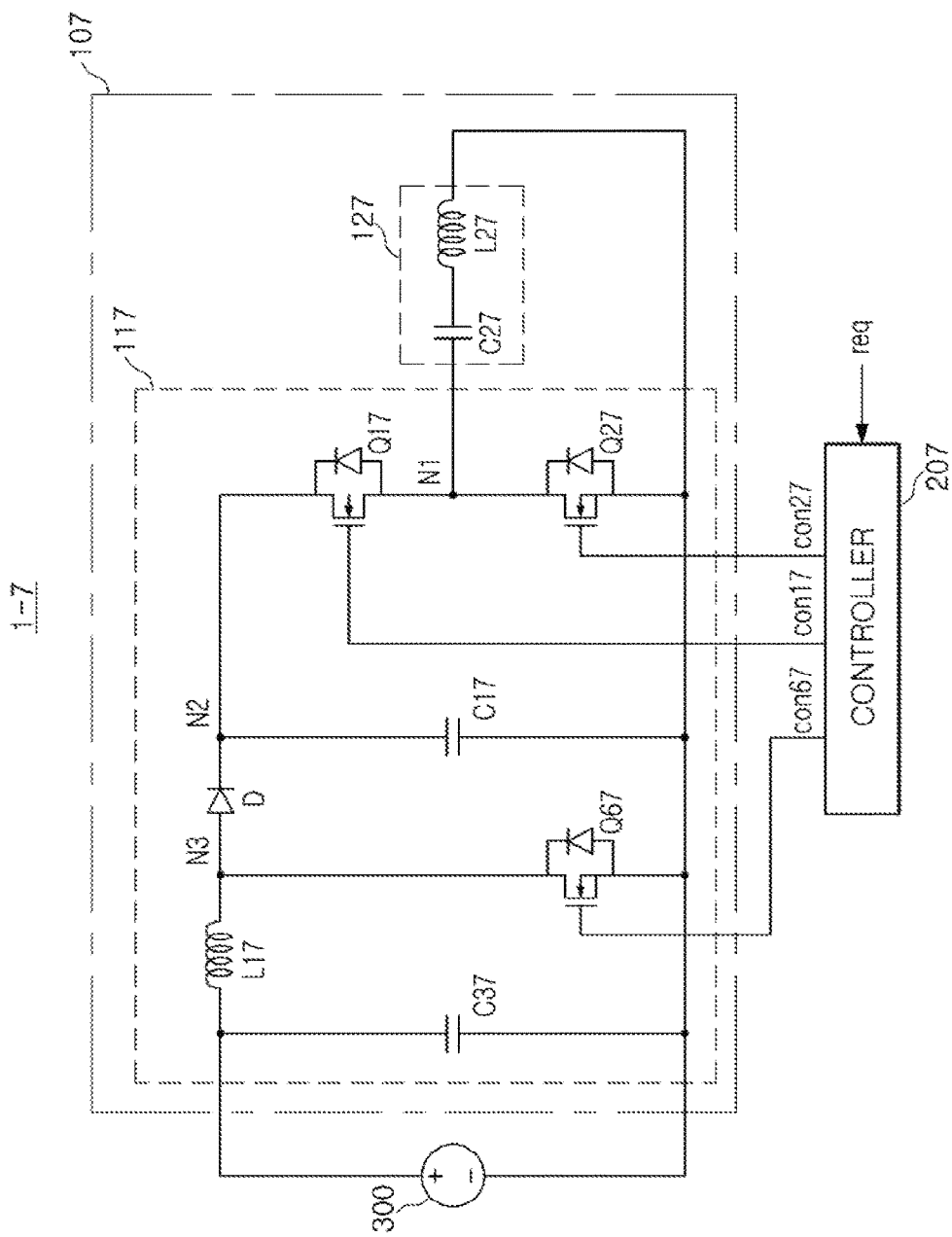

FIG. 14 is a diagram schematically illustrating a configuration of a wireless power transmitter 1-7 including a circuit unit 107 and a controller 207, according to an embodiment. The circuit unit 107 includes a converter 117 and a resonator 127. The converter 117 may include switching elements Q17, Q27, and Q67, a first coil L17, a first capacitor C17, a diode D, and a third capacitor C37. The resonator 127 includes a second capacitor C27 and a second coil L27. The wireless power transmitter 1-7 further includes the power source 300.

A function of each of the circuit unit 107, the converter 117, the resonator 127, the controller 207, and the input power source 300 is substantially the same as that of each of the circuit unit 100, the converter 110, the resonator 120, the controller 200, and the input power source 300 described in FIG. 7. In addition, a configuration and an operation of the resonator 127 are the same as those of the resonator 121 described in FIG. 8.

The converter 117 includes the first coil L17 connected between a terminal to which the input voltage is applied and the third node N3, the third capacitor C37 connected between the terminal to which the input voltage is applied and a ground terminal, the sixth switching element Q67 connected between the third node N3 and the ground terminal, the diode D connected between the third node N3 and the second node N2, the first capacitor C17 connected between the second node N2 and the ground terminal, the first switching element Q12 connected between the first node N1 and the second node N2, and the second switching element Q22 connected between the first node N1 and the ground terminal. The AC voltage generated by the converter 117 is output to the first node N1. The voltage of the second node N2 is a boost voltage obtained by boosting the input voltage by the converter 117. The first switching element Q17 is turned on or off in response to a first control signal con17. The second switching element Q27 is turned on or off in response to a second control signal con27. The sixth switching element Q67 may be turned on or off in response to a fifth control signal con67. In addition, the first switching element Q17 and the second switching element Q27 are turned on or off complementarily with each other.

According to the embodiment of FIG. 14, the duty cycle of the first switching element Q17 and the second switching element Q27 are fixed. That is, an amount of power received by the wireless power receiver is adjusted by adjusting a duty cycle of the sixth switching element Q67, or adjusting an operating frequency of the first switching element Q17 and the second switching element Q27.

In FIG. 14, the first coil L17, the sixth switching element Q67, the diode D, and the first capacitor C17 are operated as the boost converter, and the first switching element Q17 and the second switching element Q27 are operated as the inverter. That is, the converter 117 of the wireless power transmitter 1-7 includes the boost converter and the inverter similar to that illustrated in FIG. 14.

Although FIG. 14 illustrates the case in which the converter 117 includes the half-bridge inverter, the converter 117 may also include the boost converter and the full-bridge inverter.

Figure 15:
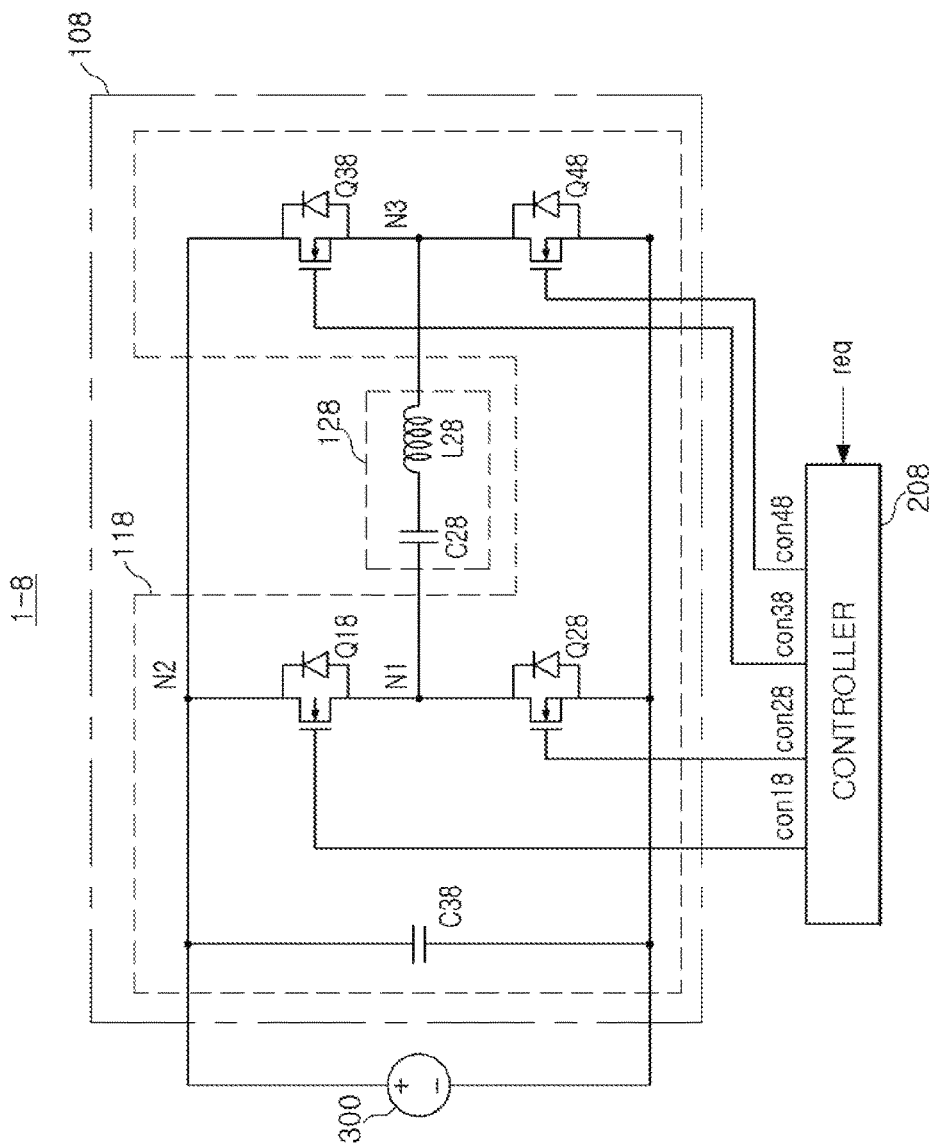

FIG. 15 is a diagram schematically illustrating a configuration of a wireless power transmitter 1-8 including a circuit unit 108 and a controller 208, according to an embodiment. The circuit unit 108 includes a converter 118 and a resonator 128. The converter 118 includes switching elements Q18, Q28, Q38, and Q48, and a third capacitor C38. The resonator 128 includes a second capacitor C28 and a second coil L28. The wireless power transmitter 1-8 further includes the power source 300.

A function of each of the circuit unit 108, the converter 118, the resonator 128, the controller 208, and the input power source 300 is substantially the same as that of each of the circuit unit 100, the converter 110, the resonator 120, the controller 200, and the input power source 300 described in FIG. 7. In addition, a configuration and an operation of the resonator 128 are the same as those of the resonator 121 described in FIG. 8.

The converter 118 includes the first switching element Q18 connected between the first node N1 and the second node N2, the second switching element Q28 connected between the first node N1 and a ground terminal, the third switching element Q38 connected between the second node N2 and the third node N3, the fourth switching element Q48 connected between the third node N3 and a ground node, and the third capacitor C38 connected between the second node N2 and the ground node. A voltage between the first node N1 and the third node N3 is the AC voltage generated by the converter 118. The input voltage output from the input power source 300 is applied to the second node N2. The first switching element Q18 is turned on or off in response to a first control signal con18. The second switching element Q28 is turned on or off in response to a second control signal con28. The third switching element Q38 is turned on or off in response to a third control signal con38. The fourth switching element Q48 is turned on or off in response to a fourth control signal con48. In addition, the first switching element Q18 and the second switching element Q28 are turned on or off complementarily (e.g., together) with each other, and the third switching element Q38 and the fourth switching element Q48 are turned on or off complementarily (e.g., together) with each other. The third switching element Q38 maintains an OFF state, or is turned on or off at the same timing as the second switching element Q28, and the fourth switching element Q48 maintains an ON state, or is turned on or off at the same timing as the first switching element Q18. In some cases, each of the third switching element Q38 and the fourth switching element Q48 is turned on or off at a timing different from that of each of the second switching element Q28 and the first switching element Q18. For example, an on-duty cycle of the third switching element Q38 is the same as or different from an on-duty cycle of the second switching element Q28.

The converter 118 may include only the inverter similar to that illustrated in FIG. 15. Although FIG. 15 illustrates the case in which the converter 118 includes the full-bridge inverter, the converter 118 may also include the half-bridge inverter.

Figure 16:
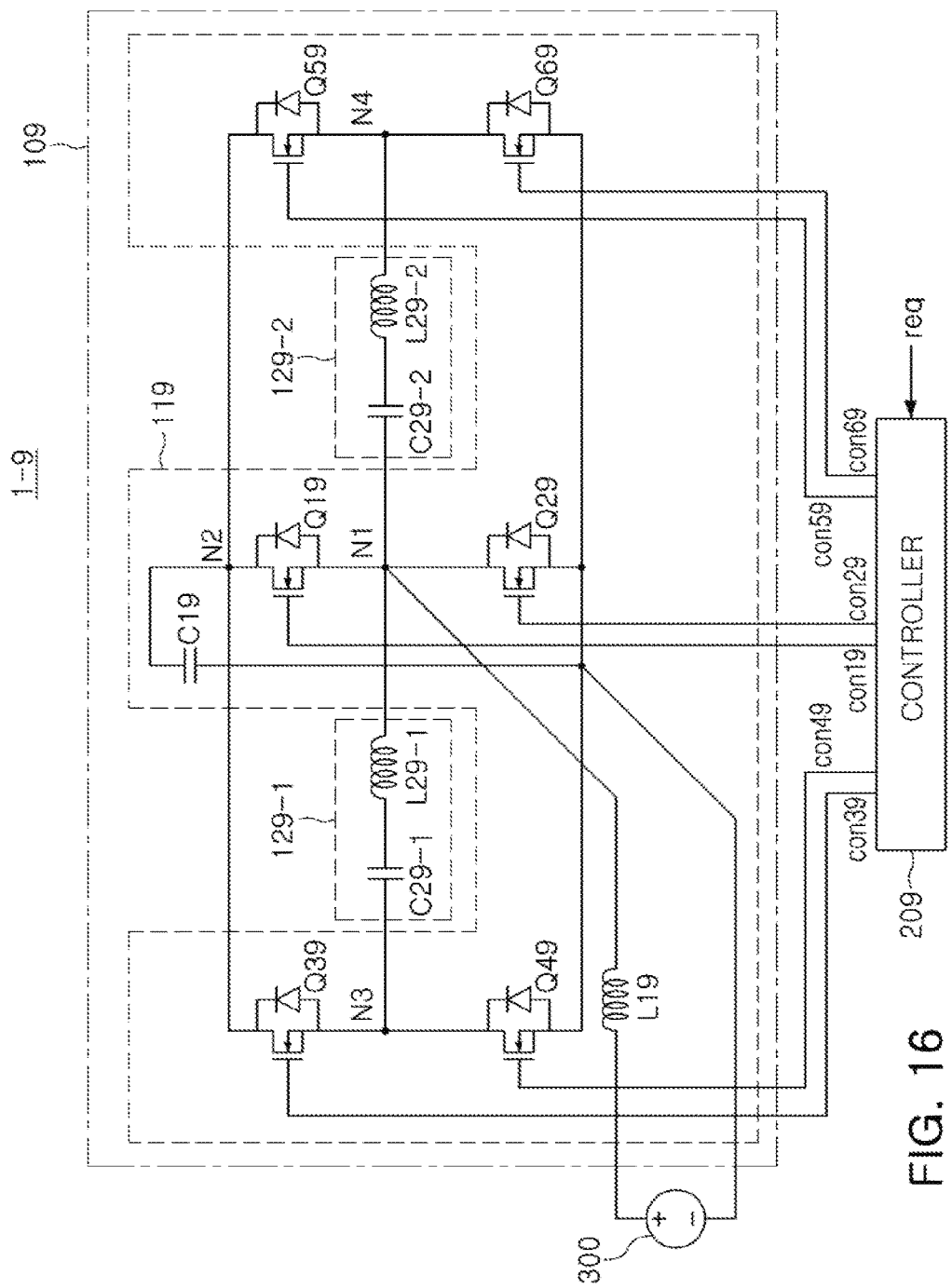

FIG. 16 is a diagram schematically illustrating a configuration of a wireless power transmitter 1-9 including a circuit unit 109 and a controller 209, according to an embodiment. The circuit unit 109 includes a converter 119, a first resonator 129-1, and a second resonator 129-2. The converter 119 includes switching elements Q19, Q29, Q39, Q49, Q59 and Q69, a first coil L19, and a first capacitor C19. The first resonator 129-1 includes a second capacitor C29-1 and a second coil L29-1, and the second resonator 129-2 includes a second capacitor C29-2 and a second coil L29-2. In FIG. 16, reference numeral 300 is an input power source.

Respective functions of the circuit unit 109, the converter 119, the first resonator 129-1, the second resonator 129-2, the controller 209, and the input power source 300 are substantially the same as the functions of the circuit unit 100, the converter 110, the resonator 120, the controller 200 and the input power source 300, respectively. The configurations and operations of the first resonator 129-1 and the second resonator 129-2 are the same as those of the resonator 121 described above with reference to FIG. 8.

The converter 119 includes a first coil L19 connected between a terminal to which an input voltage is applied, and a first node N1, a first switching element Q19 connected between the first node N1 and a second node N2, a second switching element Q29 connected between the first node N1 and a ground terminal, a third switching element Q39 connected between the second node N2 and a third node N3, a fourth switching element Q49 connected between the third node N3 and a ground node, a fifth switching element Q59 connected between the second node N2 and the fourth node N4, a sixth switching element Q69 connected between the fourth node N4 and the ground node, and a first capacitor C19 connected between the second node N2 and the ground node. A voltage between the first node N1 and the third node N3 and/or a voltage between the first node N1 and the fourth node N4 is an alternating current voltage generated by the converter 119. A voltage of the second node N2 is a boosted voltage provided as an input voltage is boosted by the converter 119. The first switching element Q19 is turned on or off in response to a first control signal con19, and the second switching element Q29 is turned on or off in response to a second control signal con29. The third switching element Q39 is turned on or off in response to a third control signal con39, and the fourth switching element Q49 is turned on or off in response to a fourth control signal con49. The fifth switching element Q59 is turned on or off in response to a fifth control signal con59, and the sixth switching element Q69 is turned on or off in response to a sixth control signal con69. In addition, the first switching element Q19 and the second switching element Q29 are turned on or off complementarily with each other, the third switching element Q39 and the fourth switching element Q49 are turned on or off complementarily with each other, and the fifth switching element Q59 and the sixth switching element Q69 are turned on or off complementarily with each other. The third switching element Q39 is maintained in an OFF state, is turned on or off at the same timing as the second switching element Q29, or is turned on or off regardless of the second switching element Q29. The fourth switching element Q49 is maintained in an ON state, is turned on or off at the same timing as the first switching element Q19, or is turned on or off regardless of the first switching element Q19. The fifth switching element Q59 is maintained in an OFF state, may be turned on or off at the same timing as the second switching element Q29, or is turned on or off irrespective of the second switching element Q29. The sixth switching element Q69 is maintained in an ON state, is turned on or off at the same timing as the first switching element Q19, or is turned on or off irrespective of the first switching element Q19. For example, an on-duty cycle of the third switching element Q39 and the second switching element Q29 are the same as or different from each other. The on-duty cycle of the fifth switching element Q59 and the second switching element Q29 are the same as or different from each other.

In some cases, the third switching element Q39 and the fourth switching element Q49 are maintained in an OFF state, or the fifth switching element Q59 and the sixth switching element Q69 are maintained in an OFF state.

The first resonator 129-1 is connected between the first node N1 and the third node N3. The second resonator 129-2 is connected between the first node N1 and the fourth node N4.

For example, because the wireless power transmitter 1-9 includes two resonators, a chargeable region is expanded. In addition, the wireless power transmitter 1-9 may also only transmit power wirelessly in a portion of the widened chargeable regions. The number of resonators may be further increased as required.

The wireless power transmitter illustrated in each of FIGS. 7 through 16 may be operated in a detection mode and a power transmission mode. The power transmission mode may include two or more of the normal mode, the boost mode, and the reduction mode.

Hereinafter, the detection mode will be described. The detection mode is a mode for determining whether an external object is approaching the wireless power transmitter or whether the approaching external object is the wireless power receiver, and corresponds to the analog ping phase and the digital ping phase described above.

In the detection mode, the wireless power transmitter transmits an analog ping signal to determine whether an external object is approaching and a digital ping signal to determine whether the approaching object is the wireless power receiver 2.

In this case, as described above, after the wireless power transmitter periodically transmits the analog ping signal, the wireless power transmitter transmits the digital ping signal when it is determined that the external object is approaching, or transmits the digital ping signal according to a set period.

Hereinafter, for convenience of explanation, the analog ping signal and the digital ping signal transmitted by the wireless power transmitter in the detection mode are collectively referred to as a ping signal.

The detection mode includes a first mode and a second mode. The first mode corresponds to an initial operation mode starting an operation to transmit the ping signal after a stop state for a reference time or more, such as a case in which turned-off power of the wireless power transmitter is switched to an ON state. The second mode corresponds to a standby operation mode for transmitting the ping signal in the stop state for less than the reference time, after the initial operation mode.

In the initial operation mode, the converter 111, 112, 113, 114, 115, 116, 117 and 119 (each of FIGS. 8 through 14 and FIG. 16) gradually boosts the input voltage, and stores boost power in the first capacitor C11, C12, C13, C14, C15, C16, C17, and C19 (each of FIGS. 8 through 14 and FIG. 16). The converter 111, 112, 113, 114, 115, 116, 117 and 119 eliminates a problem in which a predetermined ripple is caused in the boost power generated by the alternative switching by gradually boosting the input voltage.

The input voltage is gradually boosted by gradually increasing a duty cycle of a gate signal provided to the switching element Q21, Q22, Q23, Q24, Q25 (and/or Q45), Q26, Q27, and Q29 (each of FIGS. 8 through 14 and FIG. 16) of the converter 111, 112, 113, 114, 115, 116, 117, and 119 from a first duty cycle. It can be understood that the gradual increase of the duty cycle means that the duty cycle is repeatedly and sequentially increased from the specific duty cycle by a reference duty cycle.

As an example, a first duty cycle corresponds to a duty cycle increased from a duty cycle of 0% by the reference duty cycle. According to an embodiment, the first duty cycle is set as the duty cycle close to 0% to prevent the rapid boosting of the input power in a phase in which an operation starts, after the stop state for the reference time or more, whereby the problem in which the predetermined ripple is caused in the boost power may be effectively eliminated.

In an operation of boosting the input voltage by sequentially increasing the duty cycle from the first duty cycle close to the duty cycle of 0% by the reference duty cycle, the converter 111, 112, 113, 114, 115, 116, 117, and 119 (or the controller 201, 202, 103, 204, 205, 206, 207, and 209) calculates data regarding a voltage level of the boost power which is gradually boosted and a duty cycle corresponding to the voltage level. The data regarding the voltage level of the boost power which is gradually boosted and the duty cycle corresponding to the voltage level calculated by the converter 111, 112, 113, 114, 115, 116, 117, and 119 (or the controller 201, 202, 103, 204, 205, 206, 207, and 209) may be stored in a separate memory element.

In addition, when the voltage level of the boost power stored in the first capacitor C11, C12, C13, C14, C15, C16, C17, and C19 reaches a voltage level of target boost power, the converter 111, 112, 113, 114, 115, 116, and 119 outputs an AC voltage (or an alternating current) to transmit an ping signal through the resonator 120, 121, 122, 123, 124, 125, 126, 127, 128, 129-1 and 129-2 (each of FIGS. 7 through 15 and FIG. 16).

Even in a case in which various voltage levels are provided by the input power source 300, the converter 111, 112, 113, 114, 115, 116, 117, and 119 boosts the input voltage up to the target boost voltage. Therefore, even in a case in which the voltage level of the input voltage is varied, the converter 111, 112, 113, 114, 115, 116, 117, and 119 boosts the input voltage up to a set target boost voltage to decrease dependency on the input power source 300.

Figure 17:
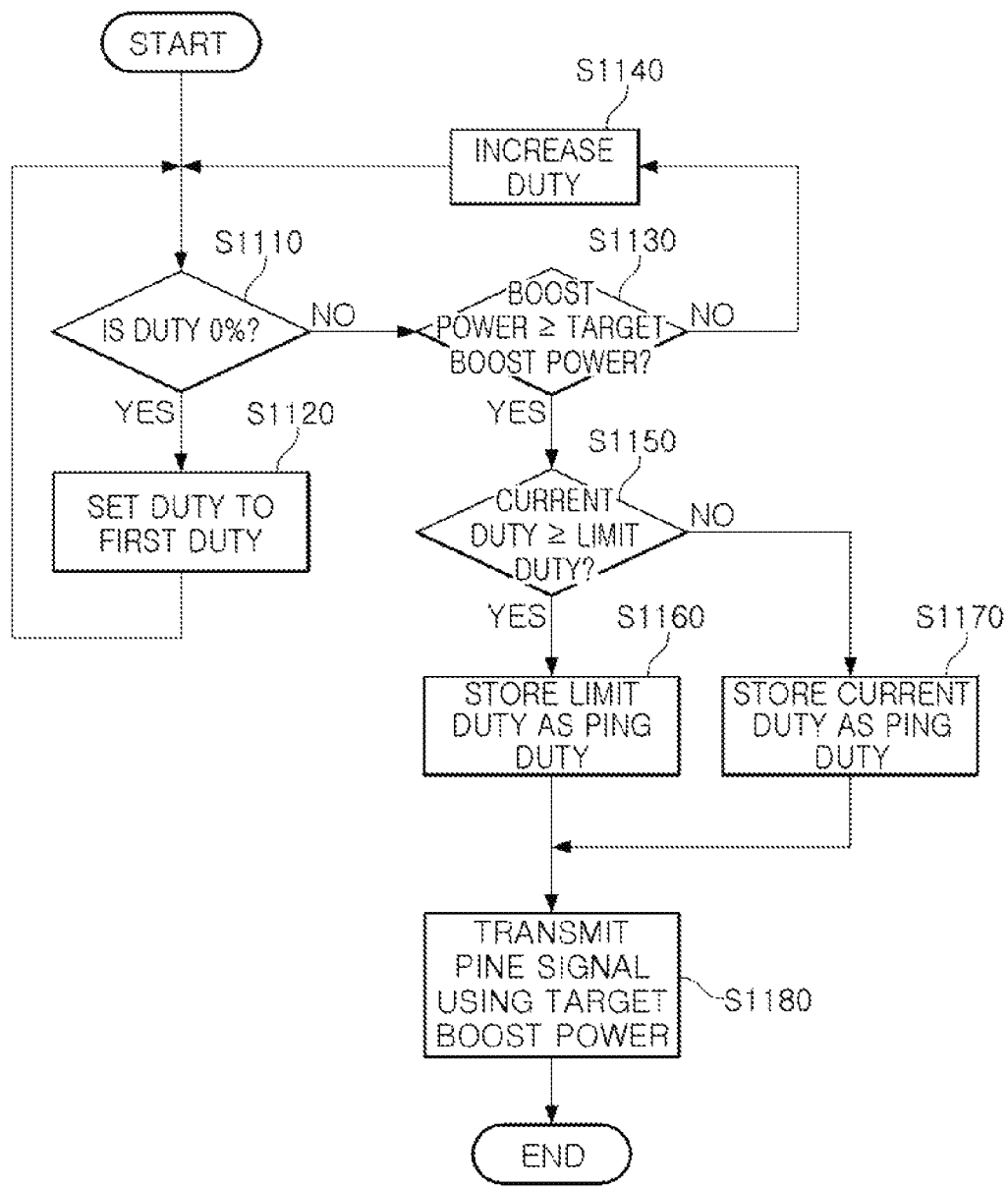
FIG. 17 is an operation flowchart illustrating operations in an initial operation mode of a wireless power transmitter or a wireless power transmission method, according to an embodiment.

FIG. 17 is an operation flowchart illustrating an operation in an initial operation mode of a wireless power transmitter or a wireless power transmission method, according to an embodiment.

Referring to FIG. 17, in operation S1110, the initial operation mode starts to determine whether a current duty cycle is a duty cycle of 0%. If the current set duty cycle is 0%, the duty cycle is set, in operation S1120, as the first duty cycle which is increased from the duty cycle of 0% by the reference duty cycle. If the current set duty cycle is not 0%, the boost power and the target boost power are compared with each other in operation S1130, and if, as a result of the comparison, it is determined that the boost power does not reach the target boost power, the duty cycle is increased by the reference duty cycle in operation S1140 to gradually boost the boost power. In contrast, if, as a result of the comparison, it is determined that the boost power reaches the target boost power, the current duty cycle and a limit duty cycle are compared with each other in operation S1150. The limit duty cycle corresponds to a maximum duty cycle which is allowed in the detection mode. By setting the limit duty cycle in the detection mode, excessive power consumption for transmission of the ping signal is prevented and a heating problem is eliminated. If, as a result of the comparison between the current duty cycle and the limit duty cycle, it is determined that the current duty cycle is higher than the limit duty cycle, the limit duty cycle is stored as a ping duty cycle corresponding to the target boost power in operation S1160, and if it is determined that the current duty cycle is lower than the limit duty cycle, the current duty cycle is stored as the ping duty cycle corresponding to the target boost power in operation S1170. Thereafter, the ping signal is transmitted using the target boost power in operation S1180, and the initial operation mode ends. Thereafter, after the initial operation mode ends, the wireless power transmitter enters the standby operation mode, or enters a power transmission mode according to a response signal of the wireless power receiver for the ping signal transmitted in the initial operation mode.

In the standby operation mode, the converter (or the controller) gradually increases the duty cycle from a second duty cycle to boost the input voltage. The converter gradually increases the duty cycle from the second duty cycle to significantly decrease an inrush current caused by a rapid voltage change, thereby decreasing standby power. In addition, the converter prevents a peak current from being input to the resonator to reduce noise of the wireless power transmitter.

The second duty cycle is determined according to a voltage level of the current boost power.

In the standby operation mode, the boost power stored in the first capacitor C11, C12, C13, C14, C15, C16, C17, and C19 (each of FIGS. 8 through 14 and FIG. 16) is discharged according to a period in which the ping signal is transmitted, such that the voltage level of the boost power may be gradually decreased. The second duty cycle is determined by considering an amount by which the boost power stored in the first capacitor is discharged according to a time interval at which the ping signal is transmitted. The second duty cycle is higher than the first duty cycle.

As an example, the voltage level of the boost power stored in the first capacitor is directly detected by a separate detection element. A duty cycle corresponding to the detected voltage level of the boost power is determined as the second duty cycle.

As another example, the voltage level of the boost power is estimated according to the period in which the ping signal is transmitted. For example, since the voltage level of the boost power is decreased according to the discharge by the time interval at which the ping signal is transmitted, when the period of the ping signal is determined, the voltage level of the boost power in which the voltage level is partially decreased from the target boost power is estimated. A duty cycle corresponding to the estimated voltage level of the boost power is determined as the second duty cycle.

As described above, the data regarding the voltage level of the boost power which is gradually boosted and the duty cycle corresponding to the voltage level calculated by the converter (or the controller) of the initial operation mode is stored in a separate memory element. In this case, the second duty cycle is determined based on the data regarding the voltage level of the boost power stored in the initial operation mode and the duty cycle corresponding to the voltage level of the boost power.

According to an embodiment, a weighting index is calculated by comparing the voltage level of the target boost power with the voltage level of the current boost power, and the second duty cycle is calculated by applying the calculated weighting index to a ping duty cycle corresponding to the target boost power. In this case, the weighting index has a value greater than 0 but less than 1. This embodiment may be applied to a case in which only the voltage level of the target boost power and the ping duty cycle corresponding to the voltage level of the target boost power are stored in the data stored in the initial operation mode. In the initial operation mode, all voltage levels of the boost power and a plurality of ping duties corresponding thereto are not stored, while only the voltage level of the target boost power and the ping duty cycle corresponding thereto are stored, whereby a size of the memory element may be reduced.

According to another embodiment, the second duty cycle is determined by a retrieval of a duty cycle corresponding to the voltage level of the current boost power. This embodiment may be applied to a case in which all voltage levels of the boost power and ping duties corresponding thereto are stored in the initial operation mode. In this case, all voltage levels of the boost power and the plurality of ping duties corresponding thereto are stored in a form of a lookup table in the data, and a load of the calculation operation is removed by using the lookup table in the standby operation mode.

The converter (or the controller) gradually increases the duty cycle from the second duty cycle to gradually boost the input voltage. In a case in which the duty cycle is gradually increased and reaches the ping duty cycle, since the voltage level of the boost power stored in the first capacitor reaches the voltage level of the target boost power, the converter outputs the AC current to transmit the ping signal through the resonator.

Figure 18:
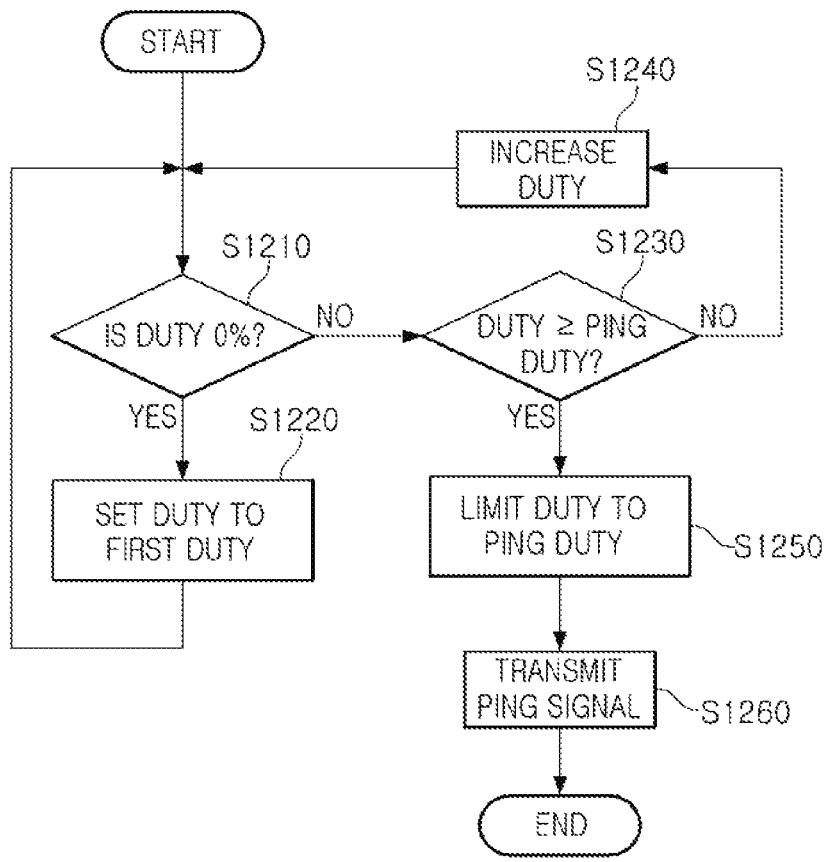
FIG. 18 is an operation flowchart illustrating operations in a standby operation mode of a wireless power transmitter or a wireless power transmission method, according to an embodiment.

FIG. 18 is an operation flowchart illustrating an operation in a standby operation mode of a wireless power transmitter or a wireless power transmission method, according to an embodiment.

Referring to FIG. 18, the standby operation mode starts to determine, in operation S1210, whether a current duty cycle is a duty cycle of 0%. If the current set duty cycle is 0%, the duty cycle is set as the second duty cycle in operation S1220.

The second duty cycle is higher than the first duty cycle, and as an example, the second duty cycle is calculated by applying a weighting index to a ping duty cycle. In this case, the weighting index is a value greater than 0 but less than 1.

If the current set duty cycle is not 0%, the current duty cycle and the ping duty cycle which is calculated and stored in the initial operation mode are compared with each other in operation S1230. If it is determined, as a result of the comparison between the current duty cycle and the ping duty cycle, that the current duty cycle is lower than the ping duty cycle, the duty cycle is increased by a reference duty cycle in operation S1240 to gradually boost the boost power. In contrast, if it is determined that the current duty cycle is higher than the ping duty cycle, the duty cycle is limited to the ping duty cycle in operation S1250, and the ping signal is transmitted in operation S1260, in which the standby operation mode ends. Thereafter, the wireless power transmitter enters the power transmission mode according to the response signal of the wireless power receiver for the ping signal.

Figure 19:
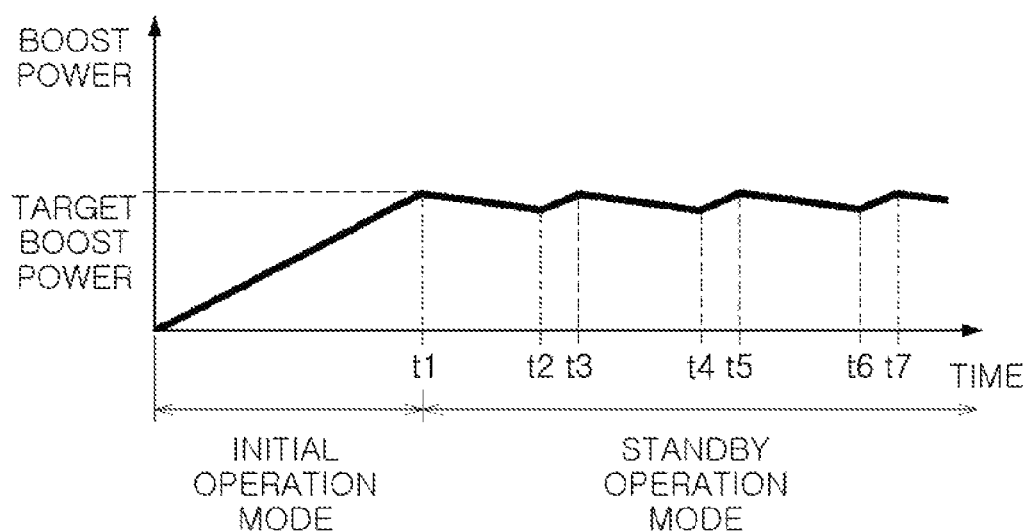
FIG. 19 is a diagram illustrating a change in a boosted voltage in an initial operation mode and a standby operation mode of a wireless power transmitter or a wireless power transmission method, according to an embodiment.

FIG. 19 is a diagram illustrating a change of a boost voltage in the initial operation mode and the standby operation mode of a wireless power transmitter or a wireless power transmission method, according to an embodiment.

Referring to FIG. 19, in the initial operation mode, the converter 110, 111, 112, 113, 114, 115, 116, 117, 118 and 119 (each of FIGS. 7 through 16) (or the controller 100, 201, 202, 203, 204, 205, 206, 207, 208 and 209 (each of FIGS. 7 through 16) gradually increases the duty cycle from the first duty cycle to gradually boost the input voltage. As a result of the boosting of the converter, when the boost power stored in the first capacitor C11, C12, C13, C14, C15, C16, C17 and C19 (each of FIGS. 8 through 14 and FIG. 15) reaches the target boost power, the ping signal is transmitted at a timing t1. After the ping signal is transmitted, the initial operation mode ends and the wireless power transmitter enters the standby operation mode.

In the standby operation mode, the voltage level of the boost power stored in the first capacitor is decreased according to the period in which the ping signal is transmitted. The converter (or the controller) gradually increases the duty cycle from the second duty cycle at a timing t2 according to the voltage level of the boost power stored in the first capacitor to boost the input voltage, and may transmit the ping signal at a timing t3 when the boost power stored in the first capacitor reaches the target boost power as a result of the boosting of the converter. In this case, the above mentioned operation is repeated according to a transmission period of the ping signal—a time interval of a timing t3 to t5, or a time interval of a timing t5 to a timing t7. Thereafter, the wireless power transmitter enters the power transmission mode according to the response signal of the wireless power receiver for the ping signal.

Next, the power transmission mode will be described. Hereinafter, an operation in the power transmission mode is performed by the controller 200, 201, 202, 203, 204, 205, 206, 207, 208 and 209 (of FIG. 7 through FIG. 16).

FIGS. 20A to 20H are diagrams illustrating an operation of a wireless power transmitter in a power transmission mode or a wireless power transmission method, according to an embodiment, which illustrates a waveform diagram of a control signal for controlling switching elements of the wireless power transmitter. FIGS. 20A to 20H are diagrams illustrating an operation of the wireless power transmitter when an amount of power received by the wireless power receiver is increased.

The first control signals con11, con12, con13, and con16 of FIGS. 8 through 10, and 13 are equivalent to the first control signal con1 of FIGS. 20A, 20C, 20E, and 20G, and the second control signals con21, con22, con23, and con26 of FIGS. 8 through 10, and 13 are equivalent to the second control signal con2 of FIGS. 20B, 20D, 20F, and 20G.

In addition, the first control signals con14, con15, con18 and con19 of FIGS. 11, 12, 15 and 16 are equivalent to the first control signal con1 of FIGS. 20 A, 20C, 20E, and 20G, and the second control signals con24, con25, con28 and con29 of FIGS. 11, 12, 15 and 16 are equivalent to the second control signal con2 of FIGS. 20B, 20D, 20F, and 20G. In this case, the third control signals con34, con35 and con38 of FIGS. 11, 12 and 15 are maintained at a low level, and the fourth control signals con44, con45 and con48 of FIGS. 11, 12 and 15 are maintained at a high level. The third control signal con39 and the fifth control signal con59 in FIG. 16 are maintained at a low level, and at least one of the fourth control signal con49 and the sixth control signal con69 in FIG. 16 is maintained at a high level. For example, when only one of the fourth control signal con49 and the sixth control signal con69 in FIG. 16 is maintained at a high level, the remaining control signal is maintained at a low level.

The control signals, initially output in the normal mode, have forms such as those illustrated in FIG. 20A and FIG. 20B. In this case, a frequency and a duty cycle of the control signals are the ping frequency and the ping duty cycle described above. The control signals illustrated in FIG. 20A and FIG. 20B are also output in the detection mode.

In the normal mode, the frequency of the control signal is adjusted according to the signal received from the wireless power receiver. That is, in a case in which an amount of power received by the wireless power receiver is less than an amount of power required by the wireless power receiver, in the normal mode, the controller decreases the frequency of the control signals con1 and con2 as illustrated in FIG. 20C and FIG. 20D. Therefore, the amount of power received by the wireless power receiver is increased. In this case, the frequency of the control signals con1 and con2 of FIG. 20C and FIG. 20D is a minimum value f1 (FIG. 6) of the frequency in the normal mode. In the normal mode, the duty cycle is fixed to the above-mentioned ping duty cycle.

In the boost mode, the duty cycle of the control signal is adjusted according to the signal received from the wireless power receiver. That is, when the amount of power required by the wireless power receiver is be received even though the frequency of the control signals con1 and con2 is decreased up to a predetermined reference frequency (e.g., f1 of FIG. 6), as illustrated in FIG. 20E and FIG. 20F, the controller fixes the frequency of the control signals con1 and con2 to the reference frequency (e.g., f1 of FIG. 6), and increases the duty cycle of the second control signal con2.

Alternatively, as illustrated in FIG. 20G and FIG. 20H, in the boost mode, the controller additionally decreases the frequency of the control signals con1 and con2. In this case, the duty cycle is fixed to the duty cycle which is previously increased.

FIGS. 21A to 21 H are diagrams illustrating operations in a power transmission mode of a wireless power transmitter or a wireless power transmission method, according to an embodiment, for example, waveform diagrams of control signals controlling switching elements of a wireless power transmitter. FIGS. 21A to 21H illustrate an operation of the wireless power transmitter when an amount of power received by the wireless power receiver is increased.

The first control signals con14, con15, con18 and con19 of FIGS. 11, 12, 15 and 16 are equivalent to the first control signal con1 of FIGS. 21A, 21C, 21E, and 21G, the second control signals con24, con25, con28 and con29 of FIGS. 11, 12, 15 and 16 are equivalent to the second control signal con2 of FIGS. 21B, 21D, 21F, and 21H, the third control signals con34, con35, and con38 of FIGS. 11, 12, and 15 are equivalent to the third control signal con3 of FIGS. 21B, 21D, 21F, and 21H, and the fourth control signals con44, con45, and con48 of FIGS. 11, 12, and 15 are equivalent to the fourth control signal con4 of FIGS. 21A, 21C, 21E, and 21G. The third control signal con39 of FIG. 16 and/or the fifth control signal con59 of FIG. 16 are equivalent to the third control signal con3 of FIGS. 21B, 21D, 21F, and 21H, and the fourth control signal con49 of FIG. 16 and/or the sixth control signal con69 of FIG. 16 are equivalent to the fourth control signal con4 of FIGS. 21A, 21C, 21E, and 21G. In some cases, the third control signal con39 and the fourth control signal con49 of FIG. 16 are maintained at a low level, and the fifth control signal con59 and the sixth control signal con69 of FIG. 16 are maintained at a low level.

FIGS. 21A to 21H are equal to FIGS. 20A to 20H, except that FIGS. 21A to 21H are applied to the case in which the converter 114, 115, 118 and 119 (each of FIGS. 11, 12, 15 and 16) is operated as the full-bridge circuit.

The controller outputs the control signals illustrated in FIG. 21A and FIG. 21B. As described above, in the normal mode, the controller may also output the control signals initially output in the forms illustrated in FIG. 21A and FIG. 21B, and also output the control signals in the detection mode. The duty cycle of the control signals con1 and con4 illustrated in FIG. 21A are the above-mentioned ping duty cycle, and the frequency of the control signals con1, con2, con3, and con4 illustrated in FIG. 21A and FIG. 21B are the above-mentioned ping frequency.

In the normal mode, in a case in which an amount of power received by the wireless power receiver is less than an amount of power required by the wireless power receiver, the controller may decrease the frequency of the control signals con1, con2, con3, and con4 as illustrated in FIG. 21C and FIG. 21D.

In the boost mode, the duty cycle of the control signal is adjusted according to the signal received from the wireless power receiver. That is, when the amount of power required by the wireless power receiver is not received even though the frequency of the control signals con1, con2, con3, and con4 is decreased up to a predetermined frequency (e.g., f1 of FIG. 6), as illustrated in FIG. 21E and FIG. 21F, the controller fixes the frequency of the control signals con1, con2, con3, and con4 to the reference frequency (e.g., f1 of FIG. 6), and increases the duty cycle of the second control signal con2 and the third control signal con3.

Alternatively, as illustrated in FIG. 21G and FIG. 21H, in the boost mode, the controller additionally decreases the frequency of the control signals con1, con2, con3, and con5. In this case, the duty cycle is fixed to the duty cycle which is previously increased.

Although not illustrated in FIGS. 20A to 20H and 21A to 21H, in the boost mode, the controller may also additionally increase the duty cycle after additionally decreasing the frequency as illustrated in FIG. 21G and FIG. 21H.

FIGS. 22A to 22H are diagrams illustrating operations in a power transmission mode of a wireless power transmitter or a wireless power transmission method according to an embodiment, for example, waveform diagrams of control signals controlling switching elements of a wireless power transmitter. FIGS. 22A to 22H illustrate an operation of the wireless power transmitter when an amount of power received by the wireless power receiver is decreased.

The first control signals con11, con12, con13, and con16 of FIGS. 8 through 10, and 13 are equivalent to the first control signal con1 of FIGS. 22A, 22C, 22E, and 22G, and the second control signals con21, con22, con23, and con26 of FIGS. 8 through 10, and 13 are equivalent to the second control signal con2 of FIGS. 22B, 22D, 22F, and 22H.

In addition, the first control signals con14, con15, con18 and con19 of FIGS. 11, 12, 15 and 16 are equivalent to the first control signal con1 of FIGS. 22A, 22C, 22E, and 22G, and the second control signals con24, con25, con28 and con29 of FIGS. 11, 12, 15 and 16 are equivalent to the second control signal con2 of FIG. 22B, 22D, 22F, and 22H. In this case, the third control signals con34, con35, and con38 of FIGS. 11, 12, and 15 are maintained at a low level, and the fourth control signals con44, con45, and con48 of FIGS. 11, 12, and 15 are maintained at a high level. The third control signal con39 and the fifth control signal con59 of FIG. 16 are maintained at a low level, and at least one of the fourth control signal con49 and the sixth control signal con69 of FIG. 16 is maintained at a high level. When only one of the fourth control signal con49 and the sixth control signal con69 of FIG. 16 are maintained at a high level, the remaining control signal is maintained at a low level.

First, the controller outputs the same control signals con1 and con2 as those illustrated in FIG. 22A and FIG. 22B. The controller also outputs the control signals initially output in the forms illustrated in FIG. 22A and FIG. 22B in the normal mode, and also outputs the same control signals as those illustrated in FIG. 22A and FIG. 22A in the detection mode.

In a case in which an amount of power received by the wireless power receiver is greater than an amount of power required by the wireless power receiver, in the normal mode, the controller increases the frequency of the control signals con1 and con2 as illustrated in FIG. 22C and FIG. 22D. Therefore, the amount of power received by the wireless power receiver is decreased. Here, the frequency of the control signals con1 and con2 of FIG. 22C and FIG. 22D is a maximum value f2 (FIG. 6) of the frequency in the normal mode. In the normal mode, the duty cycle is fixed to the above-mentioned ping duty cycle.

In the reduction mode, the duty cycle of the control signal is adjusted according to the signal received from the wireless power receiver. That is, when the amount of power received by the wireless power receiver is greater than the amount of power required by the wireless power receiver even though the frequency of the control signals con1 and con2 is increased up to a predetermined reference frequency (e.g., f2 of FIG. 6), as illustrated in FIG. 22E and FIG. 22F, the controller fixes the frequency of the control signals con1 and con2 to the reference frequency (e.g., f2 of FIG. 6), and decreases the duty cycle of the second control signal con2.

Alternatively, as illustrated in FIG. 22G and FIG. 22H, in the reduction mode, the controller also additionally increases the frequency of the control signals con1 and con2. In this case, the duty cycle is fixed to the duty cycle which is previously decreased.

FIGS. 23A to 23H are diagrams illustrating an operation of a wireless power transmitter in a power transmission mode or a wireless power transmission method according to an embodiment, which illustrate a waveform diagram of a control signal for controlling switching elements of the wireless power transmitter. FIGS. 23A to 23H are diagrams illustrating an operation of the wireless power transmitter when an amount of power received by the wireless power receiver is decreased.

The first control signals con14, con15, con18 and con19 of FIGS. 11, 12, 15 and 16 are equivalent to the first control signal con1 of FIGS. 23A, 23C, 23E, and 23G, the second control signals con24, con25, con28 and con29 of FIGS. 11, 12, 15 and 16 are equivalent to the second control signal con2 of FIGS. 23B, 23D, 23F, and 23H, the third control signals con34, con35, and con38 of FIGS. 11, 12, and 15 are equivalent to the third control signal con3 of FIGS. 23B, 23D, 23F, and 23H, and the fourth control signals con44, con45, and con48 of FIGS. 11, 12, and 15 are equivalent to the fourth control signal con4 of FIGS. 23A, 23C, 23E, and 23G. The third control signal con39 of FIG. 16 and/or the fifth control signal con59 of FIG. 16 are equivalent to the third control signal con3 of FIGS. 23B, 23D, 23F, and 23H, and the fourth control signal con49 of FIG. 16 and/or the sixth control signal con69 of FIG. 16 are equivalent to the fourth control signal con4 of FIGS. 23A, 23C, 23E, and 23G. In some cases, the third control signal con39 and the fourth control signal con49 in FIG. 16 may are maintained at a low level, and the fifth control signal con59 and the sixth control signal con69 in FIG. 16 are maintained at a low level.

FIGS. 23A to 23H are to FIGS. 22A to 22H except that FIGS. 23A to 23H relate to the case in which the converters 114, 115, 118 and 119 (FIGS. 11, 12, 15 and 16) are operated as the full-bridge circuit.

First, the controller outputs the same control signals con1, con2, con3, and con4 as those illustrated in FIG. 23A and FIG. 23B. The controller also outputs the control signals initially output in the forms illustrated in FIG. 23A and FIG. 23B in the normal mode, and also outputs the same control signals as those illustrated in FIG. 23A and FIG. 23B in the detection mode.

In a case in which an amount of power received by the wireless power receiver is greater than an amount of power required by the wireless power receiver, in the normal mode, the controller increases the frequency of the control signals con1, con2, con3, and con4 as illustrated in (c) and (d). Therefore, the amount of power received by the wireless power receiver is decreased. Here, the frequency of the control signals con1, con2, con3, and con4 of FIG. 23C and FIG. 23D is a maximum value f2 (FIG. 6) of the frequency in the normal mode. In the normal mode, the duty cycle is fixed to the above-mentioned ping duty cycle.

In the reduction mode, the duty cycle of the control signal is adjusted according to the signal received from the wireless power receiver. That is, when the amount of power received by the wireless power receiver is greater than the amount of power required by the wireless power receiver even though the frequency of the control signals con1, con2, con3, and con4 is increased up to a predetermined reference frequency (e.g., f2 of FIG. 6), as illustrated in FE and FIG. 23F, the controller fixes the frequency of the control signals con1, con2, con3, and con4 to the reference frequency (e.g., f2 of FIG. 6), and decreases the duty cycle of the second control signal con2 and the third control signal con3.

Alternatively, as illustrated in FIG. 23G and FIG. 23H, in the reduction mode, the controller also additionally increases the frequency of the control signals con1, con2, con3, and con4. In this case, the duty cycle is fixed to the duty cycle which is previously decreased.

FIGS. 24A to 24L are diagrams illustrating operations in a power transmission mode of a wireless power transmitter or a wireless power transmission method, according to an embodiment, for example, waveform diagrams of control signals controlling switching elements of a wireless power transmitter. FIGS. 24A to 24H illustrate an operation of the wireless power transmitter when an amount of power received by the wireless power receiver is decreased.

The first control signals con14, con15, con18 and con19 of FIGS. 11, 12, 15 and 16 are equivalent to the first control signal con1 of FIGS. 24A, 24C, 24E, and 24I, the second control signals con24, con25, con28 and con29 of FIGS. 11, 12, 15 and 16 are equivalent to the second control signal con2 of FIGS. 24B, 24D, 24F, and 24J, the third control signals con34, con35, and con38 of FIGS. 11, 12, and 15 are equivalent to the third control signal con3 of FIGS. 24B, 24D, 24G, and 24K, and the fourth control signals con44, con45, and con48 of FIGS. 11, 12 and 15 are equivalent to the fourth control signal con4 of FIGS. 24A, 24C, 24H, and 24L. The third control signal con39 of FIG. 16 and/or the fifth control signal con59 of FIG. 16 are equivalent to the third control signal con3 of FIGS. 24B, 24D, 24G, and 24K, and the fourth control signal con49 of FIG. 16 and/or the sixth control signal con69 of FIG. 16 are equivalent to the fourth control signal con4 of FIGS. 24A, 24C, 24H, and 24L. In some cases, the third control signal con39 and the fourth control signal con49 of FIG. 16 are maintained at a low level, and the fifth control signal con59 and the sixth control signal con69 of FIG. 16 are maintained at a low level.

Figure 24A:
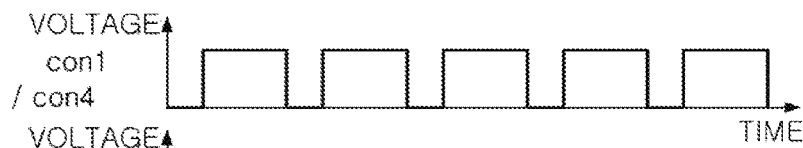
Figure 24B:
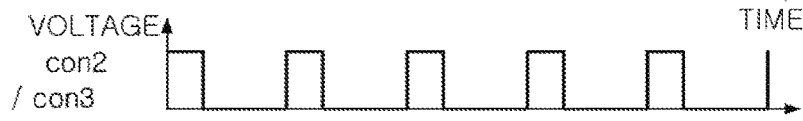

First, the controller outputs the same control signals con1, con2, con3, and con4 as those illustrated in FIG. 24A and FIG. 24B. The controller also outputs the control signals initially output in the forms illustrated in FIG. 24A and FIG. 24B in the normal mode, and may also output the same control signals as those illustrated in FIG. 24A and FIG. 24B in the detection mode.

Figure 24C:
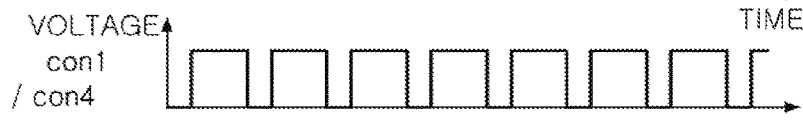
Figure 24D:
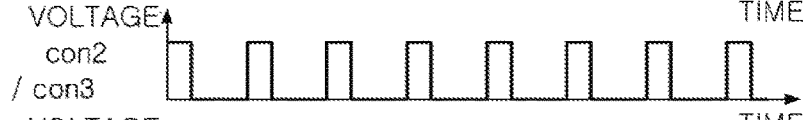
Figure 24E:
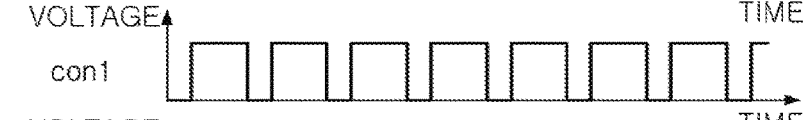

In a case in which an amount of power received by the wireless power receiver is greater than an amount of power required by the wireless power receiver, in the normal mode, the controller increases the frequency of the control signals con1, con2, con3, and con4 as illustrated in FIG. 24C and FIG. 24D. Therefore, the amount of power received by the wireless power receiver is decreased. Here, the frequency of the control signals con1, con2, con3, and con4 of FIG. 2C and FIG. 24D is a maximum value f2 (FIG. 6) of the frequency in the normal mode. In the normal mode, the duty cycle is fixed to the above-mentioned ping duty cycle.

In the reduction mode, the duty cycle of the control signal is adjusted according to the signal received from the wireless power receiver. That is, when the amount of power received by the wireless power receiver is greater than the amount of power required by the wireless power receiver even though the frequency of the control signals con1, con2, con3, and con4 is increased up to a predetermined reference frequency (e.g., f2 of FIG. 6), as illustrated in FIG. 24E, FIG. 24F, FIG. 24G, and FIG. 24H, the controller fixes the frequency of the control signals con1, con2, con3, and con4 to the reference frequency (e.g., f2 of FIG. 6), fixes the duty cycle of the second control signal con2, and decreases the duty cycle of the fourth control signal con4. In this case, a dead time is increased in the full-bridge circuit, and consequently, the amount of power transmitted by the wireless power transmitter is decreased, whereby the amount of power received by the wireless power receiver is also decreased. In this case, the dead time is defined as a time at which voltage levels at both ends of the resonator are the same.

Figure 24F:
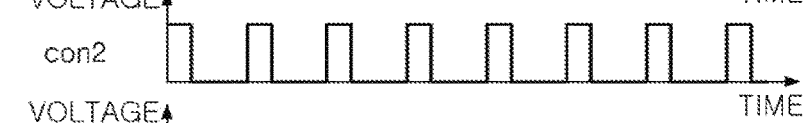
Figure 24G:
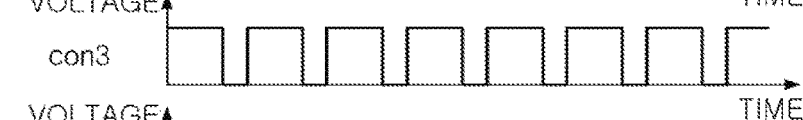
Figure 24H:
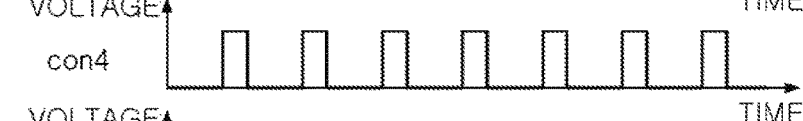
Figure 24I:
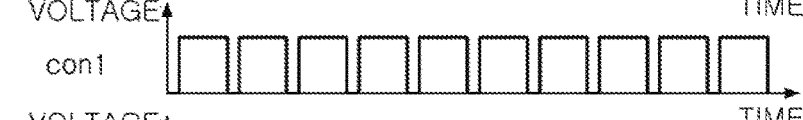
Figure 24J:
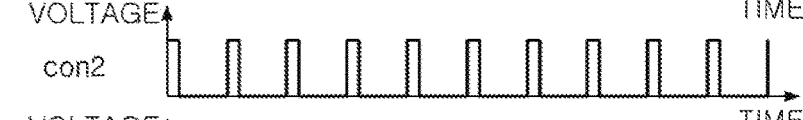

Alternatively, as illustrated in FIG. 24I and FIG. 24J, in the reduction mode, the controller also additionally increases the frequency of the control signals con1, con2, con3, and con4. In this case, the duty cycle of the control signals con1 and con2 of FIG. E and FIG. 24F are equal to the duty cycle of the control signals con1 and con2 of FIG. 24I and FIG. 24J. In addition, at the same time, as illustrated in (k) and (l), the third control signal con3 maintains a low level, and the fourth control signal con4 maintains a high level. In this case, the converter 114, 115, 118 and 119 of FIGS. 11, 12, 15 and/or 16 is operated as the half-bridge circuit, such that the amount of power transmitted by the wireless power transmitter is decreased, whereby the amount of power received by the wireless power receiver is further decreased as compared to the case in which only the frequency is adjusted.

Figure 24K:
Figure 24L:
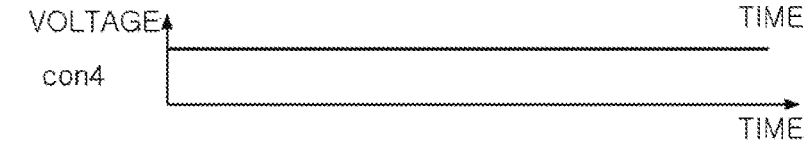

Although FIG. 24K and FIG. 24I of FIG. 24 illustrate the cases in which the controller of the wireless power transmitter maintains the third control signal con3 at the low level, and maintains the fourth control signal con4 at the high level, the third control signal con3 is equivalent to the second control signal con2 of FIG. 24AJ, and the fourth control signal con4 mays also equivalent to the first control signal con1 of FIG. 24I. That is, by increasing the frequencies of all of the first to fourth control signals, the power received by the wireless power receiver is reduced.

FIGS. 25A to 25H are diagrams illustrating operations in a power transmission mode of a wireless power transmitter or a wireless power transmission method according to an embodiment, for example, waveform diagrams of control signals controlling switching elements of a wireless power transmitter. FIGS. 25A to 25H illustrate an operation of the wireless power transmitter when an amount of power received by the wireless power receiver is decreased.

The first control signals con14, con15, con18 and con19 of FIGS. 11, 12, 15 and 16 are equivalent to the first control signal con1 of FIGS. 25A, 25C, and 25E, the second control signals con24, con25, con28 and con29 of FIGS. 11, 12, 15 and 16 are equivalent to the second control signal con2 of FIGS. 25B, 25D, and 25F, the third control signals con34, con35, and con38 of FIGS. 11, 12, and 15 are equivalent to the third control signal con3 of FIGS. 25B, 25D, and 25 G, and the fourth control signals con44, con45 and con48 of FIGS. 11, 12 and 15 are equivalent to the fourth control signal con4 of FIGS. 25A, 25C, and 25H. The third control signal con39 of FIG. 16 and/or the fifth control signal con59 of FIG. 16 are equivalent to the third control signal con3 of FIGS. 25B, 25D, and 25G, and the fourth control signal con49 of FIG. 16 and/or the sixth control signal con69 of FIG. 16 are equivalent to the fourth control signal con4 of FIGS. 25, 25C, and 25H. In some cases, the third control signal con39 and the fourth control signal con49 of FIG. 16 are maintained at a low level, and the fifth control signal con59 and the sixth control signal con69 of FIG. 16 are maintained at a low level.

First, the controller outputs the same control signals con1, con2, con3, and con4 as those illustrated in FIG. 25A and FIG. 25B. The controller may also output the control signals initially output in the forms illustrated in FIG. 25A and FIG. 25B in the normal mode, and may also output the same control signals as those illustrated in FIG. 25A and FIG. 25B in the detection mode.

In a case in which an amount of power received by the wireless power receiver is greater than an amount of power required by the wireless power receiver, in the normal mode, the controller increases the frequency of the control signals con1, con2, con3, and con4 as illustrated in FIG. 25C and FIG. 25D. Therefore, the amount of power received by the wireless power receiver is decreased. Here, the frequency of the control signals con1, con2, con3, and con4 of FIG. 25(c)

and FIG. 25D are a maximum value f2 (FIG. 6) of the frequency in the normal mode. In the normal mode, the duty cycle is fixed to the above-mentioned ping duty cycle.

In a case in which an amount of power received by the wireless power receiver is greater than an amount of power required by the wireless power receiver even though the frequency of the control signals con1, con2, con3, and con4 is increased up to a predetermined reference frequency (e.g., f2 of FIG. 6), the controller is operated in the reduction mode. In the reduction mode, as illustrated in FIG. 25A, FIG. 25A, FIG. 25G, and FIG. 25H, the controller increases the frequency of the first control signal con1 and the second control signal con2, while the third control signal con3 maintains a low level and the fourth control signal con4 maintains a high level. In this case, the converter 114, 115, 118 and 119 of FIGS. 11, 12 and 15 and/or 16 is operated as the half-bridge circuit, such that the amount of power transmitted by the wireless power transmitter is decreased, whereby the amount of power received by the wireless power receiver is further decreased as compared to the case in which only the frequency is adjusted.

FIGS. 26A to 26E, 27A to 27E, 28A to 28E, and 29A to 29E are diagrams illustrating operations in a power transmission mode of a wireless power transmitter or a wireless power transmission method according to an embodiment, for example, waveform diagrams of control signals controlling switching elements of a wireless power transmitter. FIGS. 26A, to 26D, 27A to 27D, 28A to 28D, and 29A to 29D indicate waveforms of control signals controlling switching elements of converters 114, 115, 118 and 119 of FIGS. 11, 12, 15 and 16, respectively, and FIGS. 26E, 27E, 28E, and 29E indicate output voltages of the converters 114, 115, 118 and 119 of FIGS. 11, 12, 15 and 16, for example, a voltage between a first node N1 and a third node N3 of FIGS. 11, 12, 15 and 16 and/or a voltage between the first node N1 and the fourth node N4 of FIG. 16.

The first control signals con14, con15, con18 and con19 of FIGS. 11, 12, 15 and 16 are equivalent to the first control signal con1 of FIGS. 26A, 27A, 28A, and 29A, respectively. The second control signals con24, con25, con28 and con29 of FIGS. 11, 12, 15 and 16 are equivalent to the second control signal con2 of FIGS. 26B, 27B, 28B, and 29B, respectively. The third control signals con34, con35 and con38 of FIGS. 11, 12 and 15 are equivalent to the third control signal con3 of FIGS. 26C, 27C, 28C, and 29C, respectively. The fourth control signals con44, con45 and con48 of FIGS. 11, 12 and 15 are equivalent to the fourth control signals con4 of FIGS. 26D, 27D, 28D, and 29D, respectively. The third control signal con39 of FIG. 16 and/or the fifth control signal con59 of FIG. 16 are equivalent to the third control signal con3 of each of FIGS. 26C, 27C, 28C, and 29C. The fourth control signal con49 of FIG. 16 and/or the sixth control signal con69 of FIG. 16 are equivalent to the fourth control signal con4 of each of FIGS. 26D, 27D, 28D, and 29D. In some cases, the third control signal con39 and the fourth control signal con49 of FIG. 16 are maintained at a low level, or the fifth control signal con59 and the sixth control signal con69 of FIG. 16 are maintained at a low level.

First, the controller may output the same control signals con1, con2, con3 and con4 as illustrated in FIGS. 26A to 26D. Frequencies of the control signals con1, con2, con3 and con4 may all be the same. The second control signal con2 is a signal obtained by inverting the first control signal con1, and the fourth control signal con4 is a signal obtained by inverting the third control signal con3. An operating duty cycle is defined as a ratio (dc1/T) of an on-time of the second control signal con2 to a period T of each of the control signals con1, con2, con3 and con4. An inverter duty cycle is defined as a ratio ((dc2+dc3)/T) of a sum of a time period dc2 during which both the first control signal con1 and the fourth control signal are on, and a time period (dc3) during which both the second control signal con2 and the third control signal con3 are on, with respect to a period of each of the control signals con1, con2, con3 and con4. A dead time of an inverter is defined as a time excluding the time period dc2 and the time period dc3 from the period T, for example, the time at which an output voltage Vac of the converter is zero. An on-duty cycle of the second control signal con2 and an on-duty cycle of the third control signal con3 may be different from each other. In FIG. 26B, the on-duty cycle, for example, an operating duty cycle, of the second control signal con2 is a duty cycle set in the manner described with reference to FIGS. 17 to 19.

Comparing FIGS. 27A to 27E with FIGS. 26A to 26E, frequencies of the control signals con1, con2, con3 and con4 of FIGS. 27A to 27D are relatively high as compared with those of FIGS. 26A to 26D, while operating duty cycles and inverter duty cycles of FIGS. 26A to 26E and 27A to 27E are the same as each other. As described above, for example, when an operating frequency of the wireless power transmitter is increased, an amount of power received by the wireless power receiver is decreased, and when the operating frequency of the wireless power transmitter is decreased, the amount of power received by the wireless power receiver is increased. In the case in which the amount of power received by the wireless power receiver, when the control signals of FIGS. 27A to 27D are output, is less than an amount of power required by the wireless power receiver, the controller outputs the control signals of FIGS. 26A to 26D. Alternatively, in the case in which the amount of power received by the wireless power receiver, when the control signals of FIG. 26A to 26D are output, is greater than an amount of power required by the wireless power receiver, the controller outputs the control signals of FIG. 27A to 27D.

Comparing FIGS. 28A to 28E with FIGS. 27A to 27E, inverter duty cycles of the control signals con1, con2, con3 and con4 of FIGS. 28A to 28D are relatively low as compared with those of FIGS. 27A to 27D, while frequencies and operating duty cycles of FIGS. 27A to 27E and 28A to 28E are the same as each other. In this case, decreasing the inverter duty cycle refers to an increase in a dead time of an inverter. As illustrated in FIGS. 27E and 28E, when the inverter duty cycle is decreased, as a result, an amount of power applied to an resonator 124, 125, 128, 129-1 or 129-2 of FIG. 11, 12, 15 or 16 is decreased, and thus, the amount of power received by the wireless power receiver is also reduced. In the case in which the amount of power received by the wireless power receiver, when the control signals of FIGS. 28A to 28D are output, is less than an amount of power required by the wireless power receiver, the controller outputs the control signals of FIGS. 27A to 27D. Alternatively, in the case in which the amount of power received by the wireless power receiver, when the control signals of FIG. 27A to 27D are output, is greater than an amount of power required by the wireless power receiver, the controller outputs the control signals of FIGS. 28A to 28D.

As illustrated in FIGS. 27A to 27E and 28A to 28E, the inverter duty cycle (an inverter dead time) is varied by adjusting a phase difference of the control signals. In this case, the phase difference of the control signals are defined by a difference between a phase of the second control signal con2 (or, the first control signal con1) and a phase of the fourth control signal con4 (or the third control signal con3).

Comparing FIGS. 29A to 29E with FIGS. 28A to 28E, operating duty cycles of the control signals con1, con2, con3 and con4 of FIGS. 29A to 29D are relatively low as compared with those of FIGS. 28A to 28D, while frequencies and inverter duty cycles of FIGS. 28A to 28E and 29A to 29E are the same as each other. As illustrated in FIGS. 28E and 29E, when the operating duty cycle is decreased, an amplitude of an output voltage Vac of the converter 114, 115, 118 or 119 of FIG. 11, 12, 15 or 16 is decreased, and as a result, an amount of power applied to the resonator 124, 125, 128, 129-1 or 129-2 of FIG. 11, 12, 15 or 16 is decreased, and thus, the amount of power received by the wireless power receiver is also reduced. In the case in which the amount of power received by the wireless power receiver, when the control signals of FIGS. 29A to 29D are output, is less than an amount of power required by the wireless power receiver, the controller outputs the control signals of FIGS. 28A to 28D. Alternatively, in the case in which the amount of power received by the wireless power receiver, when the control signals of FIGS. 28A to 28D are output, is greater than an amount of power required by the wireless power receiver, the controller outputs the control signals of FIGS. 29A to 29D.

The controller sets any one or any combination of any two or more of an operating, an operating duty cycle, and an inverter duty cycle (or a dead time) in response to a signal received frequency from the wireless power receiver. For example, the controller calculates a difference between an amount of power required by the wireless power receiver and an amount of power received by the wireless power receiver, based on a signal received from the wireless power receiver. Based on the calculated difference, any one or any combination of any two or more of the operating frequency, the operating duty cycle, and the inverter duty cycle (or a dead time) is calculated. Control signals are generated and output based on the calculated operating frequency, operating duty cycle, and inverter duty cycle (or the dead time). In this case, the control signals may be any one of the control signals illustrated in FIGS. 26A to 26D, 27A to 27D, 28A to 28D, and 29A to 29D.

The controller sequentially outputs the control signals illustrated in FIGS. 26A to 26D, 27A to 27D, 28A to 28D, and 29A to 29D. For example, when the controller outputs the control signals of FIGS. 26A to 26D, in the case in which the amount of power received by the wireless power receiver is greater than the amount of power required by the wireless power receiver, frequencies of the control signals con1, con2, con3 and con4 are increased as illustrated in FIGS. 27A to 27D. In the case in which the amount of power received by the wireless power receiver is greater than the amount of power required by the wireless power receiver even when the frequencies of the control signals con1, con2, con3 and con4 are increased up to a predetermined reference frequency, for example, f2 in FIG. 6, the controller reduces the inverter duty cycle as illustrated in FIGS. 28A to 28E. In addition, in the case in which the amount of power received by the wireless power receiver is greater than the amount of power required by the wireless power receiver even when the inverter duty cycle is decreased up to a predetermined reference value, the controller reduces the operating duty cycle as illustrated in FIGS. 28A to 28E. In the case in which the amount of power received by the wireless power receiver is less than the amount of power required by the wireless power receiver, the above procedure is reversed.

In the processes described above, an operation mode of the controller adjusting the frequencies, for example, operation frequencies, of the control signals con1, con2, con3 and con4, is a normal mode, and an operation mode of the controller adjusting the inverter duty cycle or operating duty cycle is a reduction mode.

Further, although FIG. 29 illustrates the configuration in which the inverter duty cycle is adjusted by adjusting phases of the third control signal con3 and the fourth control signal con4, the inverter duty cycle may also be adjusted by adjusting duty cycles of the third control signal con3 and the fourth control signal con4. In addition, although not illustrated, by further increasing the operating duty cycle as compared with that illustrated in FIG. 26, the amplitude of the output voltage Vac of the converter may be increased to increase an amount of power output to the resonator, thereby increasing an amount of power received by the wireless power receiver.

Figure 30:
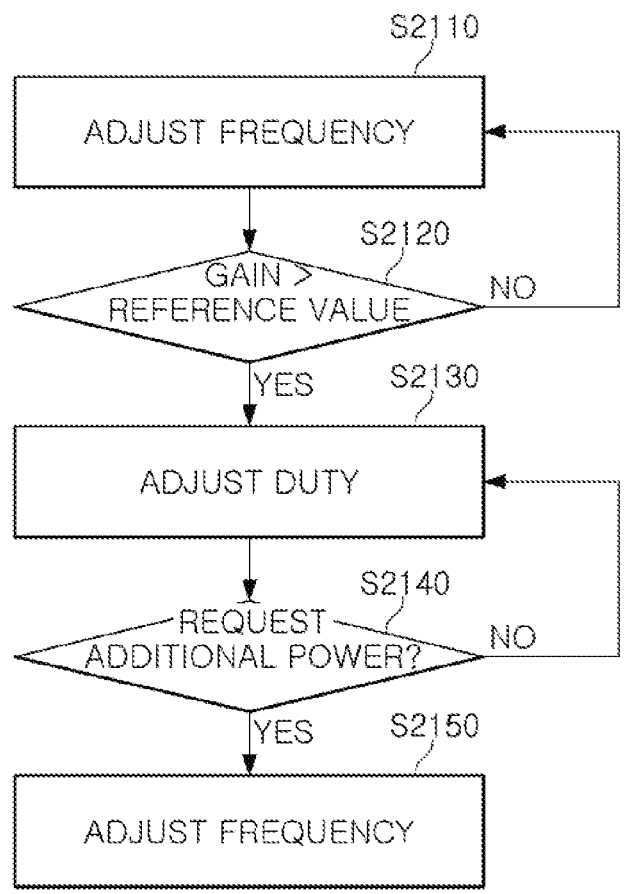
FIGS. 30 and 31 are diagrams each schematically illustrating a process of changing adjusted variables in a wireless power transmitter and a wireless power transmission method, according to an embodiment.

FIG. 30 is a diagram schematically illustrating a process of changing adjusted variables in a wireless power transmitter and a wireless power transmission method, according to an embodiment.

In operation S2110, the controller adjusts a frequency of the power which is wirelessly transmitted, in response to the request signal input from the wireless power receiver. For example, the controller adjusts the frequency of the power which is wirelessly transmitted, by adjusting the frequency of the control signal. That is, in a case in which the wireless power receiver requires a larger amount of power, the controller decreases the frequency, and in a case in which the wireless power receiver requires a smaller amount of power, the controller increases the frequency. Operation S2110 may also be performed in the normal mode, and may also be performed in the boost mode.

Next, in operation S2120, it is determined whether a gain at the adjusted frequency is greater than a reference value. In this case, by determining whether the adjusted frequency reaches the reference value, it is also determined whether the gain at the adjusted frequency is greater than the reference value.

If it is determined, as a result of the determination in operation S2120, that the gain at the adjusted frequency is less than the reference value, operation S2110 is performed.

If it is determined, as a result of the determination in operation S2120, that a gain at a current frequency is equal to or greater than the reference value, the duty cycle of the control signal is adjusted in operation S2130. In this case, the frequency is fixed. That is, in the case in which operation S2110 is performed in the normal mode, the operation mode is changed to the boost mode.

Next, even after the duty cycle is adjusted up to a limit value, it is determined, in operation S2140, whether there is an additional power request. For example, even after the duty cycle is increased up to the limit value, it is determined whether the wireless power receiver requires a larger amount of power.

If it is determined, as a result of the determination in operation S2140, that there is an additional power request, the frequency is further adjusted in operation S2150. Operation S2150 is performed in the boost mode.

Although FIG. 30 illustrates, by way of example, a case in which the amount of power received by the wireless power receiver is increased, an operation of decreasing the amount of power received by the wireless power receiver may be implemented in a manner similar that shown in FIG. 30.

Figure 31:
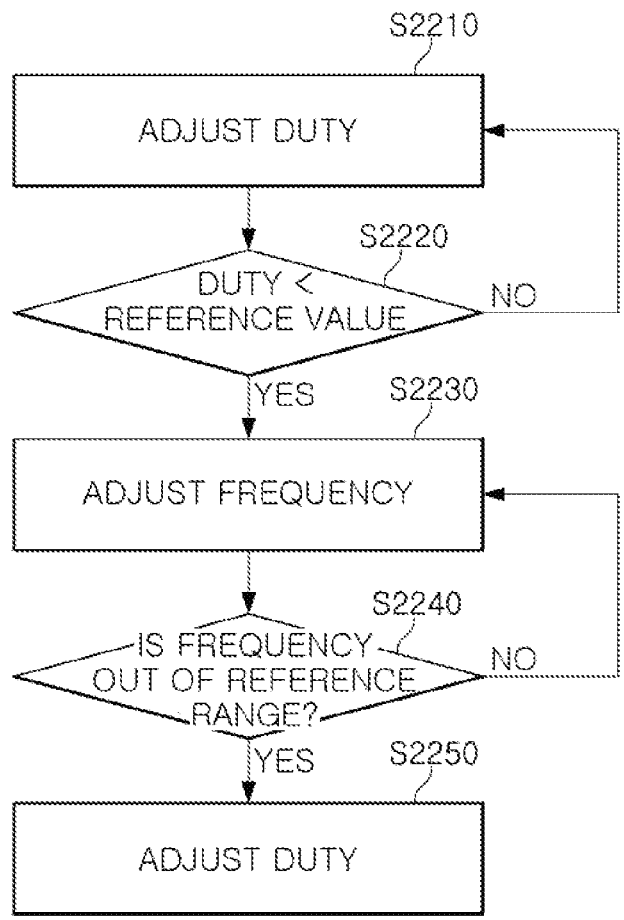

FIG. 31 is a diagram schematically illustrating a process of changing adjusted variables in a wireless power transmitter and a wireless power transmission method, according to an embodiment.

In operation S2210, the controller adjusts the duty cycle of the control signal, in response to the request signal input from the wireless power receiver. For example, in a case in which the wireless power receiver requires a larger amount of power, the controller increases the duty cycle, and, in a case in which the wireless power receiver requires a smaller amount of power, the controller decreases the duty cycle. Operation S2210 may also be performed in the boost mode, and may also be performed in the reduction mode.

Next, in operation S2220, it is determined whether the adjusted duty cycle is less than a reference value.

If it is determined, as a result of the determination in S2220, that the adjusted duty cycle is greater than the reference value, operation S2210 is performed.

If it is determined, as a result of the determination in operation S2220, that the adjusted duty cycle is equal to or lower than the reference value, the frequency of the power which is wirelessly transmitted is adjusted in operation S2230. In this case, the duty cycle is fixed to the reference value. In addition, the frequency of the power which is wirelessly transmitted is adjusted by adjusting the frequency of the control signal. For example, the amount of power received by the wireless power receiver is decreased by increasing the frequency of the control signal. In the case in which operation S2210 is performed in the boost mode, operation S2230 is performed in the normal mode.

Next, in operation S2240, it is determined whether the adjusted frequency is out of a reference range.

If it is determined, as a result of the determination in operation S2240, that the adjusted frequency is out of the reference range, the duty cycle is adjusted in operation S2250. For example, if it is determined, as a result of the determination in operation S2240, that the adjusted frequency is greater than or equal to the reference value, the frequency is fixed to the reference value and the duty cycle may is decreased. In the case in which operation S2230 is performed in the normal mode, operation S2250 is performed in the reduction mode. Alternatively, all of the operations illustrated in FIG. 24 may also be performed in the reduction mode.

Although FIG. 31 illustrates a case in which the amount of power received by the wireless power receiver is decreased by way of example, an operation of increasing the amount of power received by the wireless power receiver may be implemented in a manner similar to that illustrated in FIG. 31.

FIGS. 32 through 53D are diagrams respectively illustrating an operation of determining, by the controller, an operating frequency, an operating duty cycle and/or an inverter duty cycle. The controller determines the operating frequency, the operating duty cycle and/or an inverter duty cycle using the method which is each illustrated in FIGS. 32 through 53, and outputs the control signals that control the switching elements using the determined operating frequency, operating duty cycle and/or inverter duty cycle.

Error information errors in each of FIGS. 32 through 53D, which are information received from the wireless power receiver, may be included in the request signal req of FIGS. 7 through 16, and may also be provided to the controller in a form of an independent signal.

In each of FIGS. 32 through 53D, the operating duty cycle is a duty cycle of the control signal that controls a low side switching element (e.g., the second switching element Q21, Q22, Q23, Q24, Q25, Q26, Q28 and Q29 and/or the fourth switching element Q44, Q45, Q48 and Q49 of FIGS. 8 through 13, 15 and 16) or the sixth switching element Q69 or the switching element of the boost converter (i.e., the sixth switching element Q67 of FIG. 14). Therefore, a duty cycle of each of the controlling signals that control a high side switching element (e.g., the first switching element Q11, Q12, Q13, Q14, Q15, Q16, Q18 and Q19 and/or the third switching element Q34, Q35, Q38 and Q39 and the fifth switching element Q59 of FIGS. 8 through 13, FIGS. 15 and 16) is a 100-operating duty cycle d_c, or may be any duty cycle regardless of the operating duty cycle d_c.

In addition, in each of FIGS. 32 through 53D, the operating is an operating frequency of any one or any combination of any two or more of the switching elements (e.g., the switching elements Q11, Q21, Q12, Q22, Q13, Q23, Q14, Q24, Q34, Q44, Q15, Q25, Q35, Q45, Q16, Q26, 017, Q27, Q18, Q28, Q38, Q48, Q19 and Q29 of FIGS. 8 through 16) performing an inverter function.

In FIGS. 32 through 53D, the first reference frequency f1 and the second reference frequency f2 are set by the same method as those illustrated in FIG. 6. In addition, a first reference duty cycle d1 and a second reference duty cycle d2 are also set similarly to the setting of the first reference frequency f1 and the second reference frequency f2. For example, the first reference duty cycle d1, which is a lower limit value of the duty cycle which is adjustable in a first reduction mode, is determined by considering power transmission efficiency, element characteristics of the wireless power transmitter and the wireless power receiver, standards, or other protocols, and the second reference duty cycle d2, which is an upper limit value of the duty cycle which is adjustable in a first boost mode, is determined by considering power transmission efficiency, element characteristics of the wireless power transmitter and the wireless power receiver, a degree of heating, standards, or other protocols. The second reference frequency f2 is greater than the first reference frequency f1, and the second reference duty cycle d2 is greater than the first reference duty cycle d1. In addition, the first reference frequency f1 is less than or equal to a ping frequency f_p, and the second reference frequency f2 is greater than or equal to the ping frequency f_p. The first reference duty cycle d1 is less than or equal to a ping duty cycle d_p, and the second reference duty cycle d2 is greater than or equal to the ping duty cycle d_p. In addition, the first reference frequency f1 is greater than the resonance frequency of the resonator 120, 121, 122, 123, 124, 125, 126, 127, 128, 129-1 or 129-2) of FIGS. 7 through 16.

Figure 32:
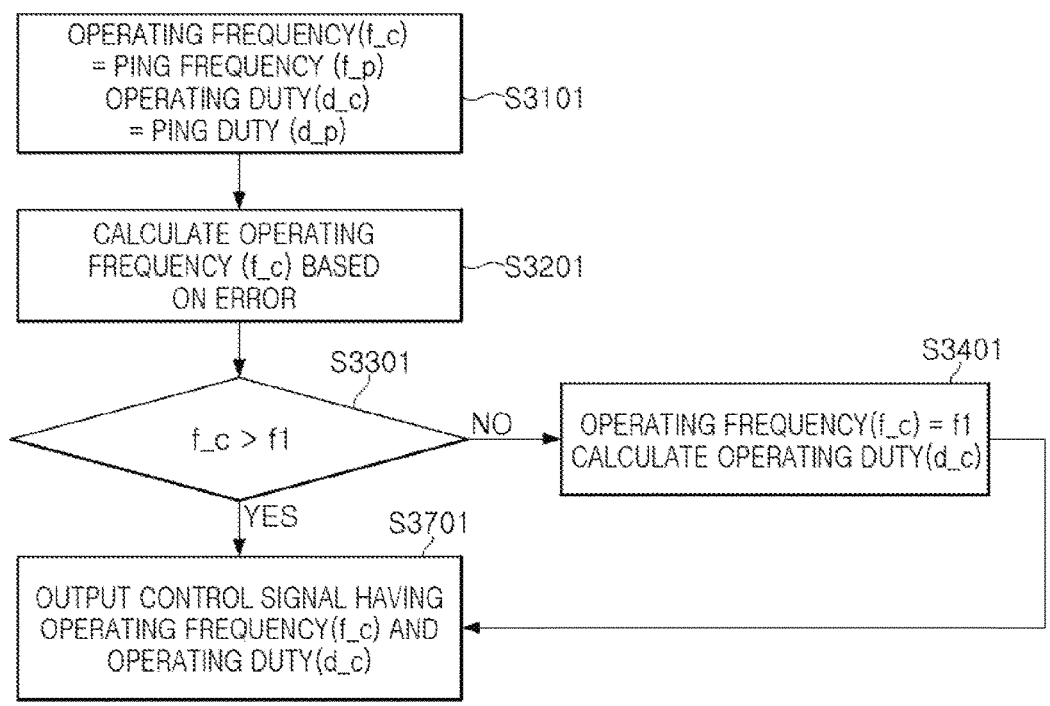
FIGS. 32 through 53D are operation flowcharts each illustrating an operation of a wireless power transmitter and a wireless power transmission method in a power transmission mode, according to an embodiment, and diagrams respectively illustrating examples of a change of an operating frequency and an operating duty cycle.

FIG. 32 is an operation flowchart illustrating an operation of a wireless power transmitter in a power transmission mode or a wireless power transmission method, according to an embodiment.

Referring to FIG. 32, first, in operation S3101, the controller sets the operating frequency f_c to the ping frequency f_p, and sets the operating duty cycle d_c to the ping duty cycle d_p. Operation S3101 is performed in the detection mode.

Next, in operation S3201, the controller calculates the operating frequency f_c based on the error information error received from the wireless power receiver. In this case, the operating duty cycle d_c is fixed to the ping duty cycle d_p. The error information error is information regarding a difference between the amount of power required by the wireless power receiver and the amount of power received by the wireless power receiver.

Next, in operation S3301, it is determined whether the calculated operating frequency f_c is greater than the first reference frequency f1.

If it is determined, as a result of the determination in operation S3301, that the calculated operating frequency f_c is greater than the first reference frequency f1, the controller generates the control signals using the calculated operating frequency f_c and operating duty cycle d_c, and outputs the generated control signals in operation S3701.

If it is determined, as a result of the determination in operation S3301, that the operating frequency f_c is less than or equal to the first reference frequency f1, the controller sets the operating frequency f_c to the first reference frequency f1, and calculates the operating duty cycle d_c based on the error information error in operation S3401.

After performing operation S3401, the controller generates the control signals using the calculated operating frequency f_c and operating duty cycle d_c, and outputs the generated control signals in operation S3701.

Figure 33:
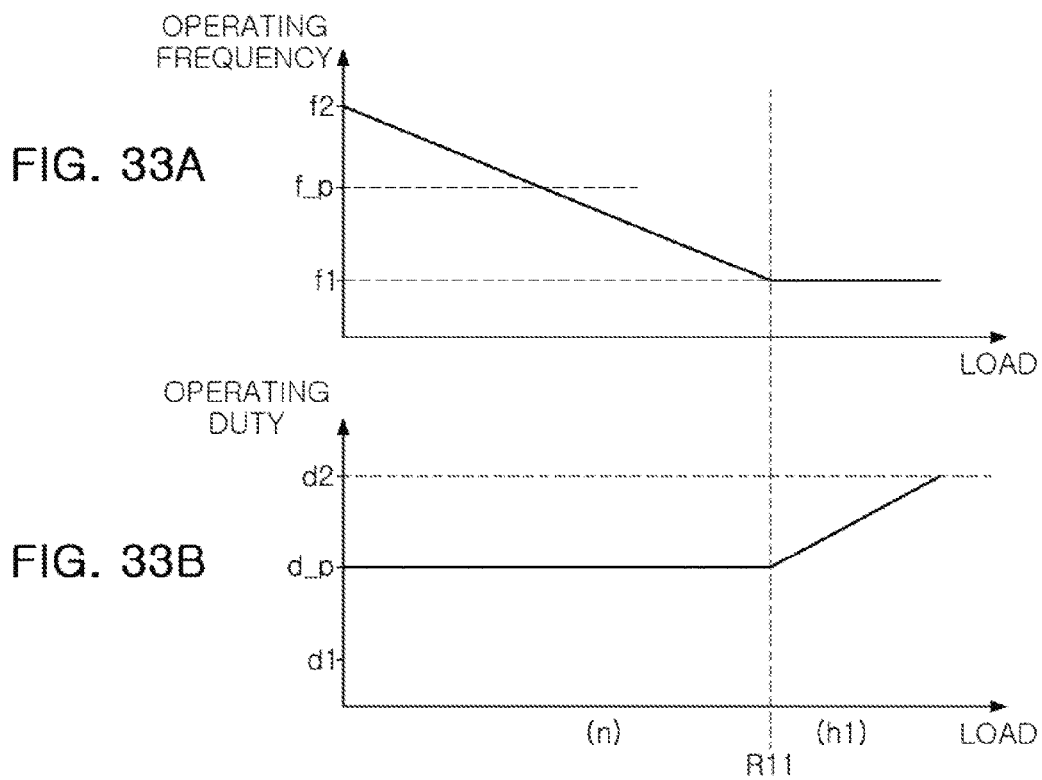

FIG. 33 is a diagram illustrating a change in the operating frequency and the operating duty cycle in the power transmission mode of the wireless power transmitter or the wireless power transmission method, according to an embodiment.

First, in the normal mode n, the controller adjusts the amount of power received by the wireless power receiver by varying the operating frequency f_c, in response to the error information received from the wireless power receiver. In this case, the operating duty cycle d_c is fixed to the ping duty cycle d_p. In the normal mode n, the operating frequency f_c is varied within the range of the first reference frequency f1 and the second reference frequency f2.

When the amount of power received by the wireless power receiver is less than the amount of power required by the wireless power receiver, even in the case in which the operating frequency f_c is decreased up to the first reference frequency f1, the operation mode of the controller is changed to the first boost mode h1, and the controller adjusts the operating duty cycle d_c after fixing the operating frequency f_c to the first reference frequency f1. In the first boost mode h1, the operating duty cycle d_c is varied within the range of the ping duty cycle d_p and the second reference duty cycle d2.

An operation of FIG. 33 will be described below with reference to the amount of power required by the wireless power receiver, that is, a load amount.

If the load amount is less than a first reference load amount R11, the controller is operated in the normal mode n. In the normal mode n, the controller fixes the operating duty cycle d_c to the ping duty cycle d_p, and varies the operating frequency f_c. In the normal mode, the operating frequency f_c is varied within the range of the first reference frequency f1 and the second reference frequency f2.

If the load amount is greater than the first reference load amount R11, the controller is operated in the first boost mode h1. In the first boost mode h1, the controller fixes the operating frequency f_c to the first reference frequency f1, and varies the operating duty cycle d_c. In the first boost mode h1, the controller varies the operating duty cycle d_c in the range of the ping duty cycle d_p and the second duty cycle.

Figure 34:
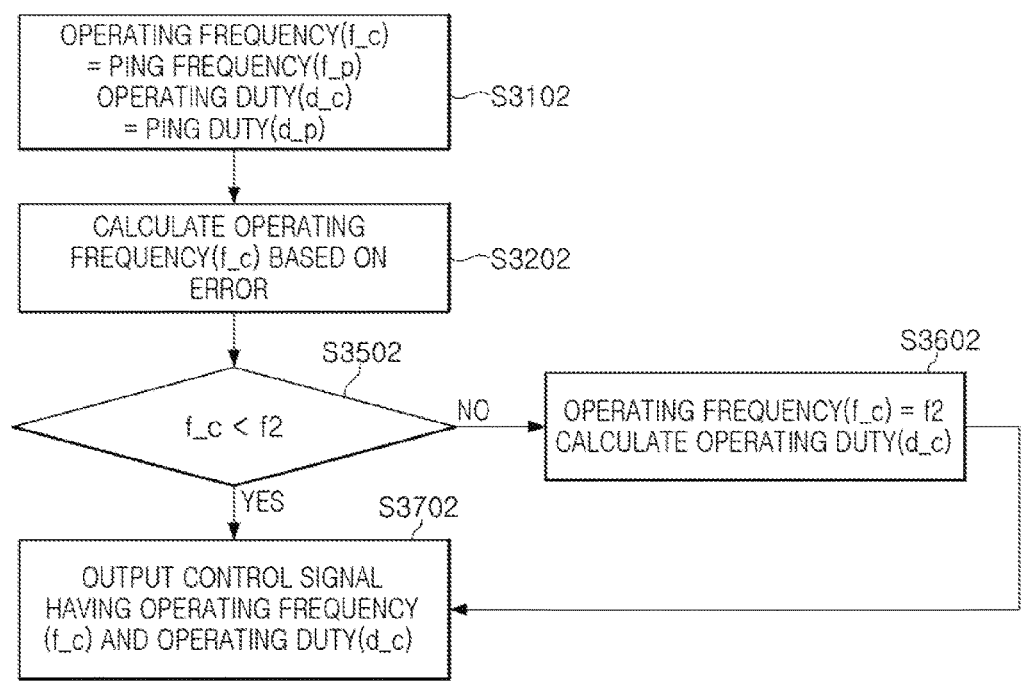

FIG. 34 is an operation flowchart illustrating an operation of the wireless power transmitter in a power transmission mode or the wireless power transmission method, according to an embodiment.

First, in operation S3102, the controller sets the operating frequency f_c to the ping frequency f_p, and sets the operating duty cycle d_c to the ping duty cycle d_p. Operation S3102 is performed in the detection mode.

Next, in operation S3202, the controller calculates the operating frequency f_c based on the error information error received from the wireless power receiver. In this case, the operating duty cycle d_c may be fixed to the ping duty cycle d_p. The error information error is information regarding a difference between the amount of power required by the wireless power receiver and the amount of power received by the wireless power receiver.

Next, in operation S3502, it is determined whether the calculated operating frequency f_c is less than the second reference frequency f2.

If it is determined, as a result of the determination in operation S3502, that the calculated operating frequency f_c is less than the second reference frequency f2, the controller generates the control signals using the calculated operating frequency f_c and operating duty cycle d_c, and outputs the generated control signals in operation S3702.

If it is determined, as a result of the determination in operation S3502, that the operating frequency f_c is greater than or equal to the second reference frequency f2, the controller sets the operating frequency f_c to the second reference frequency f2, and calculates the operating duty cycle d_c based on the error information error in operation S3602.

After performing operation S3602, the controller generates the control signals using the calculated operating frequency f_c and operating duty cycle d_c, and outputs the generated control signals in operation S3702.

Figure 35A:
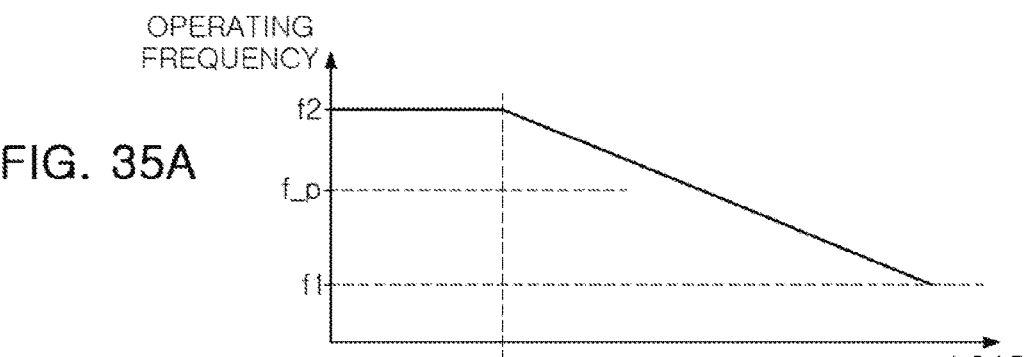
Figure 35B:
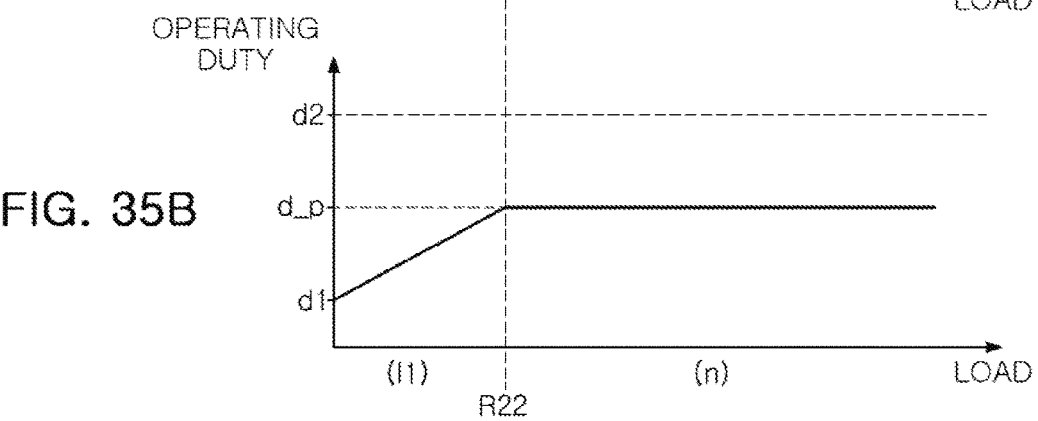

FIGS. 35A and 35B are diagrams illustrating a change in the operating frequency and the operating duty cycle in the power transmission mode of the wireless power transmitter or the wireless power transmission method, according to an embodiment.

Referring to FIGS. 35A and 35B, first, in the normal mode n, the controller adjusts the amount of power received by the wireless power receiver by varying the operating frequency f_c, in response to the error information error received from the wireless power receiver. In this case, the operating duty cycle d_c is fixed to the ping duty cycle d_p.

When the amount of power received by the wireless power receiver is greater than the amount of power required by the wireless power receiver, even in the case in which the operating frequency f_c is increased up to the second reference frequency f2, the operation mode of the controller is changed to a first reduction mode l1, and the controller adjusts the operating duty cycle d_c after fixing the operating frequency f_c to the second reference frequency f2.

An operation of FIGS. 35A and 35B will be described below with reference to the amount of power required by the wireless power receiver, that is, a load amount.

If the load amount is greater than a second reference load amount R22, the controller is operated in the normal mode n. In the normal mode n, the controller fixes the operating duty cycle d_c to the ping duty cycle d_p, and varies the operating frequency f_c. In the normal mode, the operating frequency f_c is varied within the range of the first reference frequency f1 and the second reference frequency f2.

If the load amount is less than the second reference load amount R22, the controller is operated in the first reduction mode l1. In the first reduction mode l1, the controller fixes the operating frequency f_c to the second reference frequency f2, and varies the operating duty cycle d_c. In the first reduction mode l1, the controller varies the operating duty cycle d_c in the range of the ping duty cycle d_p and the first duty cycle d1.

Figure 36:
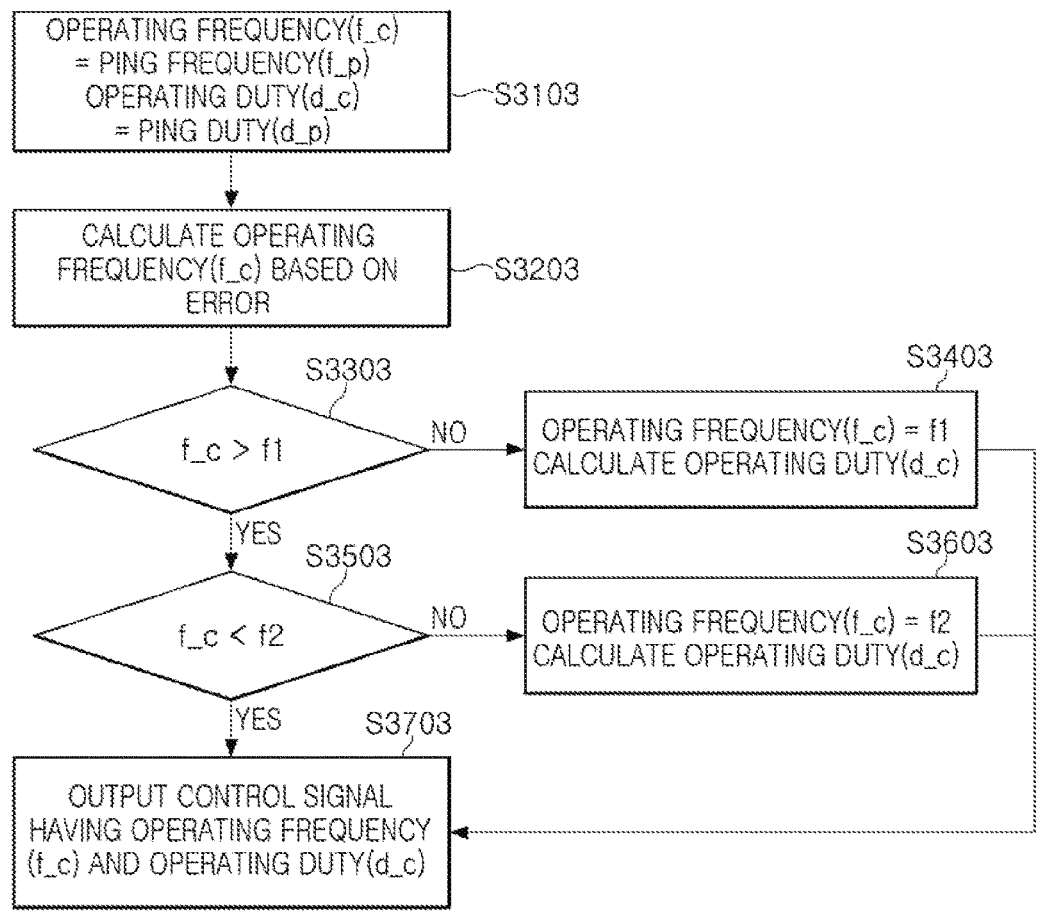

FIG. 36 is an operation flowchart illustrating an operation of the wireless power transmitter in a power transmission mode or the wireless power transmission method, according to an embodiment.

Referring to FIG. 36, first, in operation S3103, the controller sets the operating frequency f_c to the ping frequency f_p, and set the operating duty cycle d_c to the ping duty cycle d_p. Operation S3103 is performed in the detection mode.

Next, in operation S3203, the controller calculates the operating frequency f_c based on the error information error received from the wireless power receiver. In this case, the operating duty cycle d_c is fixed to the ping duty cycle d_p. The error information error is information regarding a difference between the amount of power required by the wireless power receiver and the amount of power received by the wireless power receiver.

Next, in operation S3303, it is determined whether the calculated operating frequency f_c is greater than the first reference frequency f1.

If it is determined, as a result of the determination in operation S3303, that the operating frequency f_c is less than or equal to the first reference frequency f1, the controller sets the operating frequency f_c to the first reference frequency f1, and calculates the operating duty cycle d_c based on the error information error in operation S3403.

After performing operation S3403, the controller generates the control signals using the calculated operating frequency f_c and operating duty cycle d_c, and output the generated control signals in operation S3703.

If it is determined, as a result of the determination in operation S3303, that the calculated operating frequency f_c is greater than the first reference frequency f1, it is determined, in operation S3503, whether the calculated operating frequency f_c is less than the second reference frequency f2.

If it is determined, as a result of the determination in operation S3503, that the calculated operating frequency f_c is less than the second reference frequency f2, that is, the operating frequency f_c calculated in operation S3203 is a value between the first reference frequency f1 and the second reference frequency f2, the controller generates the control signals using the calculated operating frequency f_c and operating duty cycle d_c, and outputs the generated control signals in operation S3703.

If, as a result of the determination in operation S3503, that the operating frequency f_c is greater than or equal to the second reference frequency f2, the controller sets the operating frequency f_c to the second reference frequency f2, and calculates the operating duty cycle d_c based on the error information error in operation S3603.

After performing operation S3603, the controller generates the control signals using the calculated operating frequency f_c and operating duty cycle d_c, and outputs the generated control signals in operation S3703.

Figure 37A:
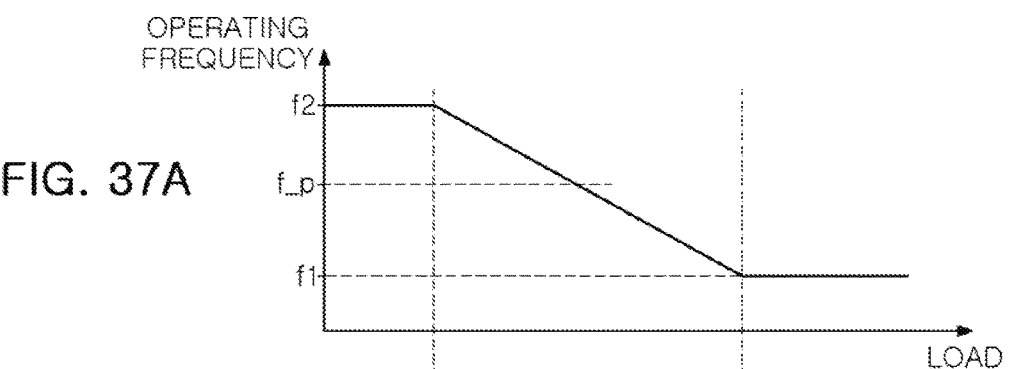
Figure 37B:
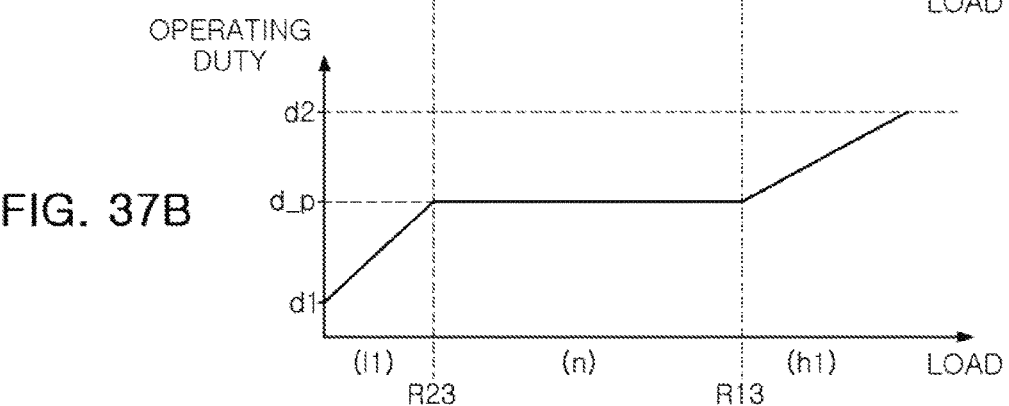

FIGS. 37A and 37B are diagrams illustrating a change in the operating frequency and the operating duty cycle in the power transmission mode of the wireless power transmitter or the wireless power transmission method, according to an embodiment.

Referring to FIGS. 37A and 37B, in the normal mode n, the controller adjusts the amount of power received by the wireless power receiver by varying the operating frequency f_c, in response to the error information received from the wireless power receiver. In this case, the operating duty cycle d_c is fixed to the ping duty cycle d_p.

When the amount of power received by the wireless power receiver is less than the amount of power required by the wireless power receiver, even in the case in which the operating frequency f_c is decreased up to the first reference frequency f1, the operation mode of the controller is changed to the first boost mode h1, and the controller adjusts the operating duty cycle d_c after fixing the operating frequency f_c to the first reference frequency f1.

When the amount of power received by the wireless power receiver is greater than the amount of power required by the wireless power receiver, even in the case in which the operating frequency f_c is increased up to the second reference frequency f2, the operation mode of the controller is changed to a first reduction mode l1, and the controller adjusts the operating duty cycle d_c after fixing the operating frequency f_c to the second reference frequency f2.

An operation of FIGS. 37A and 37B will be described below with reference to the amount of power required by the wireless power receiver, that is, a load amount.

If the load amount is less than a first reference load amount R13 and is greater than a second reference load amount R23, the controller is operated in the normal mode n. In the normal mode n, the controller fixes the operating duty cycle d_c to the ping duty cycle d_p, and varies the operating frequency f_c. In the normal mode, the operating frequency f_c is varied within the range of the first reference frequency f1 and the second reference frequency f2.

If the load amount is greater than the first reference load amount R13, the controller is operated in the first boost mode h1. In the first boost mode h1, the controller fixes the operating frequency f_c to the first reference frequency f1, and varies the operating duty cycle d_c. In the first boost mode h1, the controller varies the operating duty cycle d_c in the range of the ping duty cycle d_p and the second duty cycle d2.

If the load amount is less than the second reference load amount R22, the controller is operated in the first reduction mode l1. In the first reduction mode l1, the controller fixes the operating frequency f_c to the second reference frequency f2, and varies the operating duty cycle d_c. In the first reduction mode l1, the controller varies the operating duty cycle d_c in the range of the ping duty cycle d_p and the first duty cycle d1.

Figure 38:
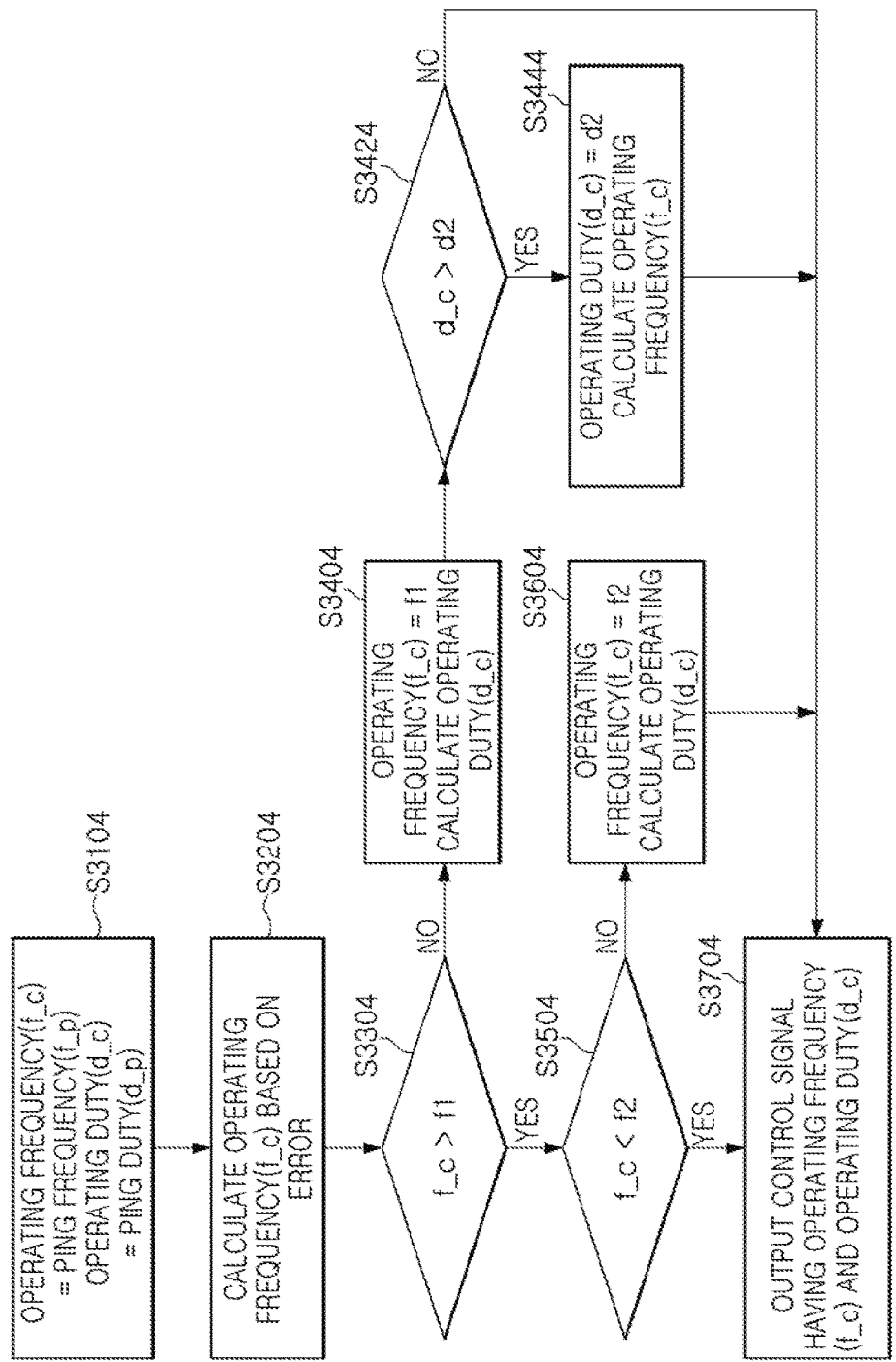

FIG. 38 is an operation flowchart illustrating an operation of the wireless power transmitter in a power transmission mode or the wireless power transmission method, according to an embodiment.

Referring to FIG. 38, in operation S3104, the controller first set the operating frequency f_c to the ping frequency f_p, and set the operating duty cycle d_c to the ping duty cycle d_p. Operation S3104 is performed in the detection mode.

Next, in operation S3204, the controller calculates the operating frequency f_c based on the error information error received from the wireless power receiver. In this case, the operating duty cycle d_c is fixed to the ping duty cycle d_p. The error information error is information regarding a difference between the amount of power required by the wireless power receiver and the amount of power received by the wireless power receiver.

Next, in operation S3304, it is determined whether the calculated operating

If it is determined, as a result of the determination in operation S3304, that the operating frequency f_c is less than or equal to the first reference frequency f1, the controller sets the operating frequency f_c to the first reference frequency f1, and calculates the operating duty cycle d_c based on the error information error in operation S3404.

Next, in operation S3424, it is determined whether the calculated operating duty cycle d_c is greater than the second reference duty cycle d2.

If it is determined, a result of the determination in operation S3424, that the calculated operating duty cycle d_c is less than or equal to the second reference duty cycle d2, the controller generates the control signals using the calculated operating frequency f_c and operating duty cycle d_c, and outputs the generated control signals in operation S3704.

If it is determined, as a result of the determination in operation S3424, that the calculated operating duty cycle d_c is greater than the second reference duty cycle d2, the controller fixes the operating duty cycle d_c to the second duty cycle, and again calculates the operating frequency f_c based on the error information error in operation S3444.

After performing operation S3444, the controller generates the control signals using the calculated operating frequency f_c and operating duty cycle d_c, and outputs the generated control signals in operation S3704.

If it is determined, as a result of the determination in operation S3304, that the calculated operating frequency f_c is greater than the first reference frequency f1, it is determined whether the calculated operating frequency f_c is less than the second reference frequency f2 in operation S3504.

If it is determined, as a result of the determination in operation S3504, that the calculated operating frequency f_c is less than the second reference frequency f2, that is, the operating frequency f_c calculated in operation S3204 is a value between the first reference frequency f1 and the second reference frequency f2, the controller generates the control signals using the calculated operating frequency f_c and operating duty cycle d_c, and outputs the generated control signals in operation S3704.

If it is determined, as a result of the determination in operation S3504, that the operating frequency f_c is greater than or equal to the second reference frequency f2, the controller sets the operating frequency f_c to the second reference frequency f2, and calculates the operating duty cycle d_c based on the error information error in operation S3604.

After performing operation S3604, the controller generates the control signals using the calculated operating frequency f_c and operating duty cycle d_c, and outputs the generated control signals in operation S3704.

Figure 39A:
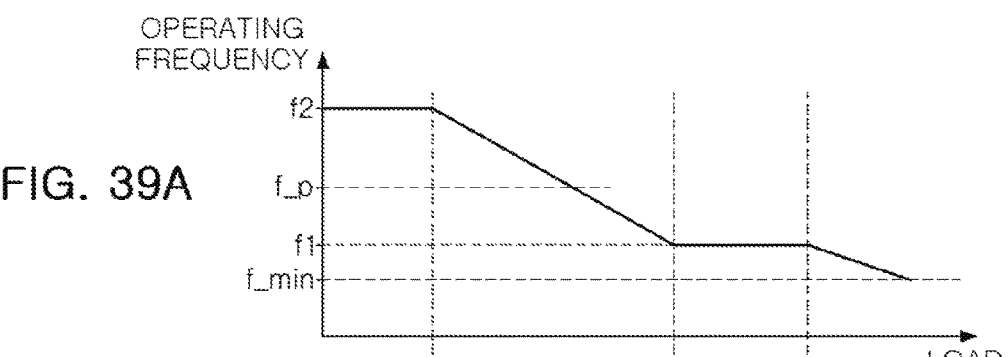
Figure 39B:
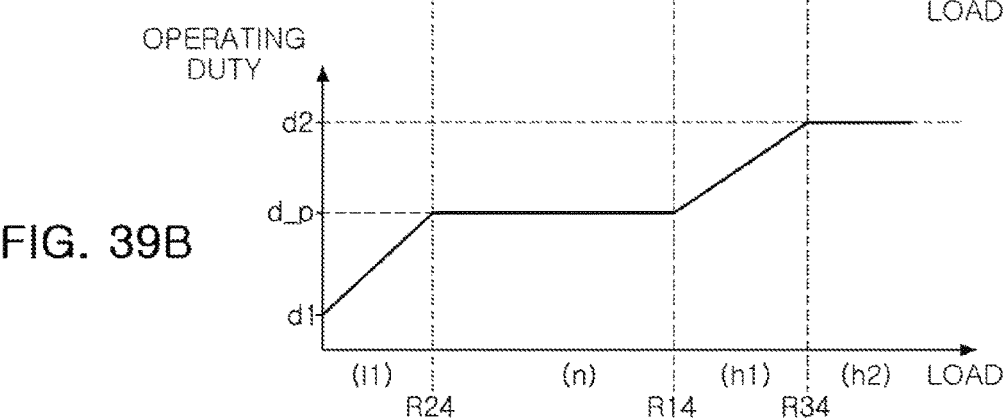

FIGS. 39A and 39B are diagrams illustrating a change in the operating frequency and the operating duty cycle in the power transmission mode of the wireless power transmitter or the wireless power transmission method, according to an embodiment.

Referring to FIGS. 39A and 39B, first, in the normal mode n, the controller adjusts the amount of power received by the wireless power receiver by varying the operating frequency f_c, in response to the error information received from the wireless power receiver. In this case, the operating duty cycle d_c is fixed to the ping duty cycle d_p. In the normal mode n, the operating frequency f_c is varied within the range of the first reference frequency f1 and the second reference frequency f2.

When the amount of power received by the wireless power receiver is less than the amount of power required by the wireless power receiver, even in the case in which the operating frequency f_c is decreased up to the first reference frequency f1, the operation mode of the controller is changed to the first boost mode h1, and the controller adjusts the operating duty cycle d_c after fixing the operating frequency f_c to the first reference frequency f1. In the first boost mode h1, the operating duty cycle d_c is varied within the range of the ping duty cycle d_p and the second reference duty cycle d2.

When the amount of power received by the wireless power receiver is less than the amount of power required by the wireless power receiver, even in the case in which the operating duty cycle d_c is increased up to the second reference duty cycle d2 in the first boost mode h1, the operation mode of the controller is changed to a second boost mode h2, and the controller adjusts the amount of power received by the wireless power receiver by varying the operating frequency f_c. In the second boost mode h2, the operating duty cycle d_c is fixed to the second reference duty cycle d2. In the second boost mode h2, the operating frequency f_c is varied within the range of the first reference frequency f1 and a minimum frequency f_min.

In the normal mode, when the amount of power received by the wireless power receiver is greater than the amount of power required by the wireless power receiver, even in the case in which the operating frequency f_c is increased up to the second reference frequency f2, the operation mode of the controller is changed to the first reduction mode l1, and the controller adjusts the operating duty cycle d_c after fixing the operating frequency f_c to the second reference frequency f2. In the first reduction mode l1, the operating duty cycle d_c is varied within the range of the first reference duty cycle d1 and the ping duty cycle d_p.

An operation of FIGS. 39A and 39B will be described below with reference to the amount of power required by the wireless power receiver, that is, a load amount.

If the load amount is less than a first reference load amount R14 and is greater than a second reference load amount R24, the controller is operated in the normal mode. If the load amount is greater than the first reference amount R14 and is less than a third reference load amount R34, the controller is operated in the first boost mode h1. If the load amount is less than the second reference amount R24, the controller is operated in the first reduction mode l1. The operations in the first reduction mode l1, the normal mode n, and the first boost mode h1 are the same as those described in FIGS. 37A and 37B.

If the load amount is greater than the third reference load amount R34, the controller is operated in the second boost mode h2. In the second boost mode h2, the controller fixes the operating duty cycle d_c to the second reference duty cycle d2, and varies the operating frequency f_c. In the second boost mode h2, the operating frequency f_c is varied within the range of the first reference frequency f1 and the minimum frequency f_min.

Figure 40:
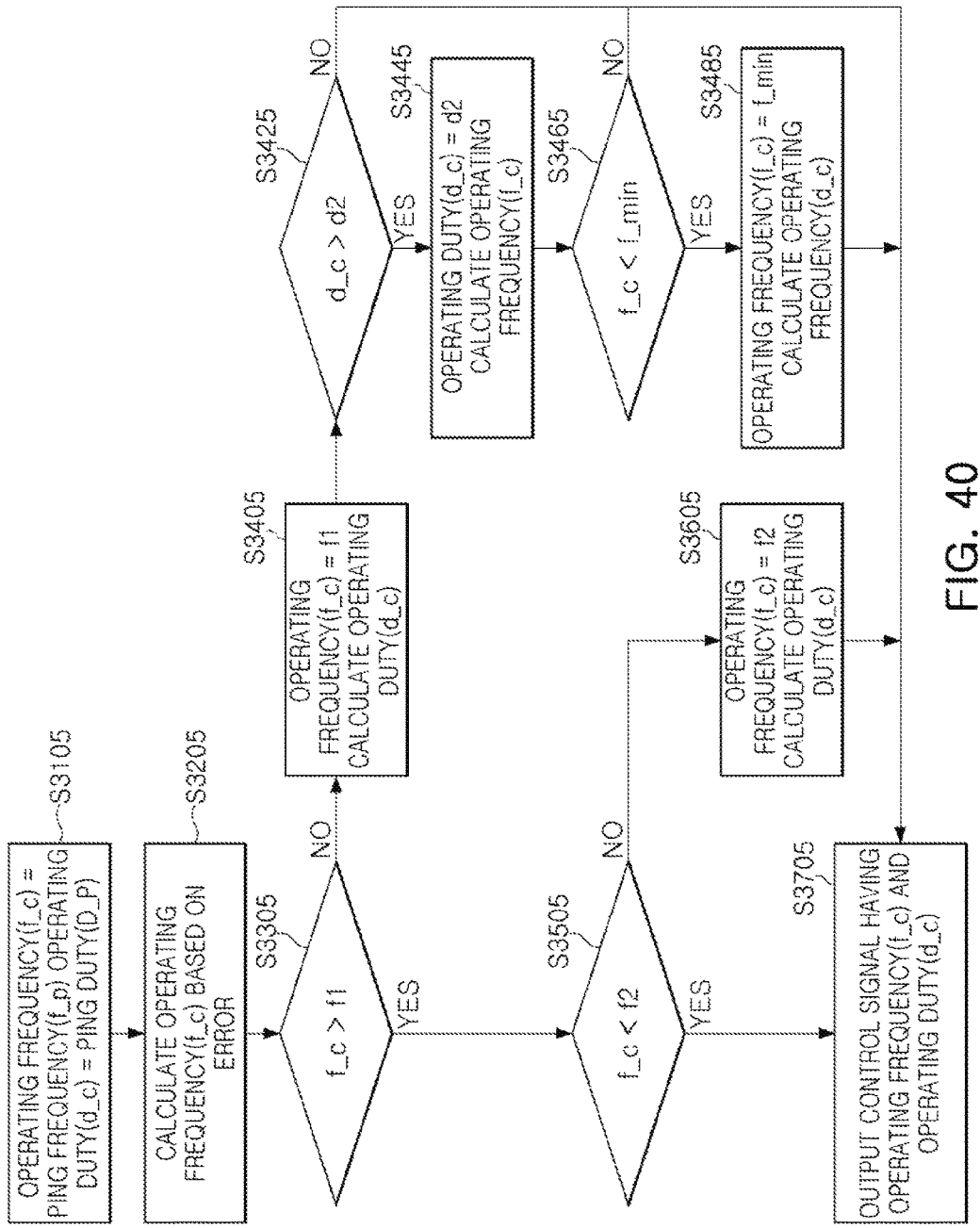

FIG. 40 is an operation flowchart illustrating an operation of the wireless power transmitter in a power transmission mode or the wireless power transmission method, according to an embodiment.

Referring to FIG. 40, operations S3105, S3205, S3305, S3405, S3425, S3445, S3505, S3605, and S3705 are the same as operations S3104, S3204, S3304, S3404, S3424, S3444, S3504, S3604, and S3704 described in FIG. 38, respectively.

After the operating frequency f_c is calculated in operation S3445, the controller may determine determines whether the operating frequency f_c is less than the minimum frequency f_min in operation S3465.

If it is determined, as a result of the determination in operation S3465, that the operating frequency f_c calculated in operation S3445 is greater than or equal to the minimum frequency f_min, the controller generates the control signals using the calculated operating frequency f_c and operating duty cycle d_c, and outputs the generated control signals in operation S3705.

If it is determined, as a result of the determination in operation S3465, that the operating frequency f_c calculated in operation S3445 is less than the minimum frequency f_min, the controller may sets the operating frequency to the minimum frequency f_min, and calculates the operating duty cycle d_c based on the error information error in operation S3485. In operation S3485, the operating duty cycle d_c is greater than the second reference duty cycle d2. For example, the operating duty cycle d_c has a value of 50% or more.

After performing operation S3485, the controller generates the control signals using the calculated operating frequency f_c and operating duty cycle d_c, and outputs the generated control signals in operation S3705.

FIGS. 41A an 41B are diagrams illustrating a change in the operating frequency and the operating duty cycle in the power transmission mode of the wireless power transmitter or the wireless power transmission method, according to an embodiment.

Referring to FIGS. 41A and 41B, the operations in the first reduction mode l1, the normal mode n, the first boost mode h1, and the second boost mode h2 are the same as those described in FIG. 34.

In the second boost mode h2, when the amount of power received by the wireless power receiver is less than the amount of power required by the wireless power receiver, even in the case in which the operating frequency is decreased up to the minimum frequency f_min, the operation mode of the controller is changed to a third boost mode h3. In the third boost mode h3, the controller fixes the operating frequency f_c to the minimum frequency f_min, and increases the operating duty cycle d_c. In the third boost mode h3, the operating duty cycle d_c has a value of the second reference duty cycle d2 or more. For example, in the third boost mode h3, the operating duty cycle d_c is adjusted in the range of the second reference duty cycle d2 or more and the maximum duty cycle d_max or less. The second reference duty cycle d2 and the maximum duty cycle d_max are set by a user in consideration of limitations according to standards and other protocols, or an environment in which the wireless power transmitter is used.

That is, if the load amount is greater than a fifth reference load amount R55, the controller is operated in the third boost mode h3.

Figure 42:
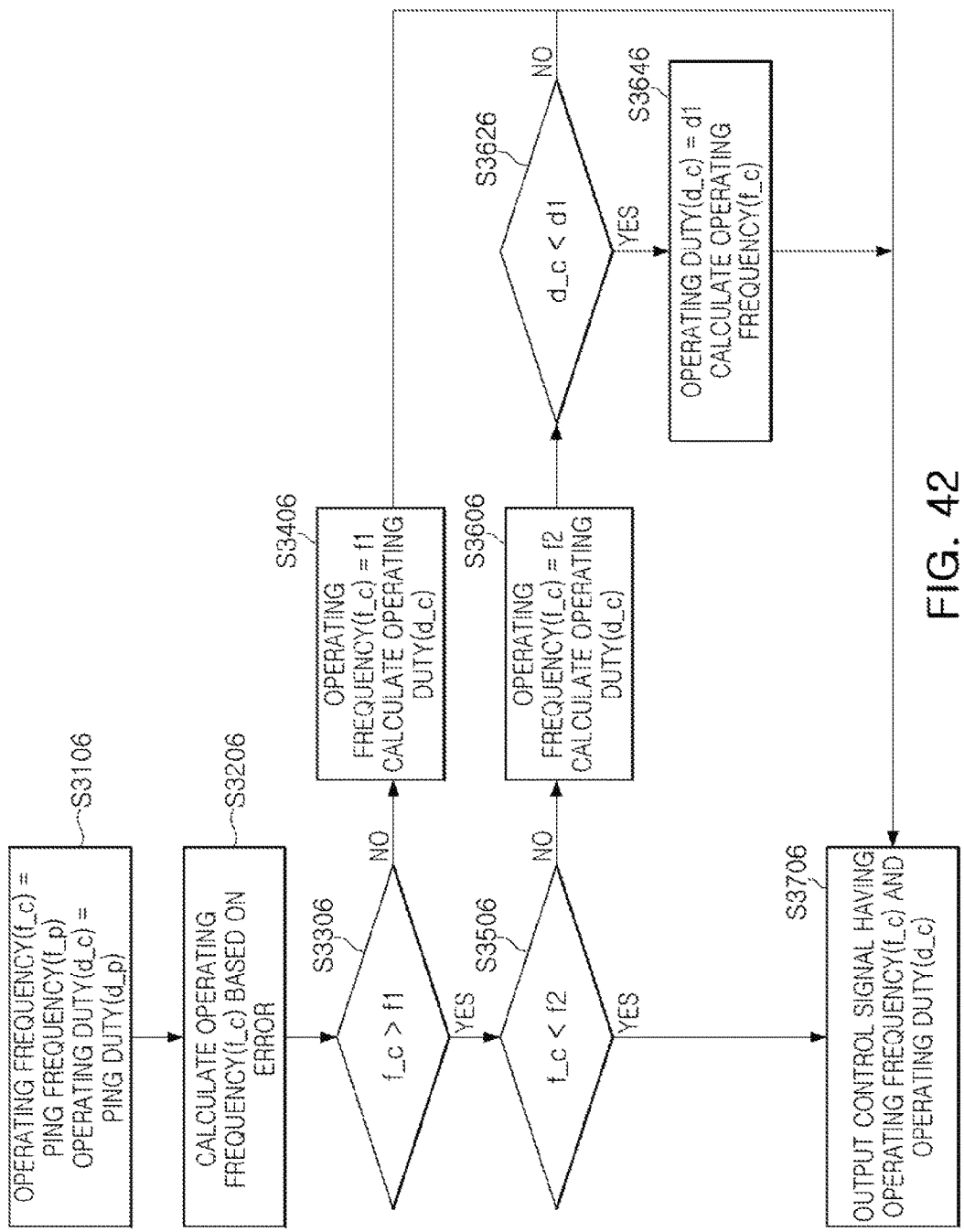

FIG. 42 is an operation flowchart illustrating an operation of the wireless power transmitter in a power transmission mode or the wireless power transmission method, according to an embodiment.

Referring to FIG. 42, operations S3106, S3206, S3306, S3406, S3506, S3606, and S3706 are the same as operations S3103, S3203, S3303, S3403, S3503, S3603, and S3703 described in FIG. 33, respectively.

After the operating duty cycle d_c is calculated in operation S3606, the controller determines whether the calculated operating duty cycle d_c is less than the first reference duty cycle d1 in operation S3626.

As a result of the determination in operation S3626, if the operating duty cycle d_c is greater than or equal to the first reference duty cycle d1, the controller generates the control signals using the operating frequency f_c and the operating duty cycle d_c calculated in operation S3606, and outputs the generated control signals in operation S3706).

If it is determined that, as a result of the determination in operation S3626, that the operating duty cycle d_c is less than the first reference duty cycle d1, the controller fixes the operating duty cycle d_c to the first reference duty cycle d1, and calculates the operating frequency f_c based on the error information error in operation S3646.

After performing operation S3646, the controller generates the control signals using the calculated operating frequency f_c and operating duty cycle d_c, and outputs the generated control signals in operation S3706.

Figure 43A:
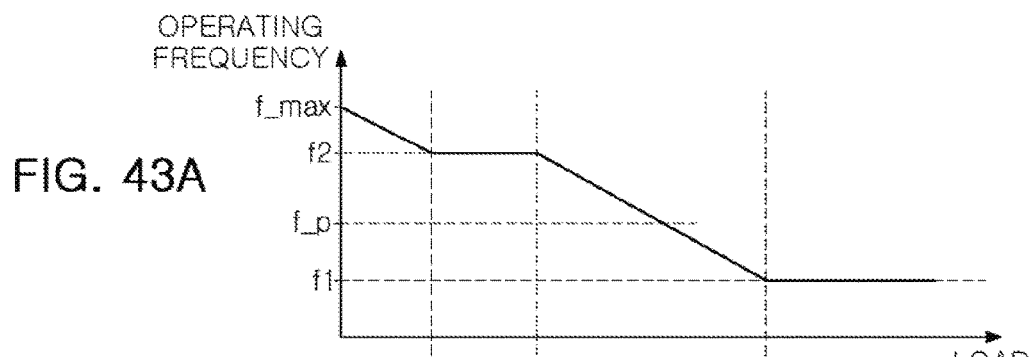
Figure 43B:
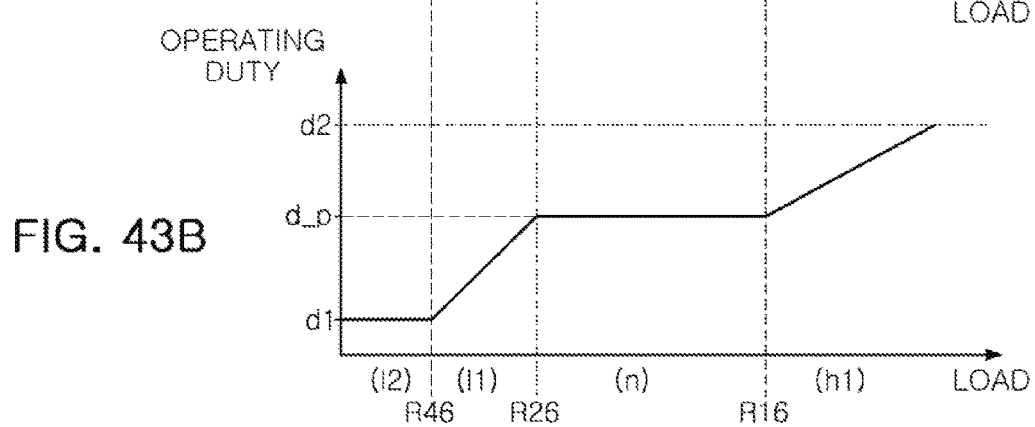

FIGS. 43A and 43B are diagrams illustrating a change in the operating frequency and the operating duty cycle in the power transmission mode of the wireless power transmitter or the wireless power transmission method, according to an embodiment.

Referring to FIGS. 43A and 43B, operations in the first reduction mode l1, the normal mode n, and the first boost mode h1 are the same as those described in FIG. 37.

In the first reduction mode l1, when the amount of power received by the wireless power receiver is greater than the amount of power required by the wireless power receiver, even in the case in which the operating duty cycle d_c is decreased up to the first reference duty cycle d1, the operation mode of the controller is changed to a second reduction mode l2. In the second reduction mode l2, the controller fixes the operating duty cycle d_c to the first reference duty cycle d1, and varies the operating frequency f_c. In the second reduction mode l2, the operating frequency f_c is varied within the range of the second reference frequency f2 and the maximum frequency f_max.

That is, if the load amount is greater than a fourth reference load amount R46, the controller is operated in the second reduction mode l2.

Figure 44:
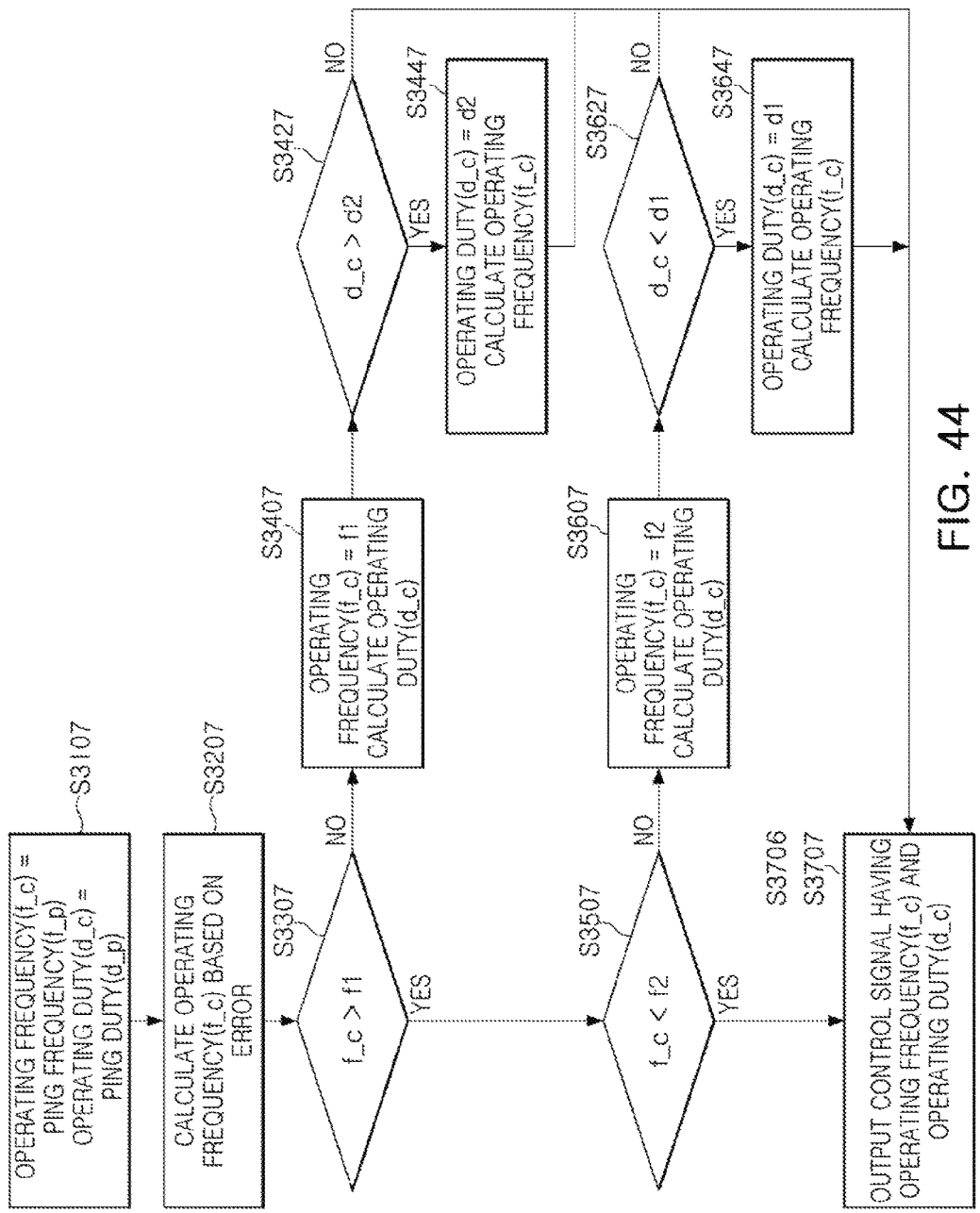
Figure 45:
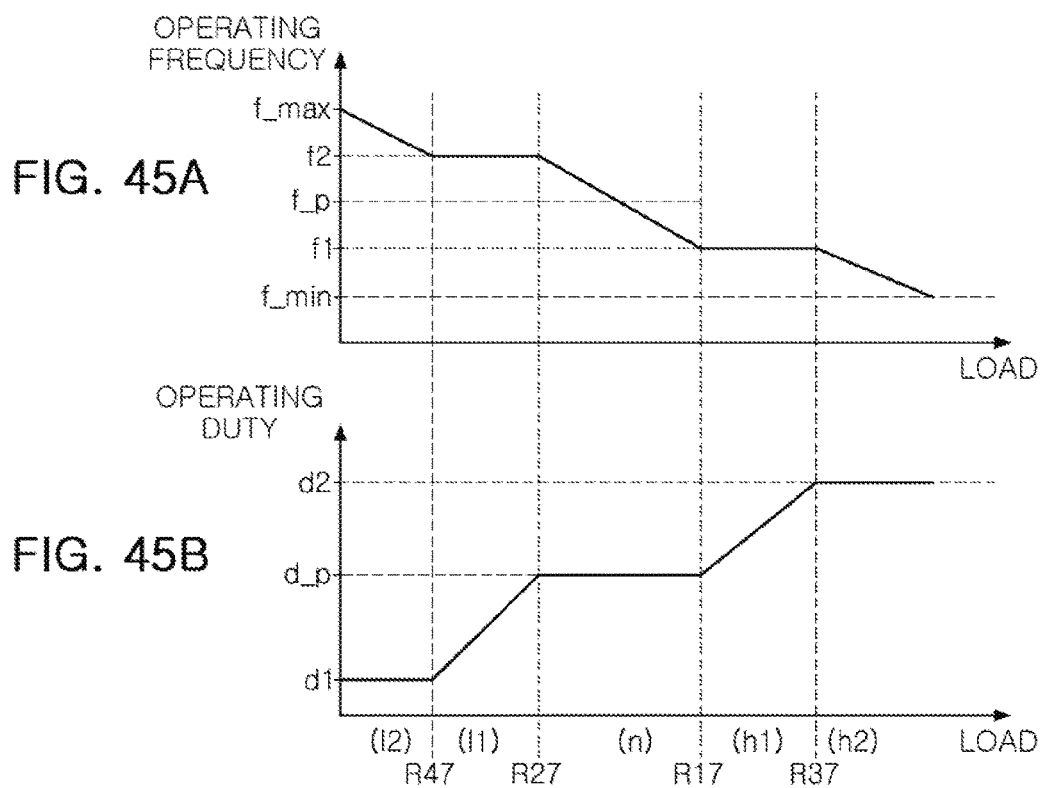

FIG. 44 is an operation flowchart illustrating an operation of the wireless power transmitter in a power transmission mode or the wireless power transmission method, according to an embodiment.

Referring to FIG. 44, operations S3107, S3207, S3307, S3407, S3507, S3607, and S3707 are the same as operations S3103, S3203, S3303, S3403, S3503, S3603, and S3703 described in FIG. 36, respectively.

After the operating duty cycle d_c is calculated in operation S3407, the controller determines, in operation S3427, whether the calculated operating duty cycle d_c is greater than the second reference duty cycle d2.

If it is determined, as a result of the determination in operation S3427, that the calculated operating duty cycle d_c is less than or equal to the second reference duty cycle d2, the controller generates the control signals using the operating frequency f_c and the operating duty cycle d_c which are calculated in operation S3407, and outputs the generated control signals (S3707).

If it is determined, as a result of the determination in operation S3427, that the calculated operating duty cycle d_c is greater than the second reference duty cycle d2, the controller may fixes the operating duty cycle d_c to the second duty cycle, and again calculates the operating frequency f_c based on the error information error in operation S3447.

After performing operation S3447, the controller generates the control signals using the calculated operating frequency f_c and operating duty cycle d_c, and outputs the generated control signals in operation S3707.

After the operating duty cycle d_c is calculated in operation S3607, the controller determines, in operation S3627, whether the calculated operating duty cycle d_c is less than the first reference duty cycle d1.

If it is determined, as a result of the determination in operation S3627, that the operating duty cycle d_c is greater than or equal to the first reference duty cycle d1, the controller generates the control signals using the operating frequency f_c and the operating duty cycle d_c which are calculated in operation S3607, and outputs the generated control signals in operation S3707.

If it is determined, as a result of the determination in operation S3627, that the operating duty cycle d_c is less than the first reference duty cycle d1, the controller fixes the operating duty cycle d_c to the first reference duty cycle d1, and calculates the operating frequency f_c based on the error information error in operation S3647.

After performing operation S3647, the controller generates the control signals using the calculated operating frequency f_c and operating duty cycle d_c, and outputs the generated control signals in operation S3707.

FIGS. 45A and 45B are diagrams illustrating a change in the operating frequency and the operating duty cycle in the power transmission mode of the wireless power transmitter or the wireless power transmission method, according to an embodiment.

Referring to FIGS. 45A and 45B, operations in the first reduction mode l1, the normal mode n, and the first boost mode h1 are the same as those described in FIGS. 37A and 37B.

In the first reduction mode l1, when the amount of power received by the wireless power receiver is greater than the amount of power required by the wireless power receiver, even in the case in which the operating duty cycle d_c is decreased up to the first reference duty cycle d1, the operation mode of the controller is changed to a second reduction mode l2. In the second reduction mode l2, the controller fixes the operating duty cycle d_c to the first reference duty cycle d1, and varies the operating frequency f_c. In the second reduction mode l2, the operating frequency f_c is varied within the range of the second reference frequency f2 and the maximum frequency f_max.

That is, if the load amount is greater than a fourth reference load amount R47, the controller is operated in the second reduction mode l2.

When the amount of power received by the wireless power receiver is less than the amount of power required by the wireless power receiver, even in the case in which the operating duty cycle d_c is increased up to the second reference duty cycle d2 in the first boost mode h1, the operation mode of the controller is changed to a second boost mode h2, and the controller adjusts the amount of power received by the wireless power receiver by varying the operating frequency f_c. In the second boost mode h2, the operating duty cycle d_c is fixed to the second reference duty cycle d2. In the second boost mode h2, the operating frequency f_c is varied within the range of the first reference frequency f1 and a minimum frequency f_min.

That is, if the load amount is greater than a third reference load amount R37, the controller is operated in the second boost mode h2.

Figure 46:
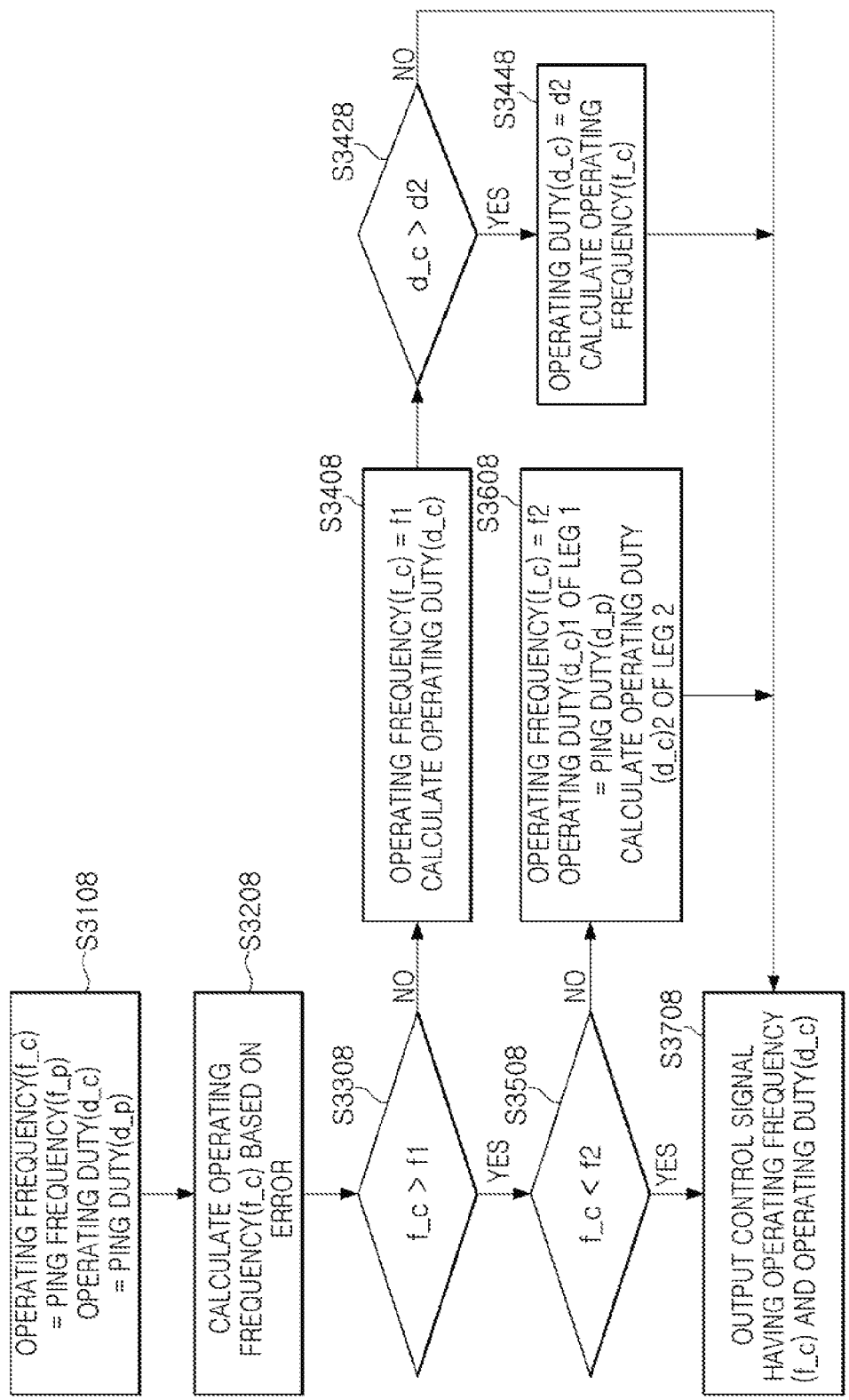
Figure 47:
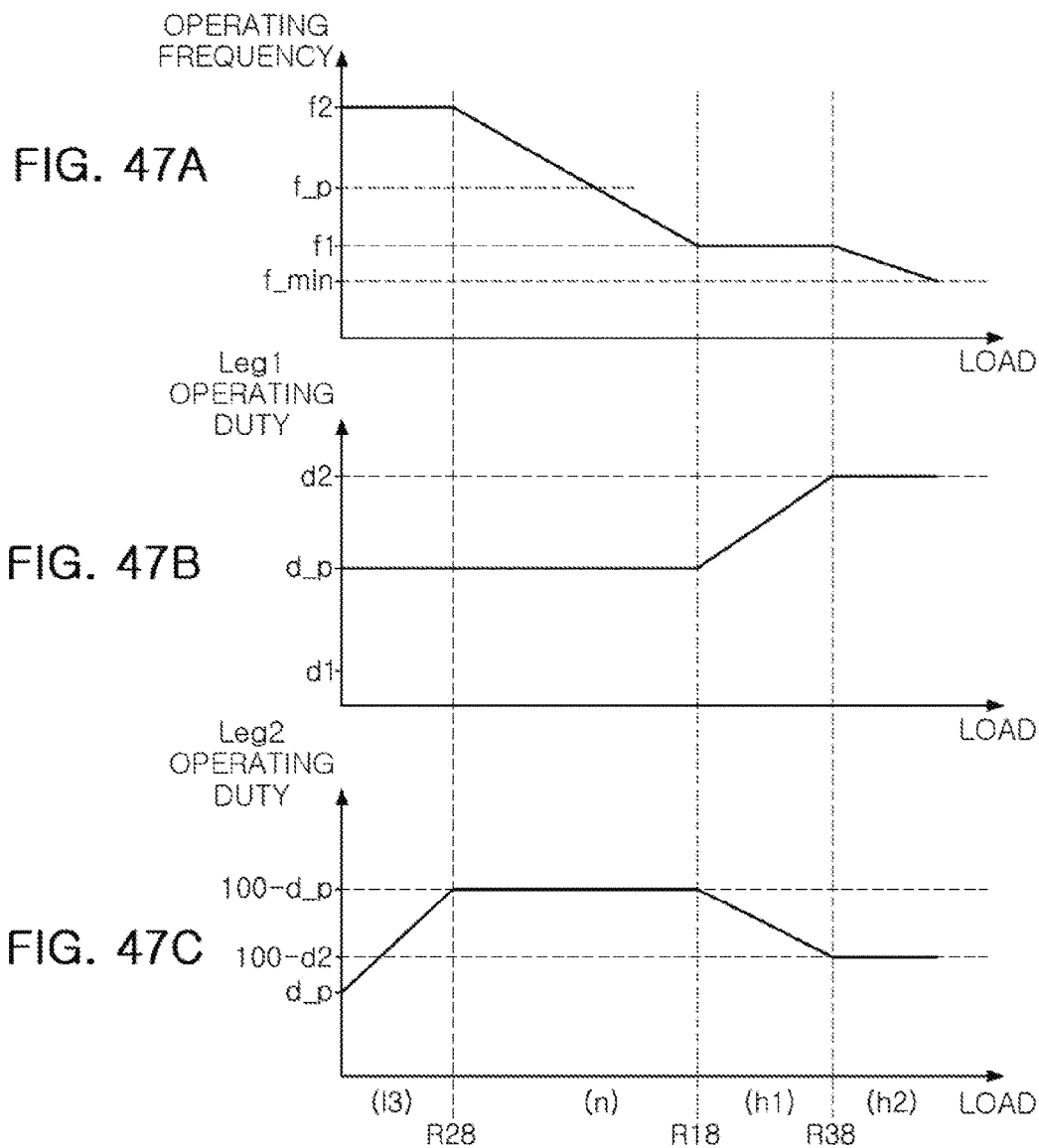

FIG. 46 is an operation flowchart illustrating an operation of the wireless power transmitter in a power transmission mode or the wireless power transmission method, according to an embodiment.

Referring to FIG. 46, operations S3108, S3208, S3308, S3408, S3428, S3438, S3508, and S3708 are the same as operations S3104, S3204, S3304, S3404, S3424, S3434, S3504, and S3704 described in FIG. 38, respectively.

If it is determined, as a result of the determination in operation S3508, that the operating frequency f_c calculated in operation S3208 is less than the second reference frequency f2, the controller sets the operating frequency f_c to the second reference frequency f2, fixes an operating duty cycle d_c1 of a first leg (e.g., an on-duty cycle of the second control signal con24, con25, and con28 (each of FIGS. 11, 12, and 15)) to the ping duty cycle d_p, and calculates an operating duty cycle d_c2 of a second leg (i.e., an on-duty cycle of the fourth control signal con44, con45, and con48 (each of FIGS. 11, 12, and 15)) in operation S3608.

After performing operation S3608, the controller generates the control signals using the calculated operating frequency f_c and operating duty cycle d_c1 and d_c2, and outputs the generated control signals in operation S3708.

FIGS. 47A to 47C are diagrams illustrating a change in the operating frequency and the operating duty cycle in the power transmission mode of the wireless power transmitter or the wireless power transmission method, according to an embodiment.

Referring to FIGS. 47A to 47C, operations in the normal mode n, the first boost mode h1, and the second boost mode h2 are the same as those described in FIG. 36.

In the normal mode n, when the amount of power received by the wireless power receiver is greater than the amount of power required by the wireless power receiver, even in the case in which the operating frequency f_c is increased up to the second reference frequency f2, the operation mode of the controller is changed to a third reduction mode l3. In the third reduction mode l3, the controller fixes the operating frequency f_c to the second reference frequency f2, fixes the operating duty cycle d_c1 of the first leg (e.g., the on-duty cycle of the second control signal con24, con25, and con28 (each of FIGS. 11, 12, and 15)) to the ping duty cycle d_p, and adjusts the operating duty cycle d_c2 of the second leg (e.g., the on-duty cycle of the fourth control signal con44, con45, and con48 (each of FIGS. 11, 12, and 15)). In the third reduction mode l3, the operating duty cycle d_c2 of the second leg is varied within the range of the ping duty cycle d_p and (100−ping duty cycle d_p).

That is, if the load amount is less than a second reference load amount R28, the controller is operated in the third reduction mode l3.

Figure 48:
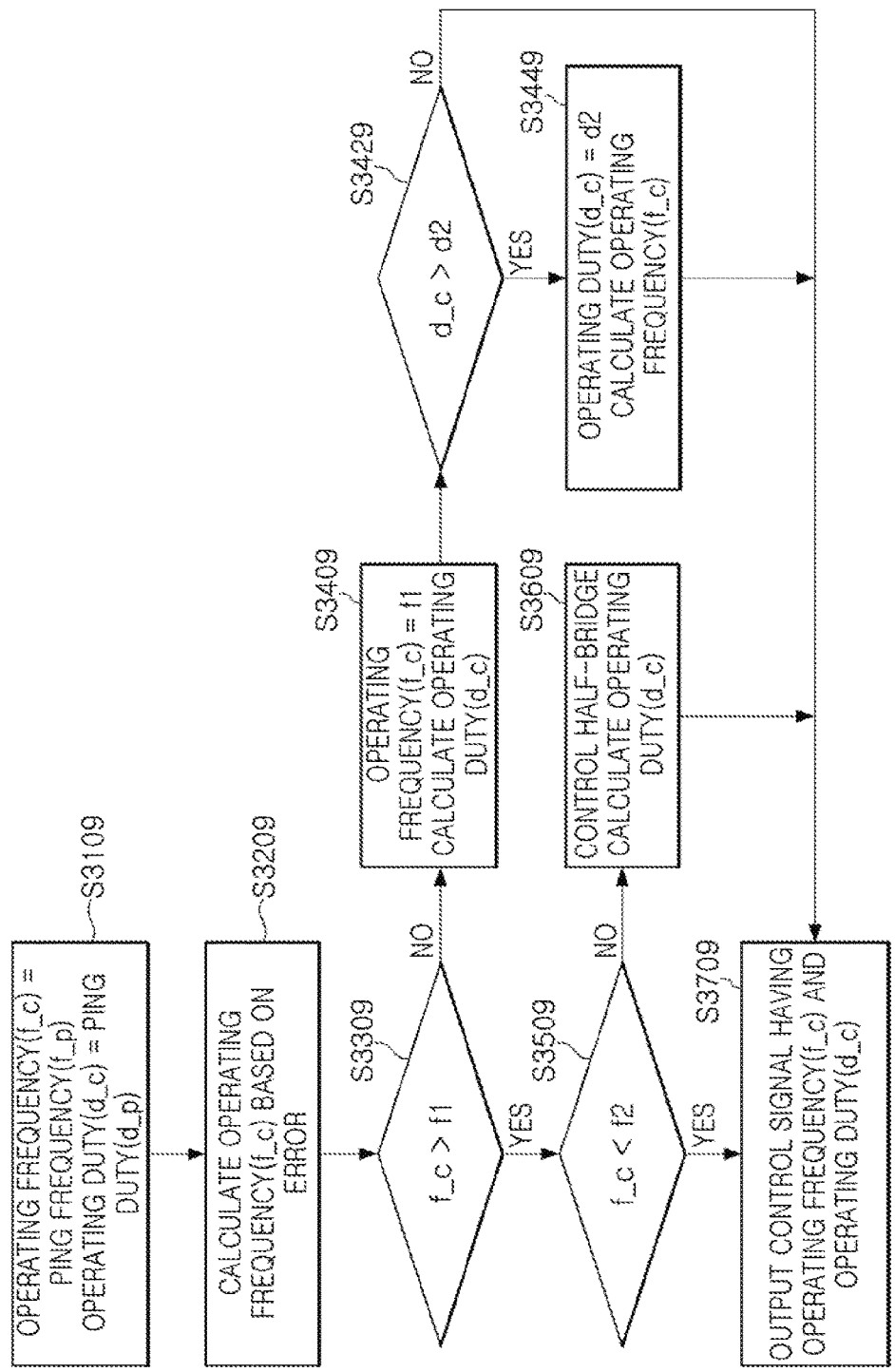

FIG. 48 is an operation flowchart illustrating an operation of the wireless power transmitter in a power transmission mode or the wireless power transmission method, according to an embodiment.

Referring to FIG. 48, operations S3109, S3209, S3309, S3409, S3429, S3439, S3509, and S3709 are the same as operations S3104, S3204, S3304, S3404, S3424, S3434, S3504, and S3704 described in FIG. 38, respectively.

If it is determined, as a result of the determination in operation S3509, that the operating frequency f_c calculated in S3209 is less than the second reference frequency f2, the controller sets the operating duty cycle d_c to an operating duty cycle at which the converter may be operated as the half-bridge, and calculates the operating frequency f_c based on the error information error in operation S3609.

After performing S3609, the controller generates the control signals using the calculated operating frequency f_c and operating duty cycle d_c, and outputs the generated control signals in operation S3709.

Figures 49A, 49B, 49C:
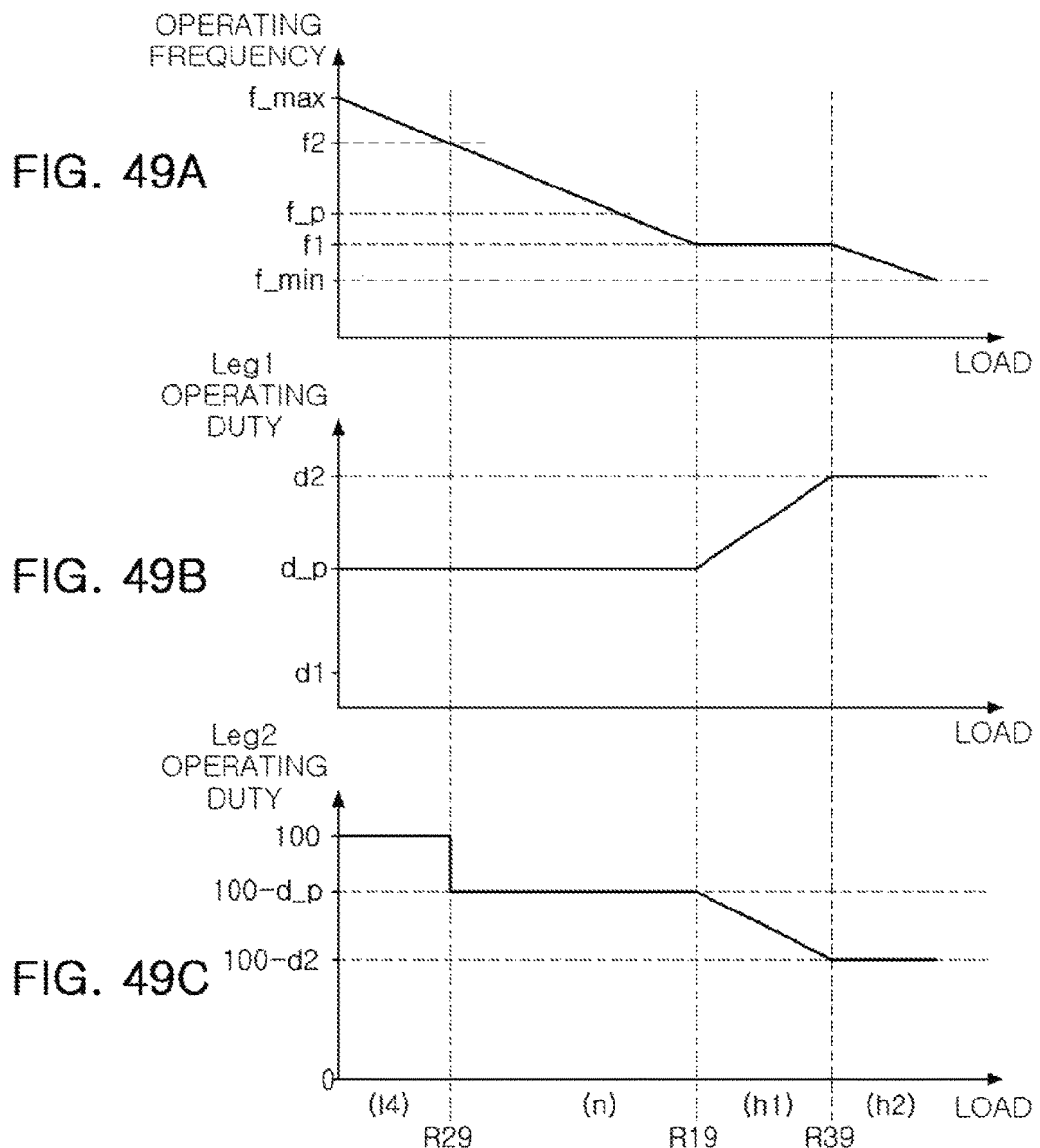

FIGS. 49A to 49C are diagrams illustrating a change in the operating frequency and the operating duty cycle in the power transmission mode of the wireless power transmitter or the wireless power transmission method, according to an embodiment.

Referring to FIGS. 49A to 49C, operations in the normal mode n, the first boost mode h1, and the second boost mode h2 are the same as those described in FIGS. 39A and 39B.

In the normal mode n, when the amount of power received by the wireless power receiver is greater than the amount of power required by the wireless power receiver, even in the case in which the operating frequency f_c is increased up to the second reference frequency f2, the operation mode of the controller is changed to a fourth reduction mode l4. In the fourth reduction mode 14, the controller fixes the operating duty cycle d_c1 of the first leg (e.g., the on-duty cycle of the second control signal con24, con25, and con28 (each of FIGS. 11, 12, and 15)) to the ping duty cycle d_p, fixes the operating duty cycle d_c2 of the second leg (e.g., the duty cycle of the fourth control signal con44, con45, and con48 (each of FIGS. 11, 12, and 15)) to 100%, and adjusts the operating frequency f_c. In the fourth reduction mode 14, the operating frequency f_c is varied within the range of the second reference frequency f2 and the maximum frequency f_max.

That is, if the load amount is less than a second reference load amount R29, the controller is operated in the fourth reduction mode 14.

Figure 50:
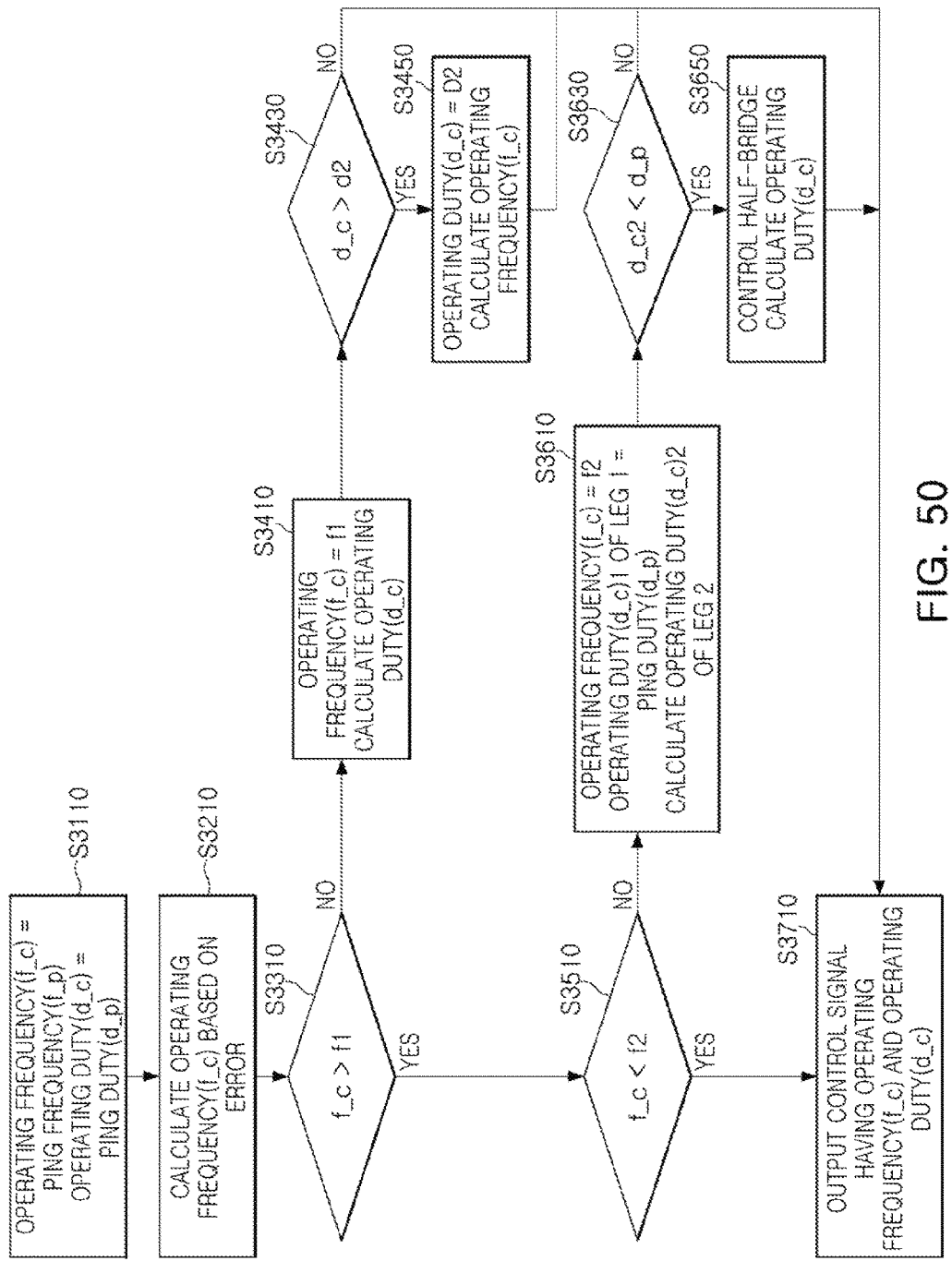
Figure 51:
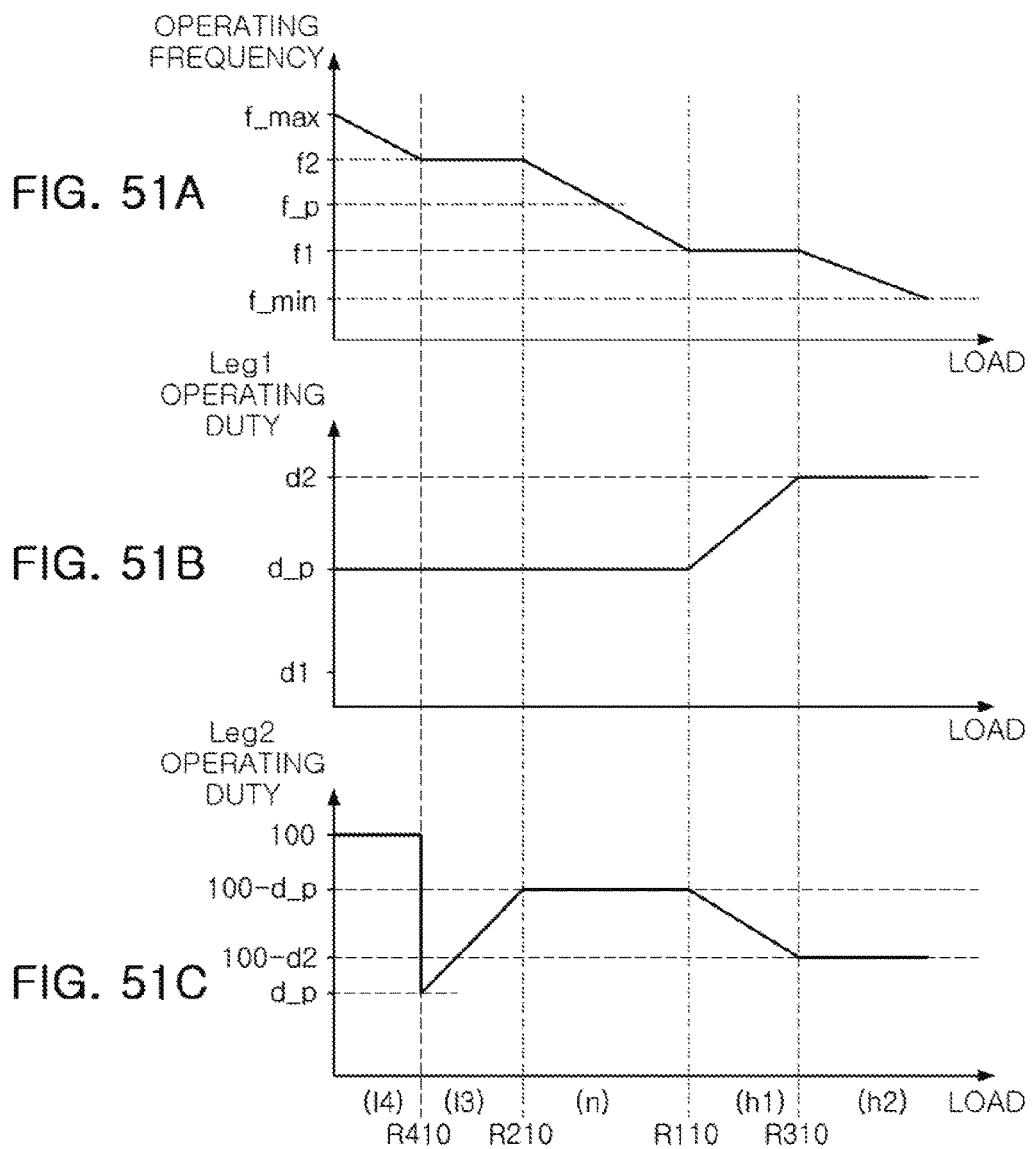

FIG. 50 is an operation flowchart illustrating an operation of the wireless power transmitter in a power transmission mode or the wireless power transmission method, according to an embodiment.

Referring to FIG. 50, operations S3110, S3210, S3310, S3410, S3430, S3450, S3510, and S3710 are the same as operations S3104, S3204, S3304, S3404, S3424, S3434, S3504, and S3704 described in FIG. 38, respectively.

If it is determined, as a result of the determination in operation S3510, that the operating frequency f_c calculated in operation S3210 is less than the second reference frequency f2, the controller sets the operating frequency f_c to the second reference frequency f2, fixes the operating duty cycle d_c1 of the first leg (e.g., the duty cycle of the second control signal con24, con25, and con28 (each of FIGS. 11, 12, and 15)) to the ping duty cycle d_p, and calculates the operating duty cycle d_c2 of the second leg (i.e., the duty cycle of the fourth control signal con44, con45, and con48 (each of FIGS. 11, 12, and 15)) in operation S3610.

After performing operation S3610, the controller determines, in operation S3630, whether the calculated operating duty cycle d_c2 of the second leg is less than the ping duty cycle d_p.

If it is determined, as a result of the determination in operation S3630, that the operating duty cycle d_c2 of the second leg calculated in operation S3610 is greater than or equal to the ping duty cycle d_p, the controller generates the control signals using the operating frequency f_c and the operating duty cycle d_c which are calculated in operation S3610, and outputs the generated control signals in operation S3710.

If it is determined, as a result of the determination in operation S3630, that the operating duty cycle d_c2 of the second leg calculated in operation S3610 is less than the ping duty cycle d_p, the controller sets the operating duty cycle d_c to an operating duty cycle at which the converter may be operated as the half-bridge, and calculates the operating frequency f_c based on the error information error in operation S3650. In operation S3650, the operating duty cycle d_c1 of the first leg is fixed to the ping duty cycle d_p, and the operating duty cycle d_c2 of the second leg is fixed to 100%.

After performing operation S3650, the controller generates the control signals using the calculated operating frequency f_c and operating duty cycle d_c, and outputs the generated control signals in operation S3710.

FIGS. 51A to 51C are diagrams illustrating a change in the operating frequency and the operating duty cycle in the power transmission mode of the wireless power transmitter or the wireless power transmission method, according to an embodiment.

Referring to FIGS. 51A to 51C, operations in the normal mode n, the first boost mode h1, and the second boost mode h2 are the same as those described in FIG. 39.

In the normal mode n, when the amount of power received by the wireless power receiver is greater than the amount of power required by the wireless power receiver, even in the case in which the operating frequency f_c is increased up to the second reference frequency f2, the operation mode of the controller is changed to a third reduction mode l3. In the third reduction mode l3, the controller fixes the operating frequency f_c to the second reference frequency f2, fixes the operating duty cycle d_c1 of the first leg (e.g., the on-duty cycle of the second control signal con24, con25, and con28 (each of FIGS. 11, 12, and 15)) to the ping duty cycle d_p, and adjusts the operating duty cycle d_c2 of the second leg (e.g., the on-duty cycle of the fourth control signal con44, con45, and con48 (each of FIGS. 11, 12, and 15)). In the third reduction mode l3, the operating duty cycle d_c2 of the second leg is varied within the range of the ping duty cycle d_p and (100–ping duty cycle d_p).

In the third reduction mode l3, when the amount of power received by the wireless power receiver is greater than the amount of power required by the wireless power receiver, even in the case in which the operating duty cycle d_c2 of the second leg is decreased up to the ping duty cycle d_p, the operation mode of the controller is changed to the fourth reduction mode l4. In the fourth reduction mode l4, the controller fixes the operating duty cycle d_c1 of the first leg (e.g., the duty cycle of the second control signal con24, con25, and con28 (each of FIGS. 11, 12, and 15)) to the ping duty cycle d_p, fixes the operating duty cycle d_c2 of the second leg (e.g., the duty cycle of the fourth control signal con44, con45, and con48 (each of FIGS. 11, 12, and 15)) to 100%, and may adjust the operating frequency f_c. In the fourth reduction mode l4, the operating frequency f_c is varied within the range of the second reference frequency f2 and the maximum frequency f_max.

That is, if the load amount is less than a second reference load amount R210 and is greater than a fourth reference load amount R410, the controller is operated in the third reduction mode l3. If the load amount is less than the fourth reference load amount R410, the controller is operated in the fourth reduction mode l4.

Figure 52:
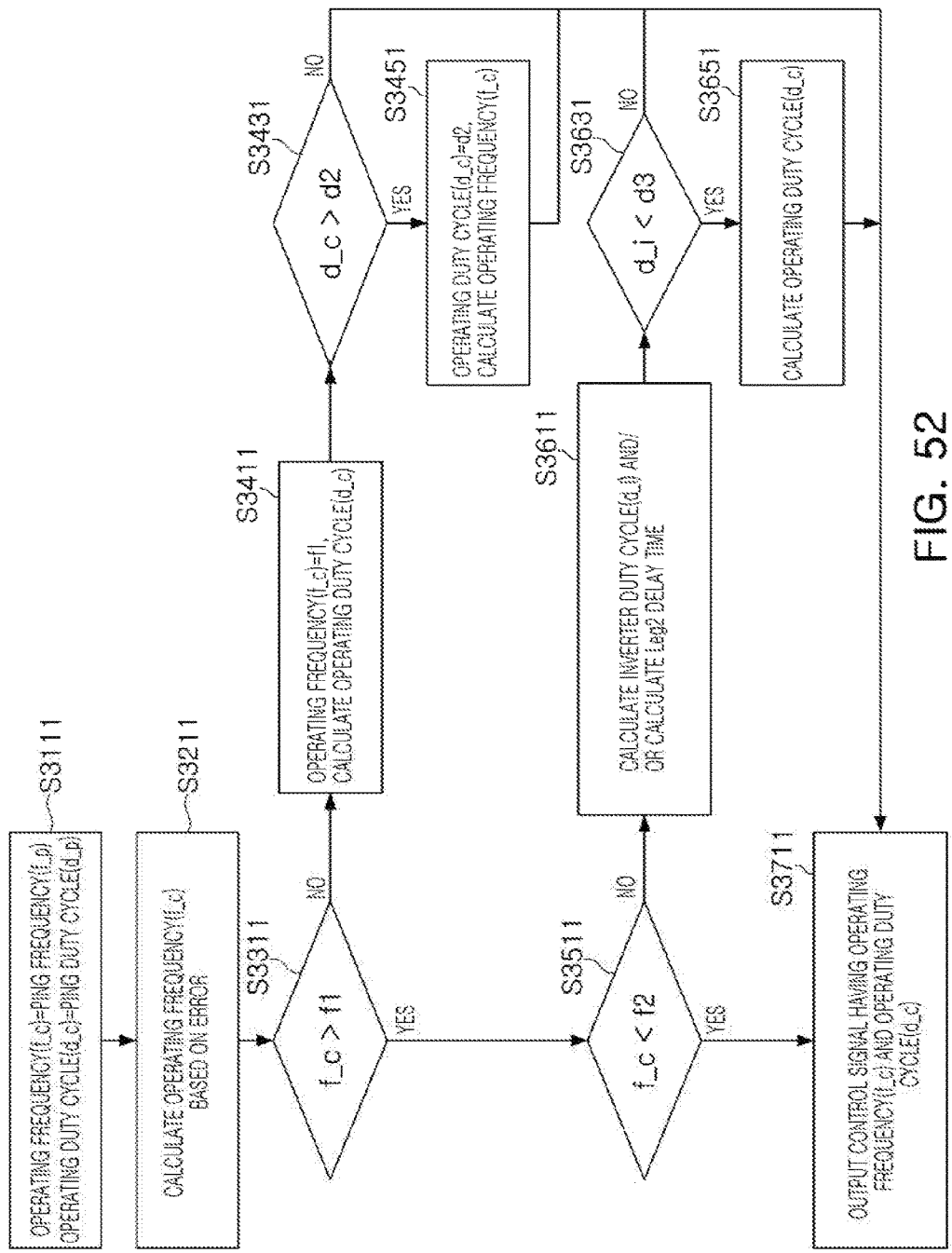
Figure 53A:
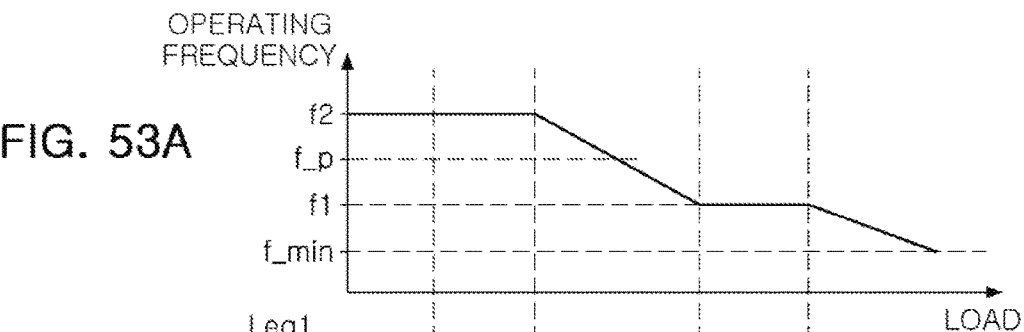
Figure 53B:
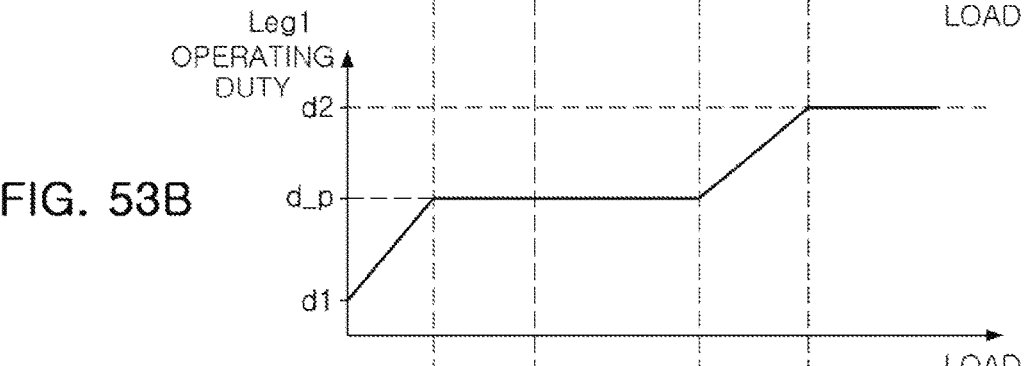
Figure 53C:
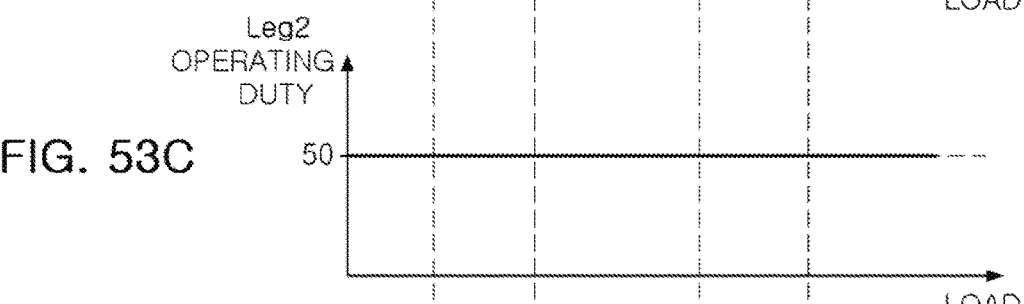
Figure 53D:
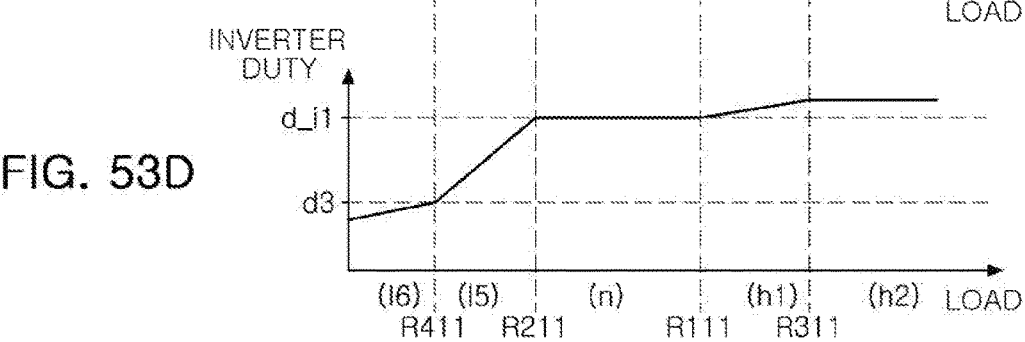

FIG. 52 is an operation flowchart illustrating operations in a power transmission mode of a wireless power transmitter or a wireless power transmission method, according to an embodiment.

Referring to FIG. 52, operations S3111, S3211, S3311, S3411, S3431, S3451, S3511, and S3711 may be identical to operations S3104, S3204, S3304, S3404, S3424, S3444, S3504, and S3704 described with reference to FIG. 38, respectively.

For example, when it is determined in operation S3511 that the operating frequency f_c calculated in operation S3211 is greater than or equal to the second reference frequency f2, the controller sets the operating frequency f_c to be the second reference frequency f2, and calculates a delay time of an inverter duty cycle d_i and/or the second leg Q34, Q44, Q35, Q45, Q38, Q48, Q39 or Q49 of FIG. 11, 12, 15 or 16 and/or the third leg Q59 or Q69 of FIG. 16, based on an error signal error, in operation S3611.

After operation S3611 is performed, the controller determines whether the calculated inverter duty cycle d_i is less than a reference inverter duty cycle d3 in operation S3631.

For example, when it is determined in operation S3631 that an inverter duty cycle d_i calculated in operation S3611 is greater than or equal to a reference inverter duty cycle d3, the controller generates control signals using the inverter duty cycle d_i calculated in operation S3611, the set operating frequency f_c, and the set operating duty cycle d_c, and outputs the generated control signals in operation S3711. In this case, the operating duty cycle of the control signals may be identical to a ping duty cycle, and the frequency of the control signals may be identical to the second reference frequency f2.

For example, when it is determined in operation S3631 that the inverter duty cycle d_i calculated in operation S3611 is shorter than the reference inverter duty cycle d3, the controller recalculates the operating duty cycle d_c, based on the error signal error, in operation S3651. In operation S3651, the inverter duty cycle d_i is fixed to the reference inverter duty cycle d3, and the operating frequency is fixed at the second reference frequency f2.

After operation S3651 is performed, the controller generates control signals using the calculated operating duty cycle d_c, the set inverter duty cycle d_i and the set operating frequency f_c, and outputs the generated control signals, in operation S3711.

Although FIG. 52 illustrates the calculation of the operating duty cycle (d_c) in operation S3651 by way of example, the operating frequency f_c may also be recalculated. In this case, the operating frequency f_c has a value between a minimum frequency f_min and the second reference frequency f2. Alternatively, in operation S3651, the on-duty cycle of the control signals may be set such that the converter operates as a half bridge, and then, the operating frequency f_c may be recalculated.

FIGS. 53A to 53D are diagrams illustrating a variation of an operating frequency and an operating duty cycle in a power transmission mode of a wireless power transmitter or a wireless power transmission method, according to an embodiment.

Referring to FIGS. 53A to 53D, in a normal mode n, a first boost mode h1, and a second boost mode h2 are the same as those described with reference to FIGS. 39A and 39B.

Even when the operating frequency f_c is increased up to the second reference frequency f2 in the normal mode n, in the case in which the amount of power received by the wireless power receiver is greater than an amount of power required by the wireless power receiver, the operation mode of the controller is changed to a fifth reduction mode l5. In the fifth reduction mode l5, the controller fixes the operating frequency f_c to the second reference frequency f2, sets the operating duty cycle d_c1 of the first leg, for example, an on-duty cycle of each of the second control signals con24, con25, con28 and con29 of FIGS. 11, 12, 15 and 16, to the ping duty cycle d_p, and adjusts the inverter duty cycle by adjusting a delay time of the second leg, for example, a delay time of each of the third control signals con44, con45, con48 and con49 and the fourth control signals con44, con45, con48 and con49 of FIGS. 11, 12, 15 and 16, and/or a delay time of the third leg 5, for example, a delay time of the fifth control signal con59 and the sixth control signal con69 of FIG. 16.

Even when the inverter duty cycle d_i is decreased up to the reference inverter duty cycle d3 in the fifth reduction mode l5, in the case in which the amount of power received by the wireless power receiver is greater than an amount of power required by the wireless power receiver, the operation mode of the controller is changed to a sixth reduction mode l6. In the sixth reduction mode l6, the controller adjusts the operating duty cycle d_c1 of the first leg, for example, an on-duty cycle of each of the second control signals con24, con25, con28 and con29 of FIGS. 11, 12, 15 and 16. In the fourth reduction mode l4, the operating duty cycle d_c is varied within a range between the ping duty cycle d_p and the first reference duty cycle dl.

For example, when a load amount is lower than a second reference load amount R211 and greater than a fourth reference load amount R411, the controller operates in the fifth reduction mode l5. When the load amount is less than the fourth reference load amount R411, the controller operates in the sixth reduction mode l6.

In FIGS. 32 to 53D, the first reference load amount is a value corresponding to an amount of power received by the wireless power receiver when the operating frequency f_c is the first reference frequency f1, and the second reference load amount is a value corresponding to an amount of power received by the wireless power receiver when the operating frequency f_c is the second reference frequency f2. In addition, the third reference load amount is a value corresponding to the amount of power received by the wireless power receiver when the operating frequency f_c is the first reference frequency f1 and the operating duty cycle d_c is the second reference duty cycle d2, and the fourth reference load amount is a value corresponding to the amount of power received by the wireless power receiver when the operating frequency f_c is the second reference frequency f2 and the operating duty cycle d_c is the first reference duty cycle dl.

Figure 41:
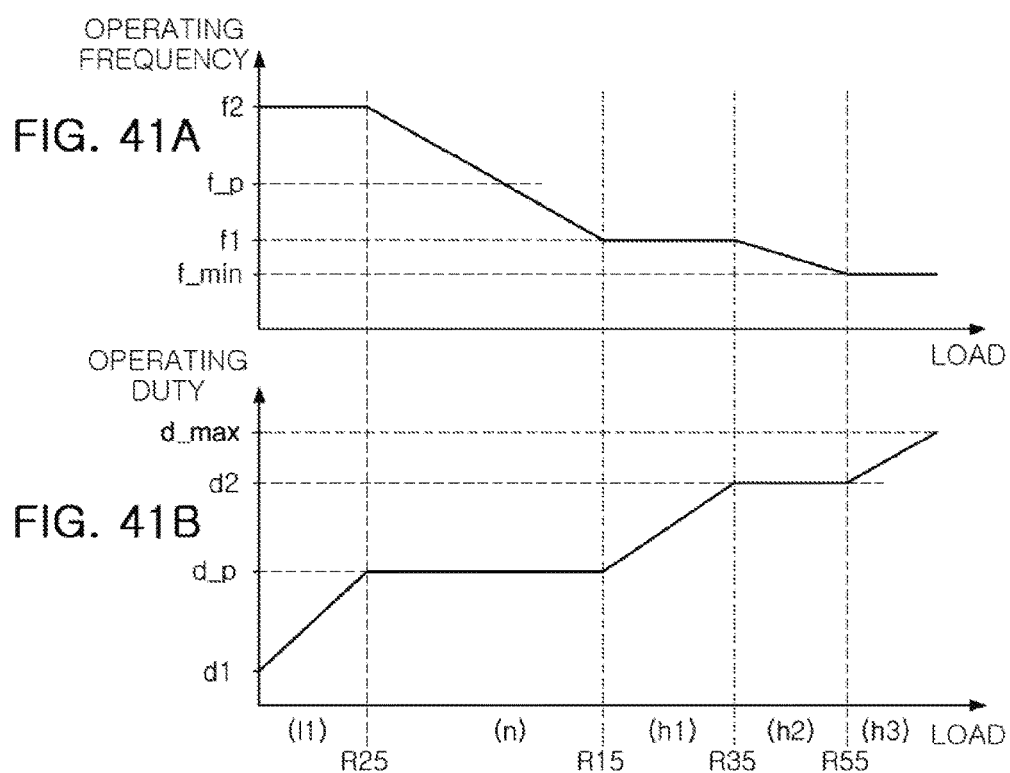

The control methods illustrated in each of FIGS. 32 through 53D may be recombined in various forms. For example, operations S3465 and S3485 of FIG. 40 or the operation of the third boost mode h3 of FIGS. 41A and 41B are also be added to the control methods of each of FIGS. 32 through 53D. Alternatively, the third reduction mode illustrated in FIGS. 47A to 47c and 53A to 53D and/or the fourth reduction mode illustrated in FIGS. 49A to 49C and 51A may also be performed instead of the first reduction mode and/or the second reduction mode according to another embodiment. Alternatively, the first reduction mode and/or the second reduction mode of another embodiment, instead of the sixth reduction mode of FIG. 53, may also be performed. Alternatively, in each of FIGS. 32 through 53D, the operations and the operation modes may be performed while some operations and some operation modes are omitted.

The control methods illustrated in FIGS. 32 through 53D may be variously performed according to the request signal input from the wireless power receiver.

For example, the ping frequency f_c is selected as the same frequency as the first reference frequency f1. Thereafter, as a result of performing a determination based on the signal received from the wireless power receiver, if the amount of power received by the wireless power receiver is less than the amount of power required by the wireless power receiver, the operation in the first boost mode h1 according to the embodiments described above is also performed. Alternatively, as a result of performing a determination based on the signal received from the wireless power receiver, if the amount of power received by the wireless power receiver is greater than the amount of power required by the wireless power receiver, the operation in the normal mode n according to the embodiments described above is also be performed.

Thereafter, according to the signal received from the wireless power receiver, one or more of the operations of the first boost mode h1, the second boost mode h2, the third boost mode h3, the normal mode n, the first reduction mode l1, the second reduction mode l2, the third reduction mode l3, the fourth reduction mode l4, the fifth reduction mode and the sixth reduction mode according to the embodiments described above may also be sequentially performed.

For example, in a case in which a battery of the wireless power receiver is in a state close to a discharge state, the wireless power receiver first requires a large amount of power, and then gradually requires a small amount of power as the battery is gradually charged. In this case, after the operation in the boost mode h1, h2, and/or h3 is performed, the operations in the normal mode n and the reduction mode l1, l2, l3, l4, l5 and/or l6 are sequentially performed.

Alternatively, in a case in which the battery of the wireless power receiver is charged to some extent, the wireless power receiver requires a small amount of power from the beginning. Therefore, in this case, the operation in the reduction mode l1, l2, l3, l4, l5 and/or l6 is performed first.

Alternatively, when an alignment state between the wireless power receiver and the wireless power transmitter is distorted, the control is changed to a direction in which the load amount is increased in FIGS. 32 through 53D. For example, when the alignment state between the wireless power receiver and the wireless power transmitter is distorted while the operation in the normal mode n or the operation in the reduction mode l1, l2, l3, l4, l5 and/or l6 is performed, the operation in the normal mode n or the operation in the boost mode h1, h2, and/or h3 is also performed. Alternatively, when the alignment state between the wireless power receiver and the wireless power transmitter is distorted while the operation in the first boost mode h1 is performed, the operation in the second boost mode h2 is also performed.

Alternatively, when the alignment state between the wireless power receiver and the wireless power transmitter coincides, the control is changed to a direction in which the load amount is decreased in FIGS. 32 through 53. For example, the operation in the reduction mode l1, l2, l3, l4, l5 and/or l6 is performed while the operation in the normal mode n is performed.

The control methods illustrated in FIGS. 32 through 53D may also be performed so that the frequency wirelessly transmitted belongs to a reference range. For example, the controller adjusts the duty cycle and the frequency of the control signal while preferentially satisfying the conditions that the frequency wirelessly transmitted is a reference value or less, is a reference value or more, or belongs to a predetermined range.

Figure 54A:
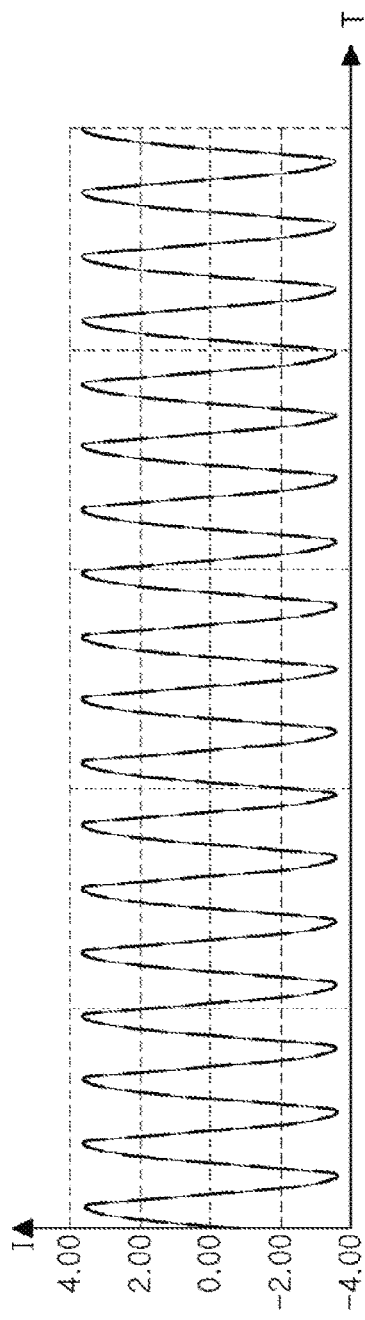
FIGS. 54A and 54B are diagrams illustrating a coil current and an output voltage of a wireless power transmitter, according to an embodiment.
Figure 54B:
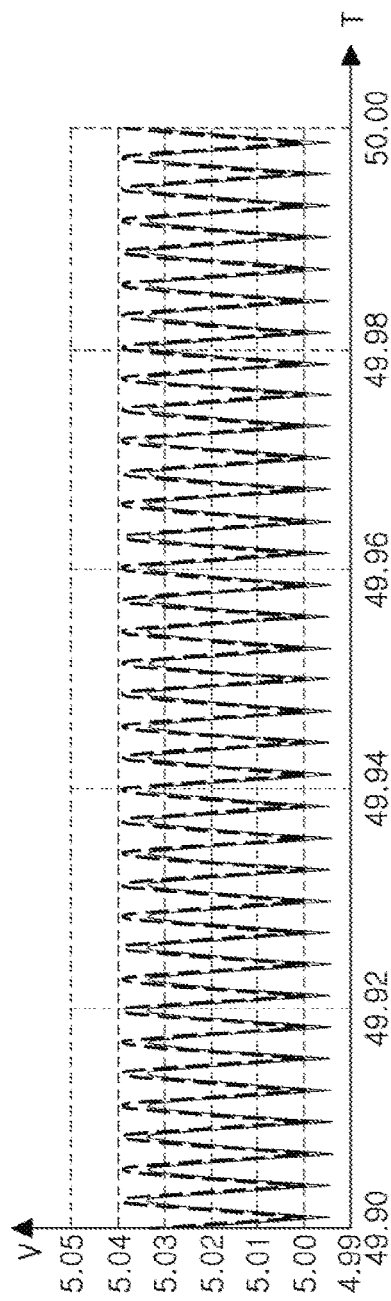

FIGS. 54A and 54B are diagrams illustrating a coil current and an output voltage of a wireless power transmitter, according to an embodiment.

A thick dotted line of the graph of FIG. 54 illustrates a coil current of the resonator according to an embodiment illustrated in each of FIGS. 7 through 15, while a thin solid line of the graph of FIG. 54A illustrates a coil current according to a comparative example.

A thick dotted line of the graph of FIG. 54B illustrates an output voltage, which is a voltage across the resonator according to an embodiment illustrated in each of FIGS. 7 through 15, while a thin solid line of the graph of FIG. 54B illustrates an output voltage according to a comparative example.

The comparative example is the wireless power transmitter including the full-bridge inverter, operated by receiving the input power. In the case of the comparative example, the input power is a power provided by the boost converter implemented separately from the inverter.

As illustrated, it can be confirmed that the wireless power transmitter according to an embodiment of this disclosure provides the coil current and the output voltage corresponding to the full-bridge inverter according to the comparative example, while using the half-bridge inverter.

Figure 55A:
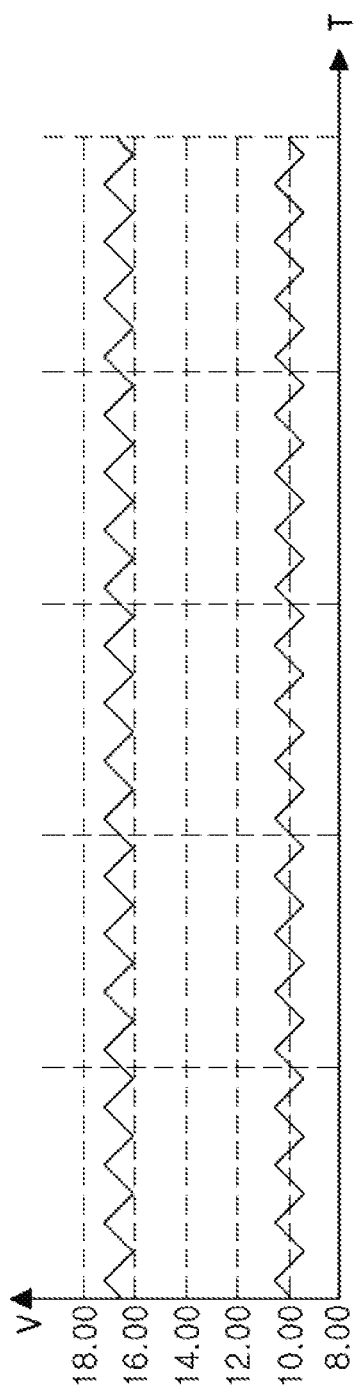
FIGS. 55A and 55B are diagrams illustrating a boost voltage and an output voltage according to a change of a duty cycle in a wireless power transmitter, according to an embodiment.
Figure 55B:
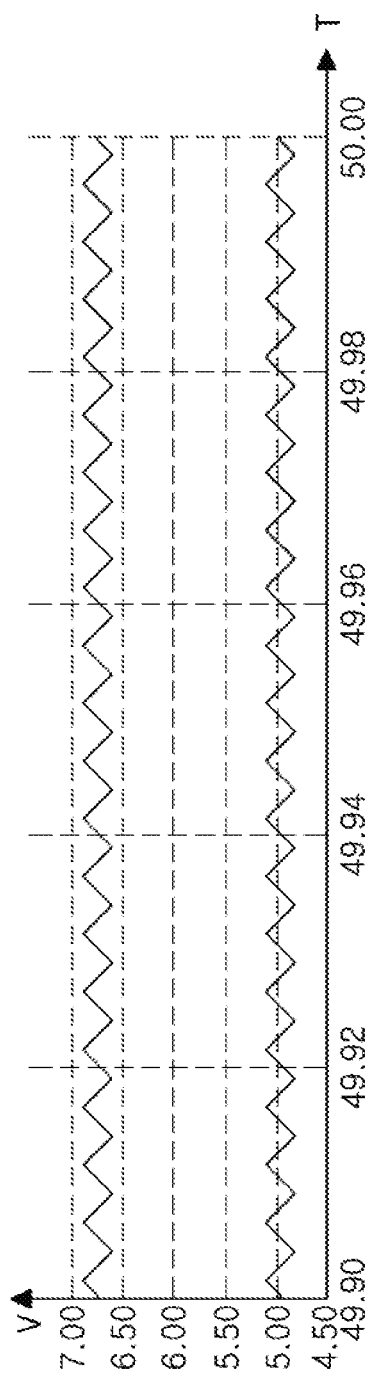

FIGS. 55A and 55B are diagrams illustrating a boost voltage and an output voltage according to a change of a duty cycle in the wireless power transmitter, according to an embodiment in this disclosure.

The graph of FIG. 55A illustrates a boost voltage (a voltage of the node N2 of FIGS. 8 through 15), and the graph of FIG. 55B illustrates an output voltage of the wireless power transmitter.

In the graph of FIG. 55A, a thick line illustrates the boost voltage according to a duty cycle of 50%, and a thin line illustrates the boost voltage according to a duty cycle of 70%.

As illustrated, it can be appreciated that the boost voltage according to the duty cycle of 50% is about 10V, but the output voltage of the boosting unit according to the duty cycle of 70% is slightly higher than 16V, which may provide higher boosting efficiency.

In addition, accordingly, as illustrated in the graph of FIG. 55B, it can be appreciated that the output voltage of the wireless power transmitter according to the duty cycle of 50% is about 5V, but the output voltage of the boosting unit according to the duty cycle of 70% is close to 7V, which may provide a higher output.

As set forth above, according to the embodiments disclosed herein, a wireless power transmitter and a wireless power transmission method may reduce the number of components required for manufacturing the wireless power transmitter, whereby a small-sized wireless power transmitter may be implemented and material costs thereof may be saved. Further, a wireless power transmitter and a wireless power transmission method according to the disclosed embodiments may be more conveniently used by the user, such as by increasing the range across which power may be wirelessly transmitted while satisfying various limitations to be satisfied in wirelessly transmitting the power, and may also improve wireless power transmission efficiency. Further, a wireless power transmitter and a wireless power transmission method according to the disclosed embodiments may more precisely control power transmission, whereby unnecessary power consumption may be prevented and overheating of the wireless power receiver or damage to an element of the wireless power receiver may be prevented. Further, a wireless power transmitter and a wireless power transmission method according to the disclosed embodiments may reduce an inrush current and a peak current that may occur at the time of generating a signal for determining whether the wireless power receiver is present, whereby operation in a detection mode for determining whether the wireless power receiver is present may be stabilized.

The controllers 200, 201, 202, 203, 204, 205, 206, 207, 208 and 209 in FIGS. 7 through 16 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtracters, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3 and 17 through 55B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a converter comprising switching elements forming a bridge circuit, and configured to output an alternating current (AC) voltage in response to control signals;
   a resonator comprising a resonant capacitor and a resonant coil, and configured to receive the AC voltage to transmit power wirelessly; and
   a controller configured to set a dead time at which a magnitude of the AC voltage is substantially zero, in response to a signal received from a wireless power receiver.

2. The wireless power transmitter of claim 1, wherein the switching elements are configured to be respectively turned on or off in response to a corresponding signal among the control signals, an amplitude of the AC voltage is determined according to an operating duty cycle of one of the switching elements, and a frequency of the AC voltage is determined according to an operating frequency of the switching signals.

3. The wireless power transmitter of claim 1, wherein the converter further comprises
   a first switching element connected between a first node, an end of the resonator, and a second node,
   a second switching element connected between the first node and a ground,
   a third switching element connected between a third node, another end of the resonator, and the second node,
   a fourth switching element connected between the third node and the ground,
   a coil connected between the first node and a terminal to which an input voltage is applied externally, and
   a capacitor connected between the second node and the ground.

4. The wireless power transmitter of claim 1, wherein the controller is further configured to vary a frequency of the control signals in response to an amount of power required by the wireless power receiver being equal to or greater than a reference value, and to vary the dead time in response to the amount of power required by the wireless power receiver being equal to or lower than the reference value.

5. The wireless power transmitter of claim 4, wherein the varying of the frequency of the control signals comprises varying the frequency of the control signals within a range of a frequency equal to or greater than a first reference frequency to a frequency equal to or less than a second reference frequency, and the frequency of the control signals is fixed at the second reference frequency when the dead time is varied.

6. The wireless power transmitter of claim 5, wherein the controller is further configured to fix the frequency of the control signals to the second reference frequency, and to vary a duty cycle of one of the control signals.

7. The wireless power transmitter of claim 5, wherein the controller is configured to fix the frequency of the control signals to the first reference frequency, and to vary a duty cycle of one of the control signals.

8. The wireless power transmitter of claim 1, wherein
   the bridge circuit comprises a full bridge circuit comprising a first leg and a second leg, and
   the controller is further configured to output the control signals such that an on-duty cycle of a low side switching element of the first leg and an on-duty cycle of a high side switching element of the second leg are different from each other.

9. A wireless power transmitter comprising:
   a converter comprising switching elements forming a bridge circuit, and configured to output an alternating current (AC) voltage in response to control signals;
   a resonator comprising a resonant capacitor and a resonant coil, and configured to receive the AC voltage to transmit power wirelessly; and
   a controller configured to perform a first mode operation in which an operating duty cycle of one of the control signals is fixed and a frequency of the control signals is varied and output, and a second mode operation in which a duty cycle and the frequency of the control signals are fixed and a phase difference between two of the control signals is varied and output.

10. The wireless power transmitter of claim 9, wherein the switching elements are respectively turned on or off in response to a corresponding signal among the control signals, an amplitude of the AC voltage is determined according to an operating duty cycle of one of the switching elements, and a frequency of the AC voltage is determined according to an operating frequency of the switching elements.

11. The wireless power transmitter of claim 10, wherein the converter further comprises
    a first switching element connected between a first node, an end of the resonator, and a second node,
    a second switching element connected between the first node and a ground,
    a third switching element connected between a third node, another end of the resonator, and the second node,
    a fourth switching element connected between the third node and the ground,
    a coil connected between the first node and a terminal to which an input voltage is applied externally, and
    a capacitor connected between the second node and the ground.

12. The wireless power transmitter of claim 9, wherein the controller is further configured to perform the first mode operation in response to an amount of power required by a wireless power receiver being equal to or greater than a reference value, and to perform the second mode operation in response to the amount of power required by the wireless power receiver being equal to or lower than the reference value.

13. The wireless power transmitter of claim 9, wherein the controller is further configured to set a detection duty cycle while determining whether a wireless power receiver is present, to fix a duty cycle of one of the control signals to the detection duty cycle in the first mode operation and the second mode operation, and to output the control signals.

14. The wireless power transmitter of claim 13, wherein the controller is further configured to output the control signals such that the frequency of the control signals is varied within a range of a frequency equal to or greater than a first reference frequency to a frequency equal to or less than a second reference frequency, when the first mode operation is performed, and to fix the frequency of the control signals to the second reference frequency and to output the control signals by varying the phase difference, when the second mode operation is performed.

15. The wireless power transmitter of claim 9, wherein
the bridge circuit comprises a full bridge circuit comprising a first leg and a second leg, and
the controller is further configured to output the control signals such that an on-duty cycle of a low side switching element of the first leg and an on-duty cycle of a high side switching element of the second leg are different from each other.

16. The wireless power transmitter of claim 15, wherein
the low side switching element of the first leg and a high side switching element of the first leg are configured to be turned on or off alternately with respect to each other,
a low side switching element of the second leg and the high side switching element of the second leg are configured to be turned on or off alternately with each other, and
the controller is further configured to vary and output a phase difference between control signals, among the control signals, controlling switching elements of the first leg and control signals, among the control signals, controlling switching elements of the second leg, in the second mode operation.

17. A wireless power transmitter comprising:
a converter comprising a bridge circuit comprising switching elements;
a controller configured to
output control signals controlling the switching elements to cause the converter to output an alternating current (AC) voltage, and
vary a phase difference between two of the control signals, independently of operating duty cycles of the two of the control signals, to adjust the AC voltage; and
a resonator configured to receive the AC voltage to transmit power.

18. The wireless power transmitter of claim 17, wherein the controller is further configured to
fix an operating duty cycle of one of the control signals and vary a frequency of the control signals, in a first mode operation, and
fix an operating duty cycle and the frequency of the control signals, and vary the phase difference between the two of the control signals, in a second mode operation.

19. The wireless power transmitter of claim 18, wherein the controller is further configured to
vary the frequency of the control signals within a range of a frequency equal to or greater than a first reference frequency to a frequency equal to or less than a second reference frequency, in the first mode operation, and
fix the frequency of the control signals to the second reference frequency, in the second mode operation.

20. The wireless power transmitter of claim 18, wherein the controller is further configured to perform one of the first mode operation and the second mode operation based on an amount of power required by a receiver receiving the transmitted power.

* * * * *